(12) United States Patent
Aoki

(10) Patent No.: US 7,587,553 B2
(45) Date of Patent: Sep. 8, 2009

(54) STORAGE CONTROLLER, AND LOGICAL VOLUME FORMATION METHOD FOR THE STORAGE CONTROLLER

(75) Inventor: Yoshitaka Aoki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 458 days.

(21) Appl. No.: 11/623,501

(22) Filed: Jan. 16, 2007

(65) Prior Publication Data

US 2008/0114931 A1 May 15, 2008

(30) Foreign Application Priority Data

Nov. 9, 2006 (JP) .............................. 2006-304526

(51) Int. Cl.
*G06F 12/00* (2006.01)
(52) U.S. Cl. .................... 711/114; 711/170; 711/154
(58) Field of Classification Search ................. None
See application file for complete search history.

(56) References Cited

U.S. PATENT DOCUMENTS 5,584,018 A 12/1996 Kamiyama et al.
5,956,750 A 9/1999 Yamamoto et al.
2007/0113037 A1* 5/2007 Eguchi et al. ................ 711/165

FOREIGN PATENT DOCUMENTS

| JP | 7-093109 | 4/1995 |
|----|----------|--------|
| JP | 2003-271425 | 9/2003 |
| JP | 2004-126867 | 4/2004 |

* cited by examiner

*Primary Examiner*—Jack A Lane
(74) *Attorney, Agent, or Firm*—Brundidge & Stanger, P.C.

(57) ABSTRACT

When associating a plurality of logical devices with one logical volume, the storage controller of the present invention improves the responsive performance thereof by determining the position for allocating the logical devices in accordance with the pattern of access made from the host. One logical volume is constituted by a plurality of logical devices. The control section computes the performance indicator (load) of each logical device in accordance with the pattern of access to the logical volume from the host. The control section computes the performance indicator of each RAID group for the case where each logical device is allocated on the basis of the performance indicator of each logical device. The control section determines a RAID group to allocate each logical device, so that the variance of the performance indicator of the RAID group becomes minimum.

11 Claims, 43 Drawing Sheets

FIG. 7

| REQUIREMENT TABLE T10 | TABLE NAME | FIELD NAME |
|---|---|---|
| T12 | GROUP REQUIREMENT TABLE | GROUP NAME |
| | | BASIC LDEV CAPACITY |
| T11 | LU GROUP TABLE | LU NAME |
| | | GROUP NAME |
| T13 | RAID GROUP/ GROUP TABLE | RAID GROUP NUMBER |
| | | GROUP NAME |

| CONFIGURATION TABLE T20 | TABLE NAME | FIELD NAME |
|---|---|---|
| T21 | LU CONFIGURATION TABLE | LU NAME |
| | | LU CAPACITY |
| T23 | RAID GROUP CONFIGURATION TABLE | RAID GROUP NUMBER |
| | | RAID LEVEL |
| | | DISK TYPE |
| T22 | LDEV CONFIGURATION TABLE | LDEV NUMBER |
| | | CONNECTING NUMBER |
| | | LU NAME |
| | | RAID GROUP NUMBER |

FIG. 8

| PERFORMANCE TABLE | TABLE NAME | FIELD NAME |
|---|---|---|
| T31 — | LU PERFORMANCE TABLE | LU NAME |
| | | TIME ZONE |
| | | ACCESS PATTERN |
| | | LU_PI |
| T32 — | TIME ZONE TABLE | TIME ZONE |

T30

T40

| SPECIFICATION TABLE | TABLE NAME | FIELD NAME |
|---|---|---|
| T41 — | RAID GROUP SPECIFICATION TABLE | RAID LEVEL |
| | | DISK TYPE |
| | | RAID GROUP CAPACITY |
| | | PROCESSABLE IOPS |

| DEV CONFIGURATION TABLE | | | |
|---|---|---|---|
| LDEV NUMBER | CONNECTING NUMBER | LU NAME | RAID GROUP NUMBER |
| 1 | 1 | LU1 | 1-1 |
| 2 | 2 | LU1 | 1-2 |
| 3 | 1 | LU2 | 1-3 |
| 4 | 2 | LU2 | 1-1 |
| 5 | 3 | LU2 | 1-2 |
| 6 | 1 | LU3 | 1-3 |
| 7 | 2 | LU3 | 1-1 |
| 8 | 3 | LU3 | 1-2 |

FIG. 16

| | | | | | | T70 |
|---|---|---|---|---|---|---|
| LDEV INFORMATION TABLE ||||||||
| LDEV NUMBER | CONNECTING NUMBER | LU NAME | RAID GROUP NUMBER | TIME ZONE | ACCESS PATTERN | LDEV-PI |
| 1 | 1 | LU 1 | | 0900-1200 | SEQUENTIAL | 12000 |
| 1 | 1 | LU 1 | | 1200-1500 | RANDOM | 12000 |
| 2 | 2 | LU 1 | | 0900-1200 | SEQUENTIAL | 12000 |
| 2 | 2 | LU 1 | | 1200-1500 | RANDOM | 12000 |

FIG. 19

RAID GROUP INFORMATION TABLE (T50)

| RAID GROUP# | THE NUMBER OF AVAILABLE LDEVs | THE NUMBER OF USED LDEVs | PROCESSABLE IOPS | TIME ZONE | RAID GROUP PI |
|---|---|---|---|---|---|
| 1-1 | 4 | 1 | 72000 | 0000-0300 | 0 |
|  | 4 | 1 | 72000 | 0300-0600 | 0 |
|  | 4 | 1 | 72000 | 0600-0900 | 0 |
|  | 4 | 1 | 72000 | 0900-01200 | 12000 |
|  | 4 | 1 | 72000 | 1200-1500 | 12000 |
|  | 4 | 1 | 72000 | 1500-1800 | 0 |
|  | 4 | 1 | 72000 | 1800-2100 | 0 |
|  | 4 | 1 | 72000 | 2100-2400 | 0 |
| 1-2 | 4 | 0 | 60000 | 0000-0300 | 0 |
|  | 4 | 0 | 60000 | 0300-0600 | 0 |
|  | 4 | 0 | 60000 | 0600-0900 | 0 |
|  | 4 | 0 | 60000 | 0900-01200 | 0 |
|  | 4 | 0 | 60000 | 1200-1500 | 0 |
|  | 4 | 0 | 60000 | 1500-1800 | 0 |
|  | 4 | 0 | 60000 | 1800-2100 | 0 |
|  | 4 | 0 | 60000 | 2100-2400 | 0 |
| 1-3 | 8 | 0 | 48000 | 0000-0300 | 0 |
|  | 8 | 0 | 48000 | 0300-0600 | 0 |
|  | 8 | 0 | 48000 | 0600-0900 | 0 |
|  | 8 | 0 | 48000 | 0900-01200 | 0 |
|  | 8 | 0 | 48000 | 1200-1500 | 0 |
|  | 8 | 0 | 48000 | 1500-1800 | 0 |
|  | 8 | 0 | 48000 | 1800-2100 | 0 |
|  | 8 | 0 | 48000 | 2100-2400 | 0 |

COMPUTING VARIANCE

AVERAGE VALUE =
(1 / NUMBER OF ALL RECORDS IN TABLE) × Σ RAID GROUP PI

VARIANCE =
(1 / NUMBER OF ALL RECORDS IN TABLE) × Σ (RAID GROUP PI − AVERAGE VALUE)$^2$

SPECIFIC EXAMPLE

THE NUMBER OF ALL RECODES =
THE NUMBER OF RAID GROUPS × THE NUMBER OF TIME ZONES = 3 × 8 = 24

AVERAGE VALUE = (1/24) × (0 + ··· + 0 + 12000 + 12000 + 0 + ··· + 0) = 1000

VARIANCE = (1/24) × {(0−1000)^2 + ··· + (12000−1000)^2 + (12000−1000)^2 + ··· + (0−1000)^2} = 12,041,667

LDEV INFORMATION TABLE  T70

| LDEV NUMBER | CONNECTING NUMBER | LU NAME | RAID GROUP NUMBER | TIME ZONE | ACCESS PATTERN | LDEV-PI |
|---|---|---|---|---|---|---|
| 1 | 1 | LU 1 |  | 0900-1200 | SEQUENTIAL | 12000 |
| 1 | 1 | LU 1 |  | 1200-1500 | RANDOM | 12000 |
| 2 | 2 | LU 1 |  | 0900-1200 | SEQUENTIAL | 12000 |
| 2 | 2 | LU 1 |  | 1200-1500 | RANDOM | 12000 |
| 3 | 1 | LU 2 |  | 0900-1200 | RANDOM | 8000 |
| 3 | 1 | LU 2 |  | 1200-1500 | RANDOM | 8000 |
| 4 | 2 | LU 2 |  | 0900-1200 | RANDOM | 8000 |
| 4 | 2 | LU 2 |  | 1200-1500 | RANDOM | 8000 |
| 5 | 3 | LU 2 |  | 0900-1200 | RANDOM | 8000 |
| 5 | 3 | LU 2 |  | 1200-1500 | RANDOM | 8000 |
| 6 | 1 | LU 3 |  | 0900-1200 | SEQUENTIAL | 24000 |
| 6 | 1 | LU 3 |  | 1200-1500 | SEQUENTIAL | 12000 |
| 7 | 2 | LU 3 |  | 0900-1200 | SEQUENTIAL | 24000 |
| 7 | 2 | LU 3 |  | 1200-1500 | SEQUENTIAL | 12000 |
| 8 | 3 | LU 3 |  | 0900-1200 | SEQUENTIAL | 24000 |
| 8 | 3 | LU 3 |  | 1200-1500 | SEQUENTIAL | 12000 |
| 9 | 4 | LU 3 |  | 0900-1200 | SEQUENTIAL | 24000 |
| 9 | 4 | LU 3 |  | 1200-1500 | SEQUENTIAL | 12000 |

| RAID GROUP INFORMATION TABLE ||||||
|---|---|---|---|---|---|
| RAID GROUP# | THE NUMBER OF AVAILABLE LDEVs | THE NUMBER OF USED LDEVs | PROCESSABLE IOPS | TIME ZONE | RAID GROUP PI |
| 1-1 | 4 | 0 | 72000 | 0000-0300 | 0 |
|  | 4 | 0 | 72000 | 0300-0600 | 0 |
|  | 4 | 0 | 72000 | 0600-0900 | 0 |
|  | 4 | 0 | 72000 | 0900-01200 | 0 |
|  | 4 | 0 | 72000 | 1200-1500 | 0 |
|  | 4 | 0 | 72000 | 1500-1800 | 0 |
|  | 4 | 0 | 72000 | 1800-2100 | 0 |
|  | 4 | 0 | 72000 | 2100-2400 | 0 |
| 1-2 | 4 | 0 | 60000 | 0000-0300 | 0 |
|  | 4 | 0 | 60000 | 0300-0600 | 0 |
|  | 4 | 0 | 60000 | 0600-0900 | 0 |
|  | 4 | 0 | 60000 | 0900-01200 | 0 |
|  | 4 | 0 | 60000 | 1200-1500 | 0 |
|  | 4 | 0 | 60000 | 1500-1800 | 0 |
|  | 4 | 0 | 60000 | 1800-2100 | 0 |
|  | 4 | 0 | 60000 | 2100-2400 | 0 |
| 1-3 | 8 | 0 | 48000 | 0000-0300 | 0 |
|  | 8 | 0 | 48000 | 0300-0600 | 0 |
|  | 8 | 0 | 48000 | 0600-0900 | 0 |
|  | 8 | 0 | 48000 | 0900-01200 | 0 |
|  | 8 | 0 | 48000 | 1200-1500 | 0 |
|  | 8 | 0 | 48000 | 1500-1800 | 0 |
|  | 8 | 0 | 48000 | 1800-2100 | 0 |
|  | 8 | 0 | 48000 | 2100-2400 | 0 |

| LDEV INFORMATION TABLE | | | | | | |
|---|---|---|---|---|---|---|
| LDEV NUMBER | CONNECTING NUMBER | LU NAME | RAID GROUP NUMBER | TIME ZONE | ACCESS PATTERN | LDEV-PI |
| 1 | 1 | LU 1 | 1-1 | 0900-1200 | SEQUENTIAL | 12000 |
| 1 | 1 | LU 1 | 1-1 | 1200-1500 | RANDOM | 12000 |
| 2 | 2 | LU 1 | | 0900-1200 | SEQUENTIAL | 12000 |
| 2 | 2 | LU 1 | | 1200-1500 | RANDOM | 12000 |
| 3 | 1 | LU 2 | | 0900-1200 | RANDOM | 8000 |
| 3 | 1 | LU 2 | | 1200-1500 | RANDOM | 8000 |
| 4 | 2 | LU 2 | | 0900-1200 | RANDOM | 8000 |
| 4 | 2 | LU 2 | | 1200-1500 | RANDOM | 8000 |
| 5 | 3 | LU 2 | | 0900-1200 | RANDOM | 8000 |
| 5 | 3 | LU 2 | | 1200-1500 | RANDOM | 8000 |
| 6 | 1 | LU 3 | | 0900-1200 | SEQUENTIAL | 24000 |
| 6 | 1 | LU 3 | | 1200-1500 | SEQUENTIAL | 12000 |
| 7 | 2 | LU 3 | | 0900-1200 | SEQUENTIAL | 24000 |
| 7 | 2 | LU 3 | | 1200-1500 | SEQUENTIAL | 12000 |
| 8 | 3 | LU 3 | | 0900-1200 | SEQUENTIAL | 24000 |
| 8 | 3 | LU 3 | | 1200-1500 | SEQUENTIAL | 12000 |
| 9 | 4 | LU 3 | | 0900-1200 | SEQUENTIAL | 24000 |
| 9 | 4 | LU 3 | | 1200-1500 | SEQUENTIAL | 12000 |

| RAID GROUP INFORMATION TABLE |||||| 
|---|---|---|---|---|---|
| RAID GROUP# | THE NUMBER OF AVAILABLE LDEVs | THE NUMBER OF USED LDEVs | PROCESSABLE IOPS | TIME ZONE | RAID GROUP PI |
| 1-1 | 4 | 1 | 72000 | 0000-0300 | 0 |
| | 4 | 1 | 72000 | 0300-0600 | 0 |
| | 4 | 1 | 72000 | 0600-0900 | 0 |
| | 4 | 1 | 72000 | 0900-01200 | 12000 |
| | 4 | 1 | 72000 | 1200-1500 | 12000 |
| | 4 | 1 | 72000 | 1500-1800 | 0 |
| | 4 | 1 | 72000 | 1800-2100 | 0 |
| | 4 | 1 | 72000 | 2100-2400 | 0 |
| 1-2 | 4 | 0 | 60000 | 0000-0300 | 0 |
| | 4 | 0 | 60000 | 0300-0600 | 0 |
| | 4 | 0 | 60000 | 0600-0900 | 0 |
| | 4 | 0 | 60000 | 0900-01200 | 0 |
| | 4 | 0 | 60000 | 1200-1500 | 0 |
| | 4 | 0 | 60000 | 1500-1800 | 0 |
| | 4 | 0 | 60000 | 1800-2100 | 0 |
| | 4 | 0 | 60000 | 2100-2400 | 0 |
| 1-3 | 8 | 0 | 48000 | 0000-0300 | 0 |
| | 8 | 0 | 48000 | 0300-0600 | 0 |
| | 8 | 0 | 48000 | 0600-0900 | 0 |
| | 8 | 0 | 48000 | 0900-01200 | 0 |
| | 8 | 0 | 48000 | 1200-1500 | 0 |
| | 8 | 0 | 48000 | 1500-1800 | 0 |
| | 8 | 0 | 48000 | 1800-2100 | 0 |
| | 8 | 0 | 48000 | 2100-2400 | 0 |

| | |
|---|---|
| VARIANCE IN THE CASE WHERE LDEV #1 IS ASSOCIATED WITH RAID GROUP 1-1 | 11,000,000 |
| VARIANCE IN THE CASE WHERE LDEV #1 IS ASSOCIATED WITH RAID GROUP 1-2 | 11,000,000 |
| VARIANCE IN THE CASE WHERE LDEV #1 IS ASSOCIATED WITH RAID GROUP 1-3 | 11,000,000 |

ALLOCATE LDEV #1 TO FIRST PROCESSED RAID GROUP 1-1

| LDEV INFORMATION TABLE | | | | | | T70 |
|---|---|---|---|---|---|---|
| LDEV NUMBER | CONNECTING NUMBER | LU NAME | RAID GROUP NUMBER | TIME ZONE | ACCESS PATTERN | LDEV-PI |
| 1 | 1 | LU 1 | 1-1 | 0900-1200 | SEQUENTIAL | 12000 |
| 1 | 1 | LU 1 | 1-1 | 1200-1500 | RANDOM | 12000 |
| 2 | 2 | LU 1 | 1-2 | 0900-1200 | SEQUENTIAL | 12000 |
| 2 | 2 | LU 1 | 1-2 | 1200-1500 | RANDOM | 12000 |
| 3 | 1 | LU 2 | | 0900-1200 | RANDOM | 8000 |
| 3 | 1 | LU 2 | | 1200-1500 | RANDOM | 8000 |
| 4 | 2 | LU 2 | | 0900-1200 | RANDOM | 8000 |
| 4 | 2 | LU 2 | | 1200-1500 | RANDOM | 8000 |
| 5 | 3 | LU 2 | | 0900-1200 | RANDOM | 8000 |
| 5 | 3 | LU 2 | | 1200-1500 | RANDOM | 8000 |
| 6 | 1 | LU 3 | | 0900-1200 | SEQUENTIAL | 24000 |
| 6 | 1 | LU 3 | | 1200-1500 | SEQUENTIAL | 12000 |
| 7 | 2 | LU 3 | | 0900-1200 | SEQUENTIAL | 24000 |
| 7 | 2 | LU 3 | | 1200-1500 | SEQUENTIAL | 12000 |
| 8 | 3 | LU 3 | | 0900-1200 | SEQUENTIAL | 24000 |
| 8 | 3 | LU 3 | | 1200-1500 | SEQUENTIAL | 12000 |
| 9 | 4 | LU 3 | | 0900-1200 | SEQUENTIAL | 24000 |
| 9 | 4 | LU 3 | | 1200-1500 | SEQUENTIAL | 12000 |

| RAID GROUP INFORMATION TABLE ||||||
|---|---|---|---|---|---|
| RAID GROUP# | THE NUMBER OF AVAILABLE LDEVs | THE NUMBER OF USED LDEVs | PROCESSABLE IOPS | TIME ZONE | RAID GROUP PI |
| 1-1 | 4 | 1 | 72000 | 0000-0300 | 0 |
|  | 4 | 1 | 72000 | 0300-0600 | 0 |
|  | 4 | 1 | 72000 | 0600-0900 | 0 |
|  | 4 | 1 | 72000 | 0900-01200 | 12000 |
|  | 4 | 1 | 72000 | 1200-1500 | 12000 |
|  | 4 | 1 | 72000 | 1500-1800 | 0 |
|  | 4 | 1 | 72000 | 1800-2100 | 0 |
|  | 4 | 1 | 72000 | 2100-2400 | 0 |
| 1-2 | 4 | 1 | 60000 | 0000-0300 | 0 |
|  | 4 | 1 | 60000 | 0300-0600 | 0 |
|  | 4 | 1 | 60000 | 0600-0900 | 0 |
|  | 4 | 1 | 60000 | 0900-01200 | 12000 |
|  | 4 | 1 | 60000 | 1200-1500 | 12000 |
|  | 4 | 1 | 60000 | 1500-1800 | 0 |
|  | 4 | 1 | 60000 | 1800-2100 | 0 |
|  | 4 | 1 | 60000 | 2100-2400 | 0 |
| 1-3 | 8 | 0 | 48000 | 0000-0300 | 0 |
|  | 8 | 0 | 48000 | 0300-0600 | 0 |
|  | 8 | 0 | 48000 | 0600-0900 | 0 |
|  | 8 | 0 | 48000 | 0900-01200 | 0 |
|  | 8 | 0 | 48000 | 1200-1500 | 0 |
|  | 8 | 0 | 48000 | 1500-1800 | 0 |
|  | 8 | 0 | 48000 | 1800-2100 | 0 |
|  | 8 | 0 | 48000 | 2100-2400 | 0 |

| | |
|---|---|
| VARIANCE IN THE CASE WHERE LDEV #2 IS ASSOCIATED WITH RAID GROUP 1-1 | 27,750,000 |
| VARIANCE IN THE CASE WHERE LDEV #2 IS ASSOCIATED WITH RAID GROUP 1-2 | 20,000,000 |
| VARIANCE IN THE CASE WHERE LDEV #2 IS ASSOCIATED WITH RAID GROUP 1-3 | 20,000,000 |

ALLOCATE LDEV #2 TO FIRST PROCESSED RAID GROUP 1-2 OUT OF RAID GROUP 1-2, 1-3 IN WHICH VARIANCE IS MINIMUM

LDEV INFORMATION TABLE — T70

| LDEV NUMBER | CONNECTING NUMBER | LU NAME | RAID GROUP NUMBER | TIME ZONE | ACCESS PATTERN | LDEV-PI |
|---|---|---|---|---|---|---|
| 1 | 1 | LU 1 | 1-1 | 0900-1200 | SEQUENTIAL | 12000 |
| 1 | 1 | LU 1 | 1-1 | 1200-1500 | RANDOM | 12000 |
| 2 | 2 | LU 1 | 1-2 | 0900-1200 | SEQUENTIAL | 12000 |
| 2 | 2 | LU 1 | 1-2 | 1200-1500 | RANDOM | 12000 |
| 3 | 1 | LU 2 | 1-3 | 0900-1200 | RANDOM | 8000 |
| 3 | 1 | LU 2 | 1-3 | 1200-1500 | RANDOM | 8000 |
| 4 | 2 | LU 2 |  | 0900-1200 | RANDOM | 8000 |
| 4 | 2 | LU 2 |  | 1200-1500 | RANDOM | 8000 |
| 5 | 3 | LU 2 |  | 0900-1200 | RANDOM | 8000 |
| 5 | 3 | LU 2 |  | 1200-1500 | RANDOM | 8000 |
| 6 | 1 | LU 3 |  | 0900-1200 | SEQUENTIAL | 24000 |
| 6 | 1 | LU 3 |  | 1200-1500 | SEQUENTIAL | 12000 |
| 7 | 2 | LU 3 |  | 0900-1200 | SEQUENTIAL | 24000 |
| 7 | 2 | LU 3 |  | 1200-1500 | SEQUENTIAL | 12000 |
| 8 | 3 | LU 3 |  | 0900-1200 | SEQUENTIAL | 24000 |
| 8 | 3 | LU 3 |  | 1200-1500 | SEQUENTIAL | 12000 |
| 9 | 4 | LU 3 |  | 0900-1200 | SEQUENTIAL | 24000 |
| 9 | 4 | LU 3 |  | 1200-1500 | SEQUENTIAL | 12000 |

| RAID GROUP INFORMATION TABLE | | | | | |
|---|---|---|---|---|---|
| RAID GROUP# | THE NUMBER OF AVAILABLE LDEVs | THE NUMBER OF USED LDEVs | PROCESSABLE IOPS | TIME ZONE | RAID GROUP PI |
| 1-1 | 4 | 1 | 72000 | 0000-0300 | 0 |
| | 4 | 1 | 72000 | 0300-0600 | 0 |
| | 4 | 1 | 72000 | 0600-0900 | 0 |
| | 4 | 1 | 72000 | 0900-01200 | 12000 |
| | 4 | 1 | 72000 | 1200-1500 | 12000 |
| | 4 | 1 | 72000 | 1500-1800 | 0 |
| | 4 | 1 | 72000 | 1800-2100 | 0 |
| | 4 | 1 | 72000 | 2100-2400 | 0 |
| 1-2 | 4 | 1 | 60000 | 0000-0300 | 0 |
| | 4 | 1 | 60000 | 0300-0600 | 0 |
| | 4 | 1 | 60000 | 0600-0900 | 0 |
| | 4 | 1 | 60000 | 0900-01200 | 12000 |
| | 4 | 1 | 60000 | 1200-1500 | 12000 |
| | 4 | 1 | 60000 | 1500-1800 | 0 |
| | 4 | 1 | 60000 | 1800-2100 | 0 |
| | 4 | 1 | 60000 | 2100-2400 | 0 |
| 1-3 | 8 | 1 | 48000 | 0000-0300 | 0 |
| | 8 | 1 | 48000 | 0300-0600 | 0 |
| | 8 | 1 | 48000 | 0600-0900 | 0 |
| | 8 | 1 | 48000 | 0900-01200 | 8000 |
| | 8 | 1 | 48000 | 1200-1500 | 8000 |
| | 8 | 1 | 48000 | 1500-1800 | 0 |
| | 8 | 1 | 48000 | 1800-2100 | 0 |
| | 8 | 1 | 48000 | 2100-2400 | 0 |

| | |
|---|---|
| VARIANCE IN THE CASE WHERE LDEV #3 IS ASSOCIATED WITH RAID GROUP 1-1 | 38,222,222 |
| VARIANCE IN THE CASE WHERE LDEV #3 IS ASSOCIATED WITH RAID GROUP 1-2 | 38,222,222 |
| VARIANCE IN THE CASE WHERE LDEV #3 IS ASSOCIATED WITH RAID GROUP 1-3 | 22,222,222 |

ALLOCATE LDEV #3 TO RAID GROUP 1-3 IN WHICH VARIANCE IS MINIMUM

| LDEV INFORMATION TABLE ||||||| T70 |
|---|---|---|---|---|---|---|
| LDEV NUMBER | CONNECTING NUMBER | LU NAME | RAID GROUP NUMBER | TIME ZONE | ACCESS PATTERN | LDEV-PI |
| 1 | 1 | LU 1 | 1-1 | 0900-1200 | SEQUENTIAL | 12000 |
| 1 | 1 | LU 1 | 1-1 | 1200-1500 | RANDOM | 12000 |
| 2 | 2 | LU 1 | 1-2 | 0900-1200 | SEQUENTIAL | 12000 |
| 2 | 2 | LU 1 | 1-2 | 1200-1500 | RANDOM | 12000 |
| 3 | 1 | LU 2 | 1-3 | 0900-1200 | RANDOM | 8000 |
| 3 | 1 | LU 2 | 1-3 | 1200-1500 | RANDOM | 8000 |
| 4 | 2 | LU 2 | 1-3 | 0900-1200 | RANDOM | 8000 |
| 4 | 2 | LU 2 | 1-3 | 1200-1500 | RANDOM | 8000 |
| 5 | 3 | LU 2 | | 0900-1200 | RANDOM | 8000 |
| 5 | 3 | LU 2 | | 1200-1500 | RANDOM | 8000 |
| 6 | 1 | LU 3 | | 0900-1200 | SEQUENTIAL | 24000 |
| 6 | 1 | LU 3 | | 1200-1500 | SEQUENTIAL | 12000 |
| 7 | 2 | LU 3 | | 0900-1200 | SEQUENTIAL | 24000 |
| 7 | 2 | LU 3 | | 1200-1500 | SEQUENTIAL | 12000 |
| 8 | 3 | LU 3 | | 0900-1200 | SEQUENTIAL | 24000 |
| 8 | 3 | LU 3 | | 1200-1500 | SEQUENTIAL | 12000 |
| 9 | 4 | LU 3 | | 0900-1200 | SEQUENTIAL | 24000 |
| 9 | 4 | LU 3 | | 1200-1500 | SEQUENTIAL | 12000 |

FIG. 29

RAID GROUP INFORMATION TABLE — T50

| RAID GROUP# | THE NUMBER OF AVAILABLE LDEVs | THE NUMBER OF USED LDEVs | PROCESSABLE IOPS | TIME ZONE | RAID GROUP PI |
|---|---|---|---|---|---|
| 1-1 | 4 | 1 | 72000 | 0000-0300 | 0 |
| | 4 | 1 | 72000 | 0300-0600 | 0 |
| | 4 | 1 | 72000 | 0600-0900 | 0 |
| | 4 | 1 | 72000 | 0900-01200 | 12000 |
| | 4 | 1 | 72000 | 1200-1500 | 12000 |
| | 4 | 1 | 72000 | 1500-1800 | 0 |
| | 4 | 1 | 72000 | 1800-2100 | 0 |
| | 4 | 1 | 72000 | 2100-2400 | 0 |
| 1-2 | 4 | 1 | 60000 | 0000-0300 | 0 |
| | 4 | 1 | 60000 | 0300-0600 | 0 |
| | 4 | 1 | 60000 | 0600-0900 | 0 |
| | 4 | 1 | 60000 | 0900-01200 | 12000 |
| | 4 | 1 | 60000 | 1200-1500 | 12000 |
| | 4 | 1 | 60000 | 1500-1800 | 0 |
| | 4 | 1 | 60000 | 1800-2100 | 0 |
| | 4 | 1 | 60000 | 2100-2400 | 0 |
| 1-3 | 8 | 2 | 48000 | 0000-0300 | 0 |
| | 8 | 2 | 48000 | 0300-0600 | 0 |
| | 8 | 2 | 48000 | 0600-0900 | 0 |
| | 8 | 2 | 48000 | 0900-01200 | 16000 |
| | 8 | 2 | 48000 | 1200-1500 | 16000 |
| | 8 | 2 | 48000 | 1500-1800 | 0 |
| | 8 | 2 | 48000 | 1800-2100 | 0 |
| | 8 | 2 | 48000 | 2100-2400 | 0 |

| | |
|---|---|
| VARIANCE IN THE CASE WHERE LDEV #4 IS ASSOCIATED WITH RAID GROUP 1-1 | 39,555,556 |
| VARIANCE IN THE CASE WHERE LDEV #4 IS ASSOCIATED WITH RAID GROUP 1-2 | 39,555,556 |
| VARIANCE IN THE CASE WHERE LDEV #4 IS ASSOCIATED WITH RAID GROUP 1-3 | 34,222,222 |

ALLOCATE LDEV #4 TO RAID GROUP 1-3 IN WHICH VARIANCE IS MINIMUM

| LDEV INFORMATION TABLE | | | | | | T70 |
|---|---|---|---|---|---|---|
| LDEV NUMBER | CONNECTING NUMBER | LU NAME | RAID GROUP NUMBER | TIME ZONE | ACCESS PATTERN | LDEV-PI |
| 1 | 1 | LU 1 | 1-1 | 0900-1200 | SEQUENTIAL | 12000 |
| 1 | 1 | LU 1 | 1-1 | 1200-1500 | RANDOM | 12000 |
| 2 | 2 | LU 1 | 1-2 | 0900-1200 | SEQUENTIAL | 12000 |
| 2 | 2 | LU 1 | 1-2 | 1200-1500 | RANDOM | 12000 |
| 3 | 1 | LU 2 | 1-3 | 0900-1200 | RANDOM | 8000 |
| 3 | 1 | LU 2 | 1-3 | 1200-1500 | RANDOM | 8000 |
| 4 | 2 | LU 2 | 1-3 | 0900-1200 | RANDOM | 8000 |
| 4 | 2 | LU 2 | 1-3 | 1200-1500 | RANDOM | 8000 |
| 5 | 3 | LU 2 | 1-1 | 0900-1200 | RANDOM | 8000 |
| 5 | 3 | LU 2 | 1-1 | 1200-1500 | RANDOM | 8000 |
| 6 | 1 | LU 3 | | 0900-1200 | SEQUENTIAL | 24000 |
| 6 | 1 | LU 3 | | 1200-1500 | SEQUENTIAL | 12000 |
| 7 | 2 | LU 3 | | 0900-1200 | SEQUENTIAL | 24000 |
| 7 | 2 | LU 3 | | 1200-1500 | SEQUENTIAL | 12000 |
| 8 | 3 | LU 3 | | 0900-1200 | SEQUENTIAL | 24000 |
| 8 | 3 | LU 3 | | 1200-1500 | SEQUENTIAL | 12000 |
| 9 | 4 | LU 3 | | 0900-1200 | SEQUENTIAL | 24000 |
| 9 | 4 | LU 3 | | 1200-1500 | SEQUENTIAL | 12000 |

LDEV INFORMATION TABLE (T70)

| LDEV NUMBER | CONNECTING NUMBER | LU NAME | RAID GROUP NUMBER | TIME ZONE | ACCESS PATTERN | LDEV-PI |
|---|---|---|---|---|---|---|
| 1 | 1 | LU 1 | 1-1 | 0900-1200 | SEQUENTIAL | 12000 |
| 1 | 1 | LU 1 | 1-1 | 1200-1500 | RANDOM | 12000 |
| 2 | 2 | LU 1 | 1-2 | 0900-1200 | SEQUENTIAL | 12000 |
| 2 | 2 | LU 1 | 1-2 | 1200-1500 | RANDOM | 12000 |
| 3 | 1 | LU 2 | 1-3 | 0900-1200 | RANDOM | 8000 |
| 3 | 1 | LU 2 | 1-3 | 1200-1500 | RANDOM | 8000 |
| 4 | 2 | LU 2 | 1-3 | 0900-1200 | RANDOM | 8000 |
| 4 | 2 | LU 2 | 1-3 | 1200-1500 | RANDOM | 8000 |
| 5 | 3 | LU 2 | 1-1 | 0900-1200 | RANDOM | 8000 |
| 5 | 3 | LU 2 | 1-1 | 1200-1500 | RANDOM | 8000 |
| 6 | 1 | LU 3 | 1-2 | 0900-1200 | SEQUENTIAL | 24000 |
| 6 | 1 | LU 3 | 1-2 | 1200-1500 | SEQUENTIAL | 12000 |
| 7 | 2 | LU 3 | 1-2 | 0900-1200 | SEQUENTIAL | 24000 |
| 7 | 2 | LU 3 | 1-2 | 1200-1500 | SEQUENTIAL | 12000 |
| 8 | 3 | LU 3 | 1-2 | 0900-1200 | SEQUENTIAL | 24000 |
| 8 | 3 | LU 3 | 1-2 | 1200-1500 | SEQUENTIAL | 12000 |
| 9 | 4 | LU 3 | 1-3 | 0900-1200 | SEQUENTIAL | 24000 |
| 9 | 4 | LU 3 | 1-3 | 1200-1500 | SEQUENTIAL | 12000 |

FIG. 33

RAID GROUP INFORMATION TABLE  T50

| RAID GROUP# | THE NUMBER OF AVAILABLE LDEVs | THE NUMBER OF USED LDEVs | PROCESSABLE IOPS | TIME ZONE | RAID GROUP PI |
|---|---|---|---|---|---|
| 1-1 | 4 | 2 | 72000 | 0000-0300 | 0 |
|  | 4 | 2 | 72000 | 0300-0600 | 0 |
|  | 4 | 2 | 72000 | 0600-0900 | 0 |
|  | 4 | 2 | 72000 | 0900-01200 | 20000 |
|  | 4 | 2 | 72000 | 1200-1500 | 20000 |
|  | 4 | 2 | 72000 | 1500-1800 | 0 |
|  | 4 | 2 | 72000 | 1800-2100 | 0 |
|  | 4 | 2 | 72000 | 2100-2400 | 0 |
| 1-2 | 4 | 4 | 60000 | 0000-0300 | 0 |
|  | 4 | 4 | 60000 | 0300-0600 | 0 |
|  | 4 | 4 | 60000 | 0600-0900 | 0 |
|  | 4 | 4 | 60000 | 0900-01200 | 36000 |
|  | 4 | 4 | 60000 | 1200-1500 | 24000 |
|  | 4 | 4 | 60000 | 1500-1800 | 0 |
|  | 4 | 4 | 60000 | 1800-2100 | 0 |
|  | 4 | 4 | 60000 | 2100-2400 | 0 |
| 1-3 | 8 | 3 | 48000 | 0000-0300 | 0 |
|  | 8 | 3 | 48000 | 0300-0600 | 0 |
|  | 8 | 3 | 48000 | 0600-0900 | 0 |
|  | 8 | 3 | 48000 | 0900-01200 | 40000 |
|  | 8 | 3 | 48000 | 1200-1500 | 28000 |
|  | 8 | 3 | 48000 | 1500-1800 | 0 |
|  | 8 | 3 | 48000 | 1800-2100 | 0 |
|  | 8 | 3 | 48000 | 2100-2400 | 0 |

FIG. 36

RAID GROUP INFORMATION TABLE T50

| RAID GROUP# | THE NUMBER OF AVAILABLE LDEVs | THE NUMBER OF USED LDEVs | PROCESSABLE IOPS | TIME ZONE | RAID GROUP PI |
|---|---|---|---|---|---|
| 1-1 | 4 | 1 | 72000 | 0000-0300 | 0 |
|  | 4 | 1 | 72000 | 0300-0600 | 0 |
|  | 4 | 1 | 72000 | 0600-0900 | 0 |
|  | 4 | 1 | 72000 | 0900-01200 | 12000 |
|  | 4 | 1 | 72000 | 1200-1500 | 12000 |
|  | 4 | 1 | 72000 | 1500-1800 | 0 |
|  | 4 | 1 | 72000 | 1800-2100 | 0 |
|  | 4 | 1 | 72000 | 2100-2400 | 0 |
| 1-2 | 4 | 0 | 60000 | 0000-0300 | 0 |
|  | 4 | 0 | 60000 | 0300-0600 | 0 |
|  | 4 | 0 | 60000 | 0600-0900 | 0 |
|  | 4 | 0 | 60000 | 0900-01200 | 0 |
|  | 4 | 0 | 60000 | 1200-1500 | 0 |
|  | 4 | 0 | 60000 | 1500-1800 | 0 |
|  | 4 | 0 | 60000 | 1800-2100 | 0 |
|  | 4 | 0 | 60000 | 2100-2400 | 0 |
| 1-3 | 8 | 0 | 48000 | 0000-0300 | 0 |
|  | 8 | 0 | 48000 | 0300-0600 | 0 |
|  | 8 | 0 | 48000 | 0600-0900 | 0 |
|  | 8 | 0 | 48000 | 0900-01200 | 0 |
|  | 8 | 0 | 48000 | 1200-1500 | 0 |
|  | 8 | 0 | 48000 | 1500-1800 | 0 |
|  | 8 | 0 | 48000 | 1800-2100 | 0 |
|  | 8 | 0 | 48000 | 2100-2400 | 0 |

COMPUTING VARIANCE

EXCESS IOPS = PROCESSABLE IOPS − RAID GROUP PI

AVERAGE VALUE =
$(1 / \text{NUMBER OF ALL RECORDS IN TABLE}) \times \Sigma \text{EXCESS IOPS}$ VARIANCE =
$(1 / \text{NUMBER OF ALL RECORDS IN TABLE}) \times \Sigma (\text{EXCESS IOPS} - \text{AVERAGE VALUE})^2$

STORAGE CONTROLLER, AND LOGICAL VOLUME FORMATION METHOD FOR THE STORAGE CONTROLLER

CROSS-REFERENCE TO RELATED APPLICATION

This application relates to and claims priority from Japanese Patent Application No. 2006-304526 filed on Nov. 9, 2006, the entire disclosure of which is incorporated herein by reference.

BACKGROUND OF THE INVENTION

1. Field of the Invention

The present invention relates to a storage controller and a logical volume formation method for the storage controller.

2. Description of the Related Art

In the government, the public office, local governments, companies, educational institutions and the like, for example, relatively large storage systems are used to manage data, in order to handle large amounts of various data. Such storage systems are constituted by a storage controller such as a disk array device or the like. A disk array device is configured by disposing a number of disk drives in the form of array, and provides a storage region based on, for example, RAID (Redundant Array of Independent Disks).

A plurality of physical storage devices are generated by grouping a physical storage region provided by a disk drive group. At least one or more logical storage device is formed in each of the physical storage devices. The logical storage devices are allocated to LUN (Logical Unit Number) accessed from a host computer ("host", hereinafter), and then provided to the host. The host writes data into the logical storage devices or reads the data from the logical storage devices, and thereby executes work processing.

As a first conventional technology, there is known a technology in which, in order to appropriately allocate a logical storage device to the host, a logical storage device is selected, in a concentrated manner, from one physical storage device, or logical storage devices are selected from a plurality of physical storage devices respectively (Japanese Patent Application Laid-Open No. 2004-126867).

As a second conventional technology, there is known a technology in which a logical storage device, which is sequentially accessed, is disposed in a physical storage device having responsive performance to sequential access (Japanese Patent Application Laid-Open No. 2003-271425).

As a third conventional technology, there is known a technology in which logical storage devices are disposed in physical storage devices respectively in accordance with the access frequency (Japanese Patent Application Laid-Open No. H7-93109).

Usually, one logical storage device is allocated to one LUN. However, the storage capacity required by a host has been increasing recently, thus there is the case in which a plurality of logical storage devices are allocated to one LUN. Specifically, one logical volume that is recognized as a target of access from the host is virtually constructed as an assembly of a plurality of logical storage devices. For example, in the case where the storage capacity required by the host is so large that one logical storage device is not enough, sometimes one logical volume is constructed with a plurality of logical storage devices.

On the other hand, there are a plurality of types of access patterns when the host accesses a logical volume. One of the types is random access and one of the other types is sequential access. In the case of the random access, the host averagely accesses all address spaces within a logical volume. In the case of the sequential access, the host accesses a specific address space within a logical volume in a concentrated manner.

However, neither one of the above conventional technologies considers virtual construction of one logical volume from a plurality of logical storage devices. Moreover, neither one of the above conventional technologies considers how the destination to allocate a logical storage device is determined in accordance with different types of access patterns. Each of the above conventional technologies lacks consideration of the random access in particular.

Furthermore, even if there are accesses from the same host, the access pattern might change depending on the time zone. For example, depending on the quality of the work processing executed on the host, an access pattern in a certain time zone might change to a random access, and an access pattern in a different zone might change to a sequential access.

Therefore, responsive performance at the time of a random access cannot be improved by only determining the destination to allocate a logical storage device in the case of only the sequential access, or determining the destination to allocate a logical storage device based on the access frequency.

SUMMARY OF THE INVENTION

The present invention is contrived in view of the above problems, and an object is to provide a storage controller, which is capable of appropriately selecting, based on the type of access pattern and a performance indicator set in a logical volume beforehand when configuring the logical volume by using a plurality of logical storage devices, a physical storage device provided with the logical storage devices, and to provide a logical volume formation method for the storage controller. Other object of the present invention is to provide a storage controller, which distributes to allocate a plurality of logical storage devices associated with a logical volume to a plurality of physical storage devices to attempt to even the loads in the physical storage devices so that the responsive performance at the time of random access can be improved, and to provide a logical volume formation method for the storage controller. In addition to the above objects, yet other object of the present invention is to provide a storage controller, which allocates logical storage devices of the first order to separate physical storage devices as much as possible to attempt to disperse the loads in the physical storage devices so that the responsive performance can be improved, and to provide a logical volume formation method for the storage controller. Yet other objects of the present invention will become clear from the following descriptions of embodiments.

In order to achieve the above objects, the storage controller according to the present invention, which provides a host device with a logical volume accessed by the host device, has: a plurality of storage drives; a plurality of physical storage devices which are formed by grouping physical storage regions provided in each of the storage drives; a plurality of logical storage devices, at least one or more of which are set in a physical storage region provided in each of the physical storage devices; and a control section which associates a plurality of predetermined logical storage devices of the logical storage devices with the logical volume, wherein the control section selects the physical storage devices to which the plurality of predetermined logical storage devices are allocated, in accordance with whether the type of access pattern is random access or sequential access when the host device accesses the logical volume, and in accordance with a first performance indicator which is set in the logical volume beforehand.

The control section can compute a second performance indicator of each of the plurality of predetermined logical storage devices in accordance with the type of access pattern and the first performance indicator, compute a third performance indicator of each of the physical storage devices on the basis of the second performance indicator, and select the physical storage devices to which the plurality of predetermined logical storage devices are allocated, so that variances of the third performance indicators becomes small.

(1) When the access pattern is the random access, the control section can (1-1) compute the second performance indicator by dividing the first performance indicator by the number of the predetermined logical storage devices configuring the logical volume, and (1-2) compute, for each of the predetermined logical storage devices, the total value of the second performance indicators as the third performance indicator for the case where the predetermined logical storage devices are allocated to the physical storage devices, and (2) when the access pattern is the sequential access, the control section can (2-1) set the first performance indicator as the second performance indicator, (2-2) set, for each of the predetermined logical storage devices, the value of the second performance indicator as the third performance indicator for the case where the predetermined logical storage devices are allocated to the physical storage devices, and (3) select the physical storage devices to which the plurality of predetermined logical storage devices are allocated, for each of the plurality of predetermined logical storage devices so that variances of the third performance indicators become minimum.

The control section can compute a second performance indicator for each of the plurality of predetermined logical storage devices in accordance with the type of access pattern and the first performance indicator, compute a third performance indicator for each of the physical storage devices on the basis of the second performance indicator, and select the physical storage devices to which the plurality of predetermined logical storage devices are allocated, so that a variance of the difference between the third performance indicator and a preset maximum value becomes small.

(1) When the access pattern is the random access, the control section can (1-1) compute the second performance indicator by dividing the first performance indicator by the number of the predetermined logical storage devices configuring the logical volume, and (1-2) compute, for each of the predetermined logical storage devices, the total value of the second performance indicators as the third performance indicator for the case where the predetermined logical storage devices are allocated to the physical storage devices, and (2) when the access pattern is the sequential access, the control section can (2-1) set the first performance indicator as the second performance indicator, (2-2) set, for each of the predetermined logical storage devices, the value of the second performance indicator as the third performance indicator for the case where the predetermined logical storage devices are allocated to the physical storage devices, and (3) select the physical storage devices to which the plurality of predetermined logical storage devices are allocated, for each of the plurality of predetermined logical storage devices so that a variance of the difference between a maximum value set for each of the physical storage devices beforehand and the third performance indicator becomes minimum.

The control section can select the physical storage devices to which the plurality of predetermined logical storage devices are allocated, in accordance with the type of access pattern for each preset predetermined time zone and the first performance indicator.

(1) When the access pattern is the random access, the control section can (1-1) compute the second performance indicator by dividing the first performance indicator by the number of the predetermined logical storage devices configuring the logical volume, and (1-2) compute, for each of the predetermined logical storage devices in the each predetermined time zone, the total value of the second performance indicators as the third performance indicator for the case where the predetermined logical storage devices are allocated to the physical storage devices, and (2) when the access pattern is the sequential access, the control section can (2-1) set the first performance indicator as the second performance indicator, (2-2) set, for each of the predetermined logical storage devices in the each predetermined time zone, the value of the second performance indicator as the third performance indicator for the case where the predetermined logical storage devices are allocated to the physical storage devices, and (3) select the physical storage devices to which the plurality of predetermined logical storage devices are allocated, for each of the plurality of predetermined logical storage devices so that variances of the third performance indicators become minimum.

In the embodiments of the present invention, orders associated with the logical volume are set for the plurality of predetermined logical storage devices respectively, and the control section distributes to allocate a predetermined logical storage device of the first order, which is the highest of the orders, to the physical storage device.

After selecting the physical storage device to which the plurality of predetermined logical storage devices are allocated, the control section can attempt to distribute to allocate the predetermined logical storage device of the first order to the physical storage devices.

In the embodiments of the present invention, the logical volume and the physical storage devices are managed in units of resource management groups which are set beforehand, and the control section can select, for each resource management group, the physical storage devices to which the plurality of predetermined logical storage devices are allocated, in accordance with the type of access pattern and the first performance indicator.

The control section can select the physical storage devices to which the plurality of predetermined logical storage devices are allocated, in consideration of destinations to allocate other predetermined plurality of logical storage devices in resource management groups other than the resource management group which is a target of processing.

In the embodiments of the present invention, if there is a first logical volume and a second logical volume that form a copy pair with each other as the logical volume, the control section can allocate a predetermined logical storage device associated with the first logical volume and a predetermined logical storage device associated with the second logical volume to separate physical storage devices as much as possible.

In a method for forming in a storage controller a logical volume to be provided to a host device, according to other aspect of the present invention, the storage controller has: a plurality of physical storage devices which are formed by grouping physical storage regions provided in each of a plurality of storage drives; and a plurality of logical storage devices, at least one or more of which are set in a physical storage region provided in each of the physical storage devices, and the method executes the steps of: managing the logical volume and the physical storage devices in units of resource management groups; acquiring the type of access pattern when the host device accesses the logical volume, i.e. either random access or sequential access, in each predetermined time zone which is set beforehand, and a first performance indicator set in the logical volume beforehand; (1-1) computing a second performance indicator by dividing the first performance indicator by the number of predetermined logical storage devices configuring the logical volume, when the access pattern is the random access; (1-2) computing, for each of the predetermined logical storage devices in the each predetermined time zone, the total value of the second performance indicators as a third performance indicator for the case where the predetermined logical storage devices are allocated to the physical storage devices, when the access pattern is the random access; (2-1) setting the first performance indicator as the second performance indicator when the access pattern is the sequential access; (2-2) setting, for each of the predetermined logical storage devices in the each predetermined time zone, the value of the second performance indicator as the third performance indicator for the case where the predetermined logical storage devices are allocated to the physical storage devices, when the access pattern is the sequential access; and (3) selecting, within the resource management groups, the physical storage devices to which the plurality of predetermined logical storage devices are allocated, for each of the plurality of predetermined logical storage devices, so that variances of the third performance indicators become minimum.

A storage system according to yet other aspect of the present invention is a storage system having: a storage controller which provides a host device with a logical volume accessed by the host device; and a management device which is connected to the storage controller, wherein the storage controller has: a plurality of storage drives; a plurality of physical storage devices which are formed by grouping physical storage regions provided in each of the storage drives; and a plurality of logical storage devices, at least one or more of which are set in a physical storage region provided in each of the physical storage devices, and the management device has a control section which gives the storage controller an instruction for associating a plurality of predetermined logical storage devices of the logical storage devices with the logical volume, and the control section selects the physical storage devices to which the plurality of predetermined logical storage devices are allocated, in accordance with whether the type of access pattern is random access or sequential access when the host device accesses the logical volume, and in accordance with a first performance indicator which is set in the logical volume beforehand.

The means, functions, and all or a part of the steps of the present invention can be configured as computer programs executed by a computer system. In the case where the entire or a part of the configuration of the present invention is configured from the computer program, the computer program can be fixed to, for example, various storage media, to be distributed, or can be transmitted via a communication network.

BRIEF DESCRIPTION OF THE DRAWINGS

FIG. 7 is an explanatory diagram showing a requirement table and a configuration table;

FIG. 8 is an explanatory diagram showing a performance table and a specification table;

FIG. 16 is an explanatory diagram showing a configuration of a table for storing information on a logical device (LDEV);

FIG. 19 is an explanatory diagram showing a method for obtaining a variance of a performance indicator of each RAID group;

FIG. 21 is an explanatory diagram showing the RAID group information table in the initial state;

FIG. 23 is an explanatory diagram showing a state in which the destination to allocate the logical device is determined based on a variance of a RAID group performance indicator;

FIG. 25 is an explanatory diagram showing a state in which the destination to allocate the logical device is determined based on a variance of a RAID group performance indicator;

FIG. 27 is an explanatory diagram showing a state in which the destination to allocate the logical device is determined based on a variance of a RAID group performance indicator;

FIG. 29 is an explanatory diagram showing a state in which the destination to allocate the logical device is determined based on a variance of a RAID group performance indicator;

FIG. 33 is an explanatory diagram showing contents of the RAID group information table in the case where the destination to allocate a logical device is determined;

FIG. 36 is an explanatory diagram showing a method for computing the variance of the RAID group performance indicator in the storage controller according to a third embodiment;

DESCRIPTION OF THE PREFERRED EMBODIMENTS

Figure 1:
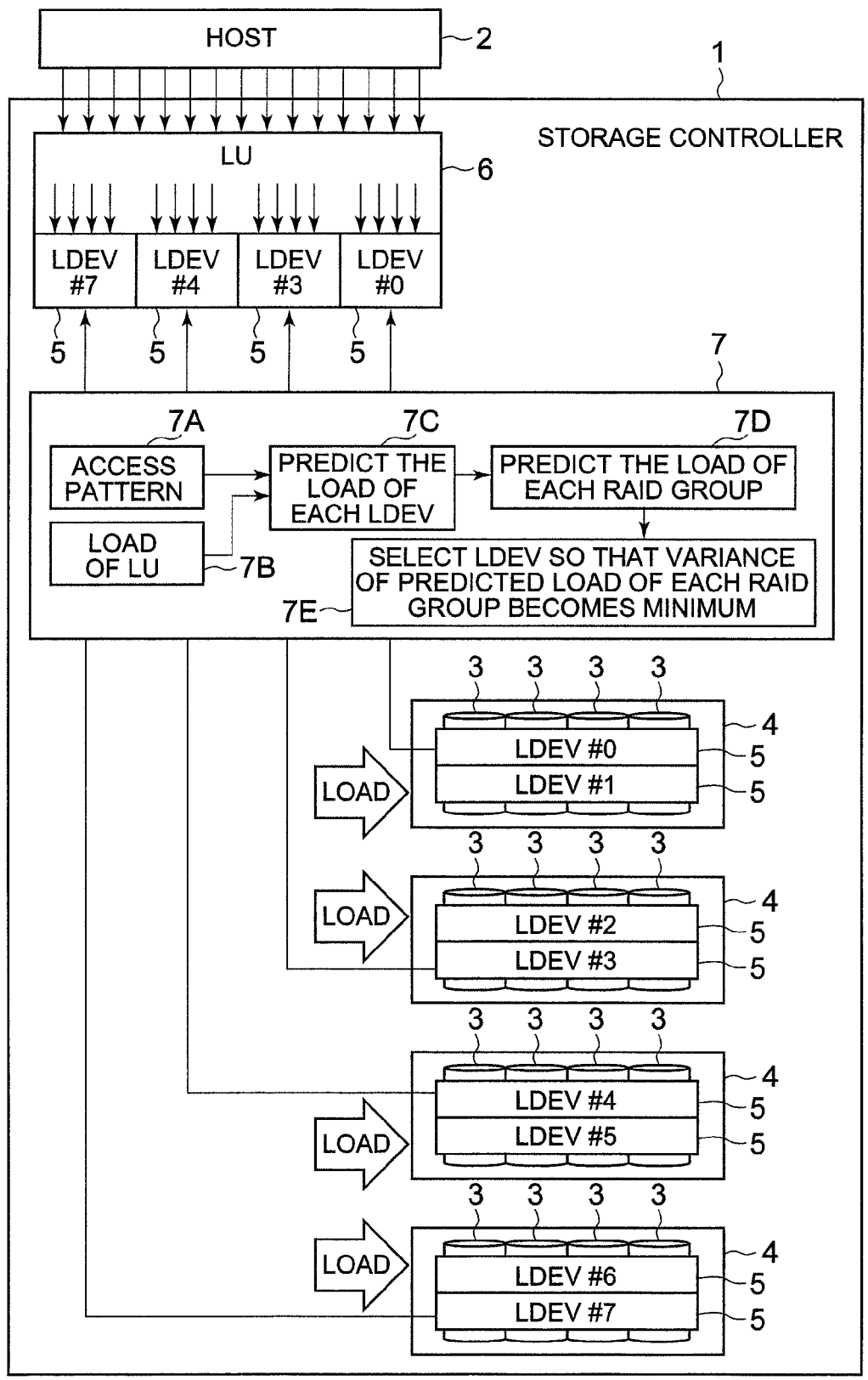
FIG. 1 is an explanatory diagram showing the entire outline of an embodiment of the present invention.

FIG. 1 is a configuration explanatory diagram showing the entire outline of an embodiment of the present invention. The detail of the present invention will become clear from each embodiment described hereinafter. A storage controller 1 of the present embodiment is connected to a host 2, which is a host device, via a communication network.

The storage controller 1 comprises, for example, a plurality of disk drives 3, a RAID group 4, logical device (sometimes referred to as "LDEV" hereinafter as an abbreviation of "Logical Device") 5, logical volume (sometimes referred to as "LU" hereinafter as an abbreviation of "Logical Unit") 6, and LU configuration control section 7. An example of an actual physical configuration of the storage controller 1 is described in detail with FIG. 2.

As a disk drive 3, which is a "storage drive", it is not always necessary to use a disk-type storage medium, thus a storage device other than a hard disk drive can be used. For example, a configuration is possible in which a semiconductor memory device (including a flash memory device), holographic memory, optical disk device, magneto-optical disk device, magnetic tape unit or the like is used as the storage drive.

Physical storage regions provided in each disk drive 3 are grouped as the RAID group 4. The RAID group 4 is to virtualize a plurality of physical storage regions into one physical storage region such as RAID 1, RAID 5, and the like. The RAID group 4 corresponds to a "physical storage device".

Each RAID group 4 can be provided with at least one or more of the logical device 5, which is a "logical storage device". In FIG. 1, two logical devices 5 are provided in each RAID group 4, but one or at least three logical devices 5 can be provided. The storage capacity of each logical device 5 can be fixed or set to variables. In the present embodiment, for explanatory convenience, all of the logical devices 5 have the same fixed storage capacity. As described in the following embodiments, the logical devices 5 are generated so as to have the same storage capacity called "basic LDEV capacity".

The logical volume 6 is recognized as a target of access from the host 2. The storage controller 1 can be provided with a plurality of logical volumes 6. In FIG. 1, for explanatory convenience, one logical volume 6 is shown.

The logical volume 6 is associated with a communication port provided in the storage controller 1, and network addresses such as an IP (Internet Protocol) address, WWN (World Wide Name) and the like are set in the logical volume 6. An application program, such as database management software or the like activated on the host 2, executes work processing by accessing the logical volume 6 to write data.

As shown in FIG. 1, the logical volume 6 is generated as an assembly of a plurality of logical devices 5. Specifically, a storage space of the logical volume 6 is configured as an assembly of storage regions provided in each logical device 5. The host 2 does not recognize that the logical volume 6 is constructed from the plurality of logical devices 5, but recognizes the logical volume 6 as a single volume. The storage regions of the logical devices 5 partially construct storage regions of the logical volume 6 in the order in which the logical devices 5 are allocated to the logical volume 6. Specifically, the logical device 5 of the first order, which is allocated to the logical volume 6 first, takes charge of the front part of the storage regions of the logical volume 6, and the logical device 5 of the second order, which is allocated to the logical volume 6 next, takes charge of a part following the front part of the storage regions of the logical volume. In this manner, the storage regions of the logical devices 5 sequentially configure the storage regions of the logical volume 6.

The LU configuration control section as a "control section" (abbreviated as "control section" hereinafter) 7 generates one logical volume 6 from the plurality of logical devices 5, and provide this generated logical volume 6 to the host 2. The control section 7 is realizes as a function within, for example, a controller having a microprocessor, memory and the like. The control section 7 can also be provided inside a different computer apparatus such as a management server, which is provided outside the storage controller 1.

When, for example, an access pattern 7A and a load 7B of the logical volume 6 are inputted by a user, the control section 7 computes a load in each logical device 5 (7C). The control section 7 then computes a load in each RAID group 4 on the basis of the predicted load in each logical device 5 (7D). The control section 7 selects the destination to allocate the logical devices 5 configuring the logical volume 6, so that the loads in the logical devices 5 are dispersed into the RAID groups 4 (7E).

The load 7B of the logical volume 6 corresponds to "first performance indicator". The load 7B indicates the maximum value of load expected for the logical volume 6. As a performance indicator, for example, the number of data inputs/outputs per unit time (IOPS: Input/Output Per Second) can be used.

The access pattern 7A means a pattern of an access request issued from the host 2. Specifically, the access pattern 7A indicates the type of access made by the host 2, the type being random access or sequential access. Random access means that the host 2 randomly accesses the storage regions inside the logical volume 6, while the sequential access means that the host 2 continuously accesses a specific storage region inside the host volume 6.

The control section 7 computes a load in each of the logical devices 5 (second performance indicator) configuring the logical volume 6, on the basis of the access pattern 7A and the load expected for the logical volume 6 (first performance indicator). The logical devices 5 configuring the logical volume 6 correspond are same as "predetermined plurality of logical devices".

For example, in the case where the pattern of access made to the logical volume 6 from the host 2 is the random access, the control section 7 divides the first performance indicator related to the logical volume 6 by the number of logical devices configuring the logical volume 6, and thereby computes the second performance indicator related to each logical device 5.

In the case of the example shown in FIG. 1, if the first performance indicator is "100", the second performance indicator is "25 (=100÷4)". In the case of the random access, it is expected that all storage regions of the logical volume 6 are accessed evenly, thus, by dividing the first performance indicator by the number of logical devices 5 configuring the logical volume 6, the second performance indicator can be obtained.

In the case where the pattern of access made to the logical volume 6 from the host 2 is the sequential access, the control section 7 uses the value of the first performance indicator of the logical volume 6 as the value of second performance indicator of each logical device 5. In the previous example the value of the second performance indicator is "100". In the case of the sequential access, any of the logical devices 5 can be accessed from the host 2 in a concentrated manner. Therefore, the second performance indicator of each logical device 5 can be set to the same value as the first performance indicator of the logical volume 6.

The control section 7 computes a third performance indicator of each RAID group 4 on the basis of the second performance indicator which is computed in accordance with the type of access pattern. In the case of the random access, the control section 7 adds up the second performance indicators of the logical devices 5 arranged in a RAID group 4, and thereby obtains the third performance indicator related to this RAID group 4. Specifically, in the above example, in the case of the RAID group 4 provided with only one logical device 5 associated with the logical volume 6, the third performance indicator for such case is "25". If the number of logical devices 5 associated with the logical volume 6 is 2 in this RAID group 4, the third performance indicator of this RAID group 4 is "50 (=25+25)".

On the other hand, in the case of the sequential access, the control section 7 uses the value of the second performance indicator of one logical device 5 as the value of the third performance indicator of the RAID group 4 regardless of whether the number of logical devices 5 associated with the logical volume 6 in the RAID group 4 is singular or plural. In terms of the above example, in the case of the sequential access the second performance indicator is "100", thus the third performance indicator of the RAID group 4 with at least one or more logical devices 5 associated with the logical volume 6 is "100". Even if this RAID group 4 is provided with a plurality of logical devices 5 whose second performance indicators are "100", the second performance indicators are not added up.

In this manner, the control section 7 predicts the load in each RAID group 4 (third performance indicator) in accordance with the type of access pattern. As will be clear from the following embodiments, the control section 7 can also compute the third performance indicator of each RAID group 4 for each preset time zone.

Finally, the control section 7 determines the destination to allocate the logical devices 5 such that the third performance indicator of each RAID group 4 becomes a small value. The destination to allocate the logical devices 5 means the RAID group 4 which is provided with the logical devices 5 associated with the logical volume 6.

For example, the control section 7 distributes to allocate the logical devices 5, which are associated with the logical volume 6, to each RAID group 4 so that the third performance indicators of the RAID groups 4 become substantially equal to one another. In other words, the control section 7 selects RAID groups 4 provided with the logical devices 5, so that variances of the third performance indicators become minimum.

Therefore, in the case of a logical volume 6 which is randomly accessed a number of times, it is more likely that the logical devices 5 configuring this logical volume 6 are distributed and allocated to a plurality of RAID groups 4. On the other hand, in the case of a logical volume 6 which is sequentially accessed a number of times, it is more likely that the logical devices 5 configuring this logical volume 6 are allocated to a specific RAID group 4 in a concentrated manner.

It should be noted that, as will be clear from the following embodiments, the control section 7 can use an excess performance indicator in place of the selecting method for minimizing the variances of the third performance indicators. The excess performance indicator means an allowance of the processing ability of a RAID group 4, and specifically means the difference between the second performance indicator and the maximum performance indicator of the RAID group 4 (Excess performance indicator=Maximum performance value which can be processed by a RAID group−Second performance indicator). The control section 7 can select the destination to allocate the logical devices 5 configuring the logical volume 6, so that the excess performance indicator becomes minimum.

In the present embodiment configured in this manner, RAID groups 4 to allocate the logical devices 5 configuring the logical volume 6 are selected based on the type of access pattern and the processing performance (first performance indicator) requested by the logical volume 6. Accordingly, loads are dispersed among the RAID groups 4, and responsive performance of the storage controller 1 can be improved.

Particularly, in the present embodiment, the method of computing each performance indicator is changed in accordance with the access pattern, i.e., random access and sequential access. In the case of the random access, each logical device 5 configuring the logical volume 6 is allocated to different RAID groups 4. Therefore, the load in each RAID group 4 at the time of random access can be reduced. As a result, the responsive performance of the storage controller 1 with respect to the random access can be improved, and the usability for the user improves. The present embodiment is described hereinafter in more detail.

Embodiment 1

Figure 2:
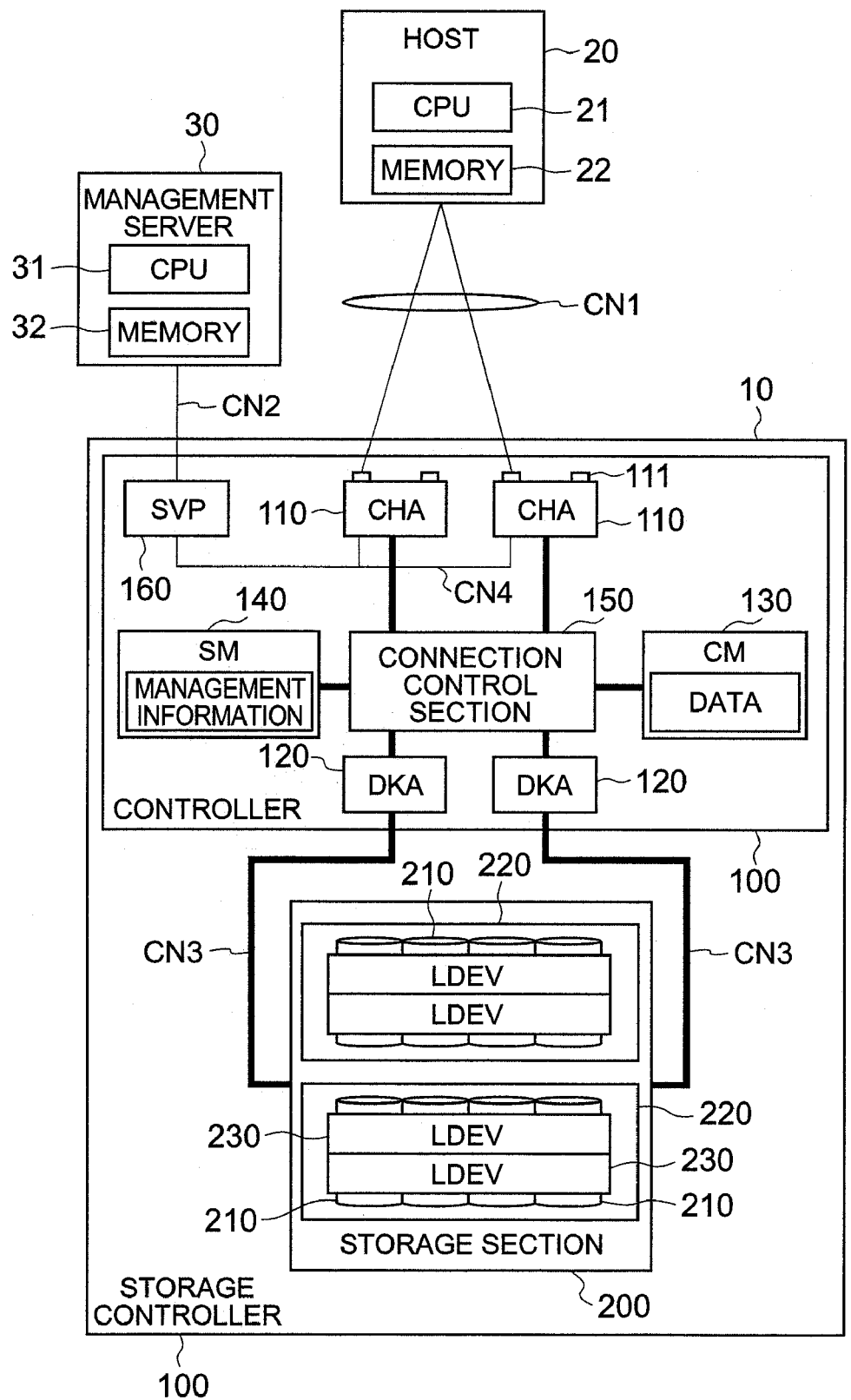
FIG. 2 is a block diagram of the storage controller.

FIG. 2 is a block diagram showing a configuration of the storage controller according to the present embodiment. A host 20 is a computer apparatus having information processing resources such as a CPU (Central Processing Unit) 21 and a memory 22, and is constituted as, for example, a personal computer, work station, server computer, main frame computer, or the like.

The host 20 has a communication control section for accessing a storage controller 10 via a communication network CN1, and an application program such as database software.

As the communication network CN1, for example, a LAN (Local Area Network), SAN (Storage Area Network), the Internet, a private line, a public line, or the like can be used appropriately according to circumstances. Data communication using a LAN is performed in accordance with, for example, a TCP/IP protocol. When the host 20 is connected to the storage controller 10 via a LAN, the host 20 specifies a file name to request input/output of data in units of files. When the host 20 is connected to the storage controller 10 via a SAN, the host 20 requests data input/output in units of files in accordance with a fiber channel protocol.

A management server 30 is a computer apparatus for managing the configuration and the like of the storage controller 10, and has, for example, a CPU 31, memory 32 and the like. The management server 30 is operated by a user such as a system administrator. The management server 30 is connected to the storage controller 10 via a communication network CN2. A configuration is possible in which a different computer apparatus for management may be provided between the management server 30 and the storage controller 10. Also, possible is a configuration in which a plurality of storage controllers 10 are managed by the management server 30 in a concentrated manner, or in which each storage controller 10 is provided with the management server 30.

The storage controller 10 is configured as a disk array system having a number of disk drives 210. The storage controller 10 is classified broadly into a controller 100 and a storage section 200. The controller 100 is constituted by, for example, a plurality of channel adopters ("CHA" hereinafter) 110, a plurality of disk adopters ("DKA" hereinafter) 120, a cache memory 130, shared memory 140, connection control section 150, and a service processor ("SVP" hereinafter) 160.

Each of the CHAs 110 is for performing data communication with the host 20. Each CHA 110 has at least one or more communication ports 111 for performing communication with the host 20. Each CHA 110 is configured as a microcomputer system having a CPU, memory and the like, and interprets and executes various commands received from the host 20. A network address (e.g., an IP address or WWN) for identifying each CHA 110 is allocated to each CHA 110, and each CHA 110 can act as a NAS (Network Attached Storage) individually. In the case where a plurality of hosts 20 exist, each CHA 110 receives a request from each of the hosts 20 and processes the request.

Each of the DKAs 120 is for exchanging data between the disk drive 210 provided in the storage section 200. Each DKA 120 is configured as a microcomputer system having a CPU, memory and the like, as with the CHAs 110. Each DKA 120 is connected to each disk drive 210 via a communication network CN3 such as a SAN.

Each DKA 120, for example, writes data received by the CHA 110 from the host 20 into a predetermined address of a predetermined disk drive 210. Each DKA 120 further reads data from a predetermined address of a predetermined disk drive 210, and transmits the data to the host 20.

When the DKAs 120 perform data input/output with the disk drives 210, each DKA 120 converts a logical address into a physical address. A logical address is an address indicating a block position of a logical volume, and is called "LBA (Logical Block Address)". When the disk drives 210 are managed in accordance with a RAID, each DKA 120 performs data access in accordance with the configuration of the RAID. For example, each DKA 120 writes the same data into separate groups of disk drives (RAID groups 220), or executes parity account to write data and parity into the disk drive groups.

The cache memory 130 stores data received from the host 20 or data readout from the disk drives 210. The shared memory (sometimes referred to as "control memory") 140 has stored therein various management information or control information items which are used in operation of the storage controller 10.

It should be noted that any one of or a plurality of the disk drives 210 may be used as a cache disk. Furthermore, the cache memory 130 and shared memory 140 can be configured as separate memories, or a partial storage region of the same memory can be used as a cache region and other storage region can be used as a control region.

The connection control section 150 is connected to each CHA 110, each DKA 120, the cache memory 130 and the shared memory 140. The connection control section 150 can be configured as a crossbar switch or the like that performs data transmission by means of, for example, high-speed switching operation.

The SVP 160 is connected to each CHA 110 via a communication network CN4 such as a LAN. The SVP 160 can access the information on each DKA 120, the cache memory 130 and shared memory 140 via the CHA 110. The SVP 160 collects information related to various states of the storage controller 10 and provides the information to the management server 30. The user can learn the various states of the storage controller 10 via a screen of the management server 30.

The user can use the management server 30 to set an access path between, for example, the host 20 and a logical device 230 via the SVP 160. The SVP 160 reflects various set values, which are inputted from the management server 30, in the management information and the like.

The storage section 200 has the plurality of disk drives 210. Various storage devices such as a hard disk drive, flexible disk drive, magnetic tape drive, semiconductor memory drive, optical disk device and the like, and equivalents thereof can be used as the disk drives 210. Moreover, different types of disks such as a FC (Fiber Channel) disk, SATA (Serial AT Attachment) disk and ATA disk can also be included in the storage section 200.

One RAID group (also called "parity group") 220 is formed by a plurality of disk drives 210. The RAID group 220 is obtained by virtualizing the physical storage region of each disk drive 210 in accordance with the RAID level, and corresponds to a physical storage device. A physical storage region of the RAID group 220 can be provided with one or a plurality of logical device 230 of a predetermined or arbitrary size. The present embodiment describes the case in which the logical devices 230 of the predetermined size are provided. Specifically, in the present embodiment, the storage capacities are the same in all logical devices 230.

Figure 3:
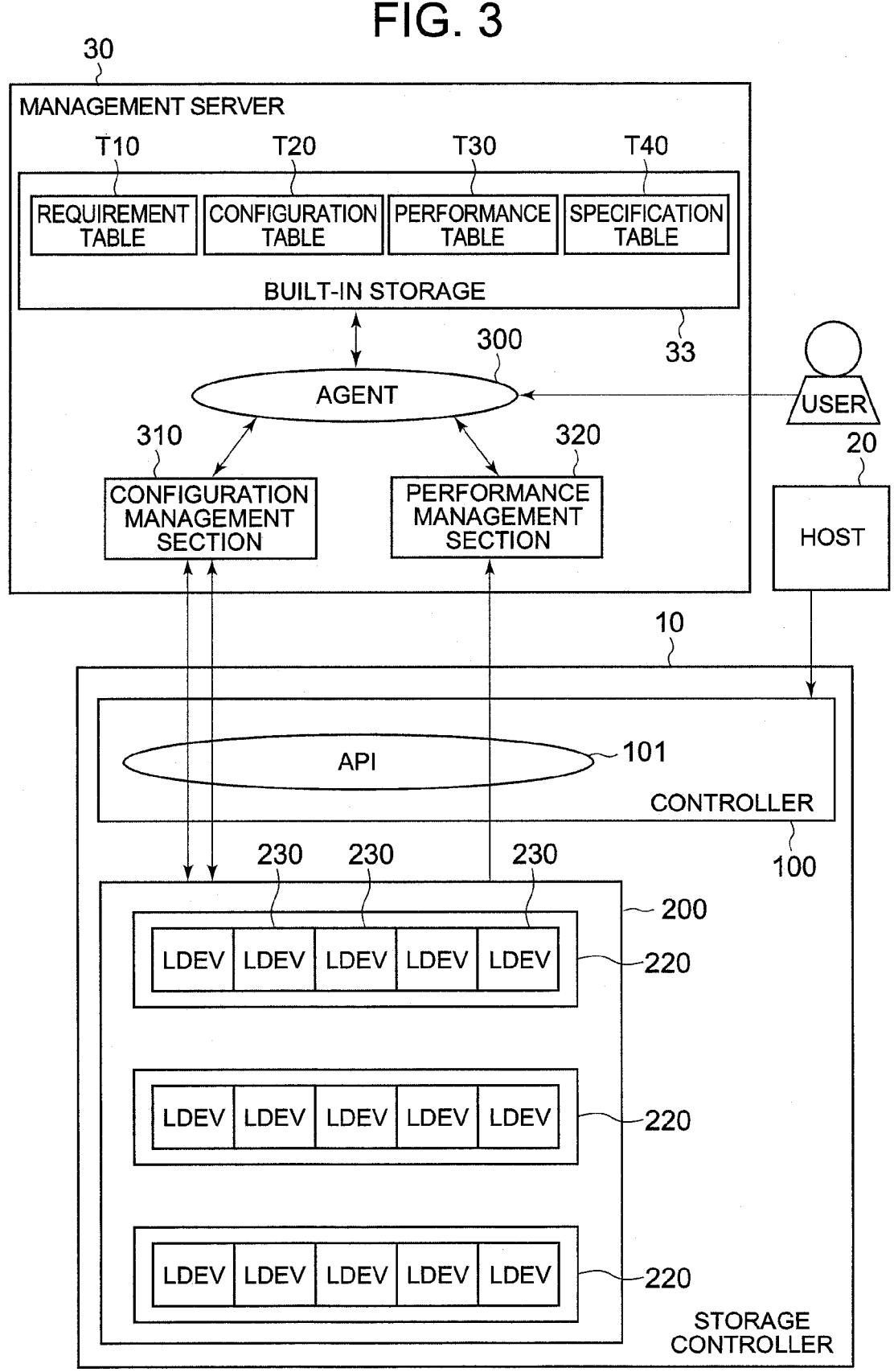
FIG. 3 is an explanatory diagram showing an outline of a function of the storage system having the storage controller.

FIG. 3 is an explanatory diagram which schematically shows a functional configuration of the storage controller 10 and of the management server 30. The management server 30 is described first. In a built-in storage 33 such as a disk drive embedded in the management server 30, there are stored various tables such as a requirement table T10, configuration table T20, performance table T30 and specification table T40. These tables T10 through T40 are described in detail with reference to other drawings. It should be noted that, as will be clear from other embodiments described hereinafter, the tables T10 through T40 and the like can also be stored inside the storage controller 10.

The management server 30 is provided with an agent 300, configuration management section 310 and performance management section 320. The agent 300 is a program that collects information from the configuration management section 310 and the performance management section 320 and stores the information in each of the tables T10 through T40 and the like. Furthermore, the agent 300 executes processing for associating a logical volume 102 (see FIG. 4) with each of the logical devices 230 by using the information stored in each of the tables T10 through T40 and the like.

The configuration management section 310 is a program for executing collection of configuration information from the storage controller 10 via an API (Application Program Interface) 101 provided in the storage controller 10, and changing the configuration of the storage controller 10.

The performance management section 320 is a program for collecting information (performance information) related to the performance of the storage controller 10 via the API 101 of the storage controller 10, and writing the performance information.

The controller 100 of the storage controller 10 is provided with the API 101. The API 101 is a program for transmitting the configuration information, performance information and the like to the management server 30 or rewrites the configuration information, performance information and the like in accordance with a request received from the management server 30.

Figure 4:
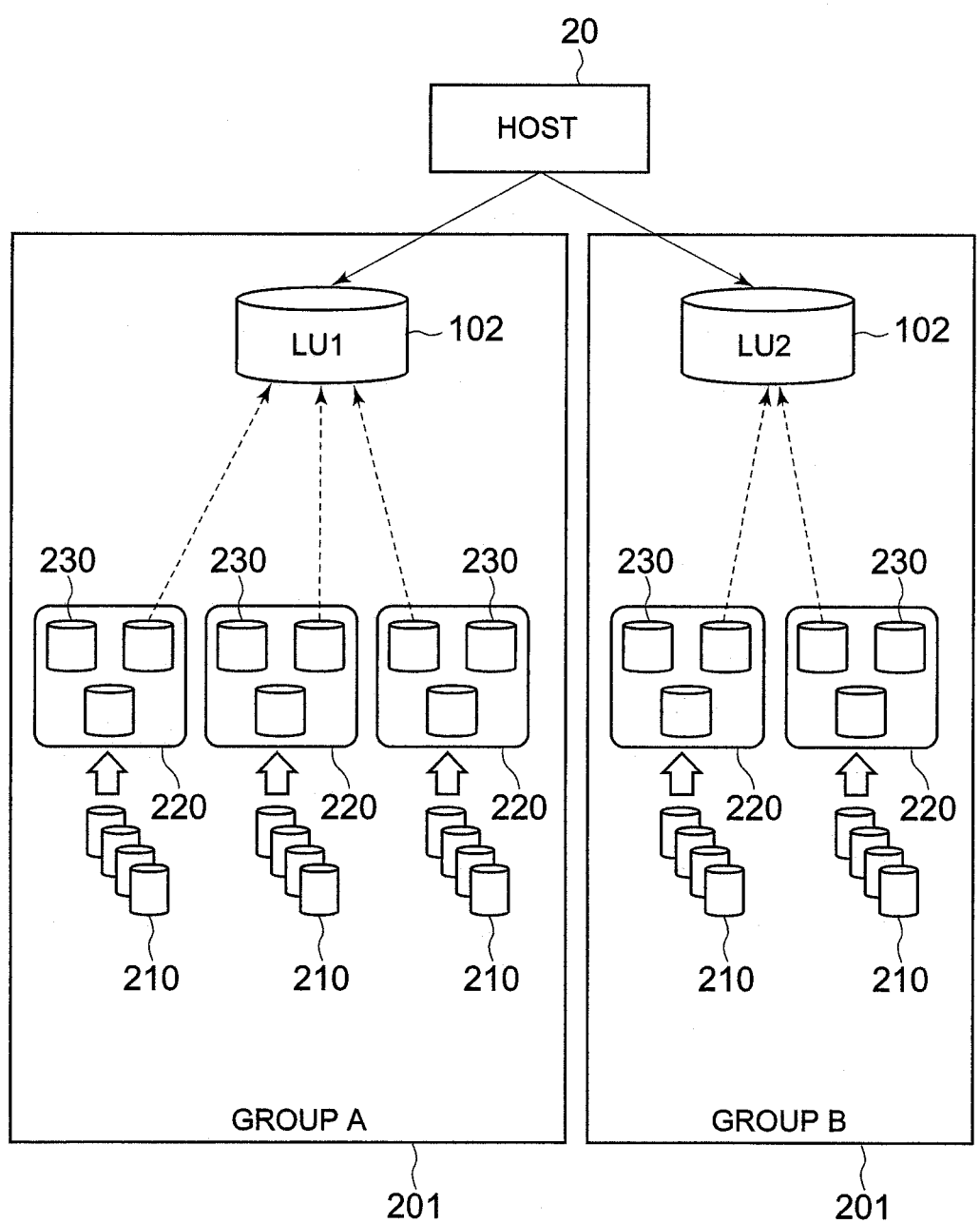
FIG. 4 is an explanatory diagram showing a state in which a storage resource with the storage controller is subjected to group management.

FIG. 4 is an explanatory diagram which schematically shows a storage structure inside the storage controller 10. As described above, the RAID groups 220 are formed as physical storage devices by groping the physical storage regions provided in the plurality of disk drives 210. The physical storage region that each RAID group 220 has can be provided with one or a plurality of logical devices 230.

At least one or more logical volumes 102 accessed from the host 20 are provided in the storage controller 10. The logical volumes 102 are associated with at least one or more logical devices 230. The host 20 specifies a block address within the logical volume 102, and requests the storage controller 1 to read and write data. Actual data input/output is performed between the logical volume 102 and the logical device 230 that takes charge of a storage region of the block address specified by the host 20.

As shown in FIG. 4, in the present embodiment, storage resources within the storage controller 10 is managed in units of resource management groups 201. The storage resources are each logical volume 102, each RAID group 220, and the like. Each of the resource management groups 201 determines which logical device 230 in the RAID groups 220 is used to configure the logical volume 102.

Accordingly, for example, the RAID groups 220, each of which is configured from the disk drives 210 having different performances, can be managed in the separate resource management groups 201. Specifically, one of the resource management groups 201 can manage a storage resource derived from a high-performance disk drive 210 such as a FC disk drive, while the other resource management group 201 can manage a storage resource derived from a low-performance disk drive 210 such as an ATA disk drive. Next, FIG. 5 is used to explain which RAID group 220 is beneficial to select the logical devices 230 to be associated with the logical volume 102.

Figure 5:
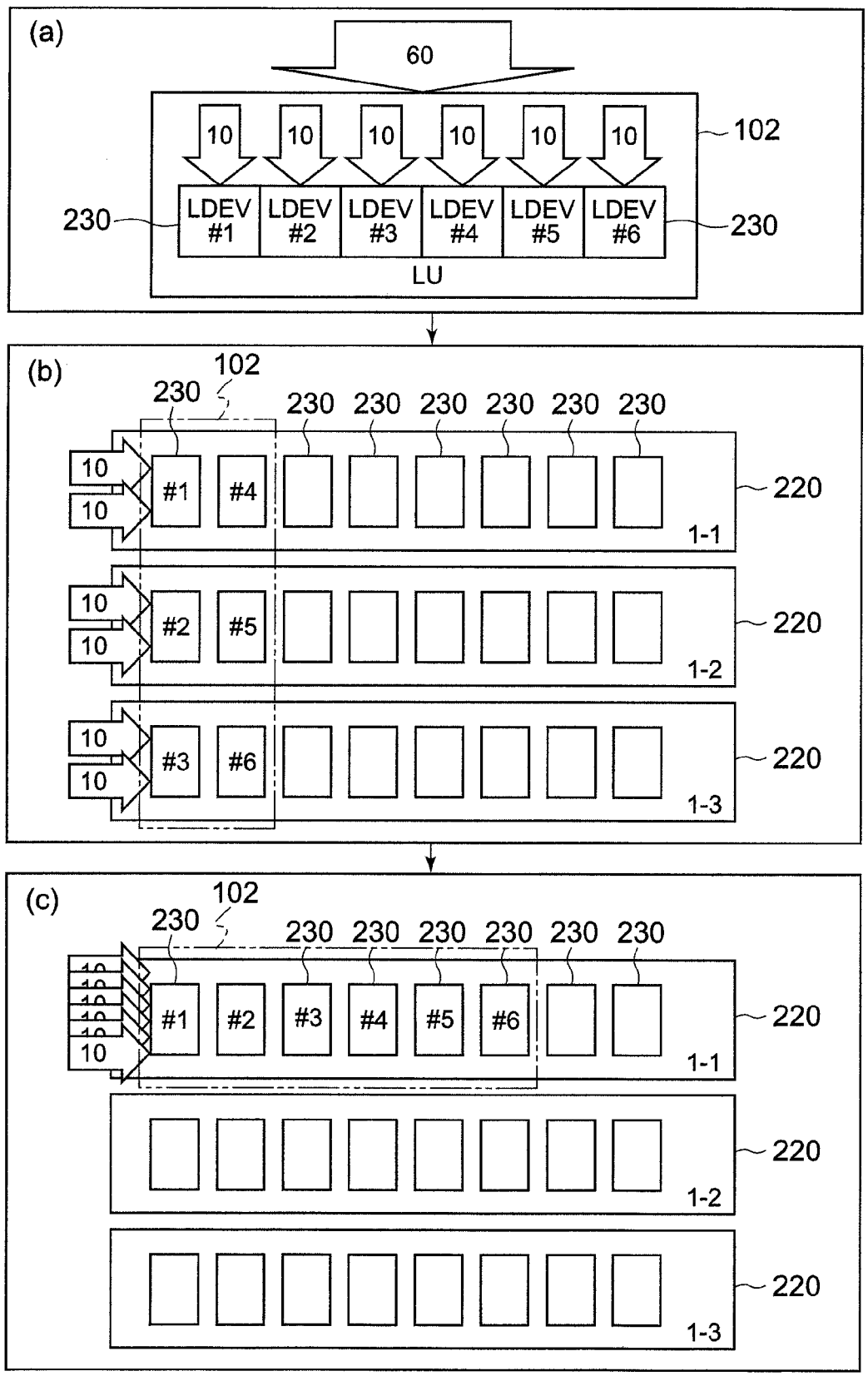
FIG. 5 is an explanatory diagram showing a state in which a load, which is generated in the logical volume due to an access made from a host, differs in accordance with the allocation of each of logical devices configuring the logical volume.

FIG. 5 is an explanatory diagram showing a state in which the load in each RAID group 220 differs in accordance with the allocation of the logical devices 230 to the logical volume 102. As shown in FIG. 5A, suppose that the performance indicator that is expected for the logical volume 102 is "60". The performance indicator in the present embodiment is the number of times that data input/output requests are processed per unit time (IOPS), and this performance indicator can be considered also as a load.

Assumed is the case where a load of "60" is added to the logical volume 102 by a random access request sent from the host 20. In the case of random access, there is no problem to consider that the entire storage regions of the logical volume 102 are accessed evenly. Therefore, as shown in FIG. 5A, it can be conceived that a load of "10" is added to each of six logical devices 230 configuring the substance of the logical volume 102.

FIG. 5B shows a state in which the six logical devices 230 configuring the logical volume 102 are dispersed and two logical devices 230 are allocated to each of the RAID groups 220. For example, logical devices 230 (#1, #4) are provided in a RAID group 220 (1-1), logical devices 230 (#2, #5) are provided in a RAID group 220 (1-2), and logical devices 230 (#3, #6) are provided in a RAID group 220 (1-3).

Two logical devices 230 having a load of "10" are allocated to each of the RAID groups 220. Therefore, the load in each of the RAID groups 220 (the performance indicator of each RAID group 220) becomes "20 (=10×2)".

FIG. 5C shows a state in which six logical devices 230 are allocated to one RAID group 220 (1-1) in a concentrated manner. In this case, since the RAID group 220 (1-1) is provided with the six logical devices 230 having a load of "10", the load in the RAID group 220 (1-1) becomes "60 (=10×6)". The load in other RAID groups 220 (1-2, 1-3) is "0". In the case of FIG. 5C, loads are concentrated on a specific RAID group 220 (1-1) only.

Therefore, as is clear from the above consideration, in the case where the pattern of accessing from the host 20 to the logical volume 102 is the random access, each of the logical devices 230 configuring the logical volume 102 is distributed and allocated to a plurality of RAID groups 220, whereby the load in each RAID group 220 can be reduced.

On the other hand, in the case where the pattern of accessing from the host 20 to the logical volume 102 is the sequential access, the logical devices 230 are distributed and allocated to a plurality of RAID groups 220 as shown in FIG. 5B, whereby the load in each RAID group 220 increases.

In the case of the sequential access, a load of "60" can be generated in each of the logical devices 230. This is because, in the case of the sequential access, accesses are concentrated on a specific logical device 230 and any of the logical devices 230 can be accessed evenly from the host 20. Therefore, the load in the RAID group 220 to which one or more logical devices 230 are allocated is "60". In the allocation shown in FIG. 5B, the load in each RAID group 220 is "60".

In the allocation shown in FIG. 5C, all of the logical devices 230 are allocated to one RAID group 220 (1-1). In this case, the load in the RAID group 220 (1-1) is not "360 (=60×6)" but "60". This is because, out of the total of six logical devices 230 allocated to this one RAID group 220 (1-1), sequential accesses from the host 20 are concentrated on only one of the logical devices 230.

Therefore, as is clear from the above consideration, in the case where the pattern of accessing from the host 20 to the logical volume 102 is the sequential access, the logical devices 230 configuring this logical volume 102 are allocated to any one of the RAID group 220 in a concentrated manner, whereby the load in each RAID group 220 as a whole can be eventually reduced.

Figure 6:
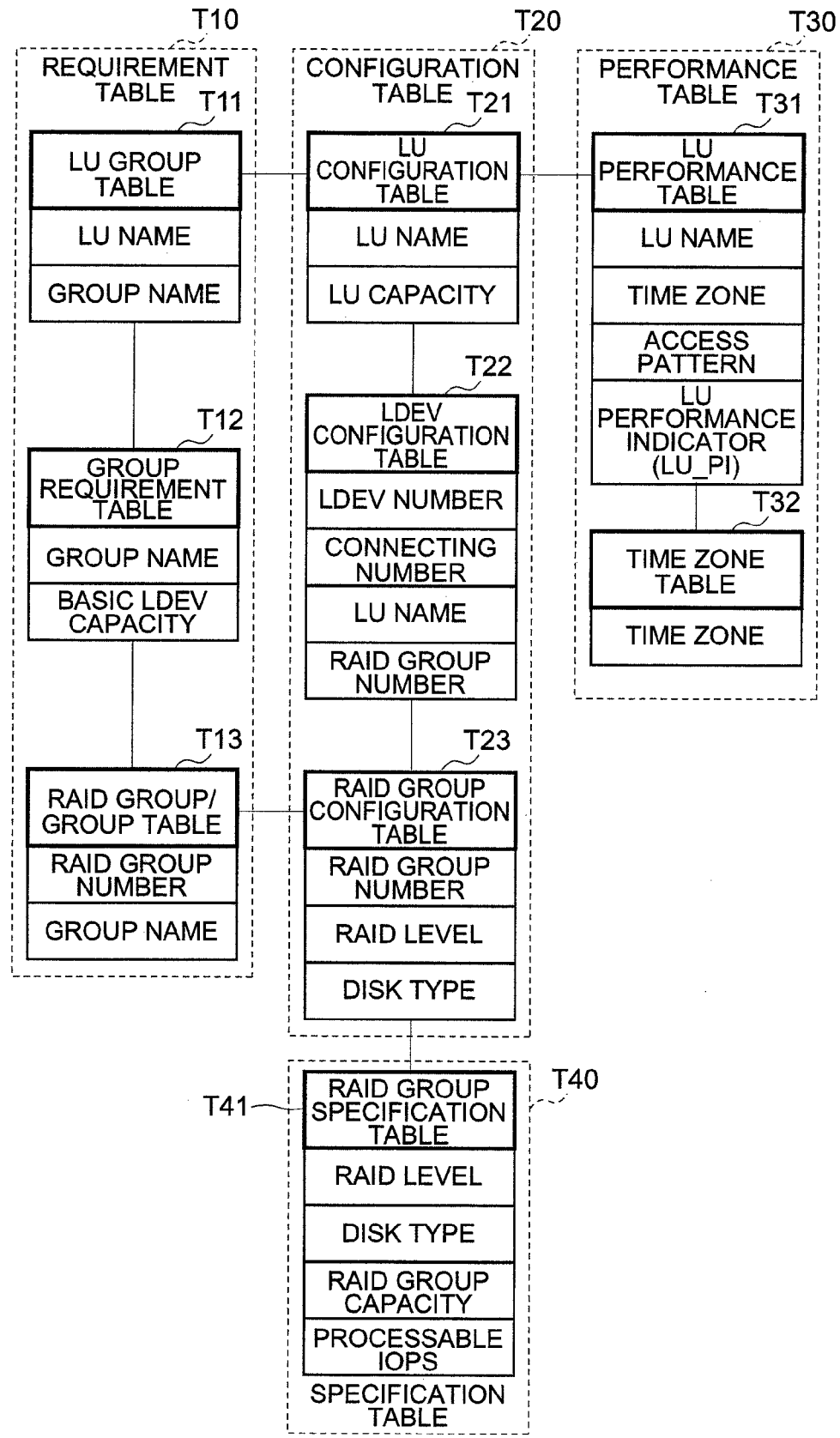
FIG. 6 is an explanatory diagram showing a configuration of each table used for associating the logical devices to the logical volume, and the relationship among the tables.

FIG. 6 is an explanatory diagram showing a configuration of the tables T10 through T40 used for allocating the logical devices 230 to the RAID group 220, and the relationship among the tables. As described hereinafter, tables other than the tables T10 through T40 shown in FIG. 6 are also used in the present embodiment according to need. It should be noted that the table configurations described hereinafter are one example, thus the present invention is not limited to the illustrated table configurations.

The requirement table T10 is a table for saving requirements set by the user. The user can set one or a plurality of resource management tables. The user can manage the storage resources that the storage controller 10 has (RAID group 220 and logical devices 230), in a plurality of resource management groups. The configurations of the resource management groups that are set by the user are registered in the requirement table T10. The requirement table T10 is constituted by, for example, a LU group table T11, group requirement table T12, an RAID group/group table T13.

The group requirement table T12 is a table for managing what kind of resource management group is set. In the group requirement table T12, for example, the group names of the resource management groups and the basic LDEV capacity are managed. The basic LDEV capacity is a value indicating the storage capacity of the logical device 230. The LU group table T11 manages the logical volume 102 included in the resource management groups. In the LU group table T11, for example, the LU name (name of the logical volume) and the resource management group name are managed. In the following description, the logical volume 102 is sometimes called "LU". The RAID group/group table T13 is a table for managing the RAID groups 220 included in the resource management groups. In the RAID group/group table T13, for example, the resource management group name and the RAID group numbers for identifying the RAID groups 220 are managed.

The configuration table T20 is a table for managing the configuration information of the storage controller 10 which is collected by the configuration management section 310. The configuration table T20 is constituted by, for example, a LU configuration table T21, LDEV configuration table T22, and RAID group configuration table T23.

The LU configuration table T21 is a table for managing the configuration of the logical volume 102. In the LU configuration table T21, for example, the LU name and LU capacity are managed. The LDEV configuration table T22 manages the configuration of each logical device (LDEV) 230 included in each logical volume 102. The LDEV configuration table T22 manages, for example, the LDEV number for identifying each logical device 230, connecting numbers indicating the order in which the logical devices 230 are connected within the logical volume 102, the LU name showing which logical volume 102 is associated with the logical devices 230, and the RAID group number indicating which RAID group 220 is provided with the logical devices 230.

Here, the connecting numbers are explained. As described above, the logical volume 102 can be constituted by a plurality of logical devices 230. In the order in which the logical devices 230 are associated with the logical volume 102, each of the logical devices 230 is applied with a connecting number. For example, a connecting number "1" is applied to the logical device 230 which is associated with the logical volume 102 first, a connecting number "2" is applied to the logical device 230 which is associated secondly with the logical volume 102, and a connecting number "3" is applied to the logical device 230 which is thirdly associated with the logical volume 102. In this manner, low connecting numbers are set to the logical devices 230 respectively, in the order in which the logical devices 230 are associated with the logical volume 102.

Each logical device 230 configures the storage regions of the logical volumes 102 in the order of the connecting numbers. Specifically, out of the storage regions of the logical volumes 102, the logical device 230 applied with the connecting number "1" is associated with the basic LDEV capacity worth of storage region from a front block address. The logical device 230 applied with the connecting number "2" takes charge of the storage region subsequent to the storage region that the logical device 230 with the connecting number "1" takes charge of. It should be noted that, in the following description, the logical devices 230 are sometimes called "LDEV(s)".

The RAID group configuration table T23 is a table for managing the configuration of each RAID group 220. The RAID group configuration table T23 manages, for example, the RAID group number for identifying each RAID group 220, the RAID level and data configuration of each RAID group 220, and the type of disk drive 210 configuring each RAID group 220. The RAID level is information indicating the type of RAID such as RAID 1 through RAID 6 or the like. The data configuration is information indicating the configuration for redundantly managing data in the manner of, for example, 3D+1P (redundant management with three data items and one parity), 6D+2P (redundant management with six data items and two parities), and the like. The type of disk drive 210 (shown as "disk type" in the figure) is information indicating the type of disk drive 210 configuring the RAID group 220. For example, the storage capacity, number of rotations, and the like can be the type of disk drive 210. Also, the interface type and the like of the disk drive 210 can be included as the disk type.

The performance table T30 is a table for saving the information related to the performance of the storage controller 10, the information being collected using the performance management section 320. The performance table T30 is constituted by, for example, a LU performance table T31 and a time zone table T32.

The LU performance table T31 is a table for managing the performance of the logical volume 102. In the LU performance table T31, for example, the name of logical volume 102 (LU name), a time zone, an access pattern, and a performance indicator required for the logical volume 102 (LU performance indicator) are managed. The access pattern is a pattern of access made to the logical volume 102 from the host 20, and either the random access or the sequential access is set. The LU performance indicator is information indicting a performance value required for the logical volume 102. In the figure, the performance indicator is shown as "PI" for the sake of convenience. Therefore, the LU performance indicator is shown as "LU_PI". The LU performance indicator and access pattern are set for each of a plurality of preset time zones.

The time zone table T32 is a table for defining a time zone. For example, by dividing one day into three-hour periods, eight time zones can be set. Moreover, for example, one day can be divided into various units, such as 30-minute basis, one hour basis, two hour basis, four hour basis, six hour basis and eight hour basis, to set the time zones. Furthermore, a configuration is possible in which the set unit of a time zone is changed between, for example, day and night. Furthermore, a configuration is possible in which the set unit of the time zone is changed for every logical volume 102.

The specification table T40 is a table for storing information related to the specification of the storage controller 10.

The specification table T40 is constituted by, for example, a RAID group specification table T41. Information on the specification of the RAID group 220 is stored in the RAID group specification table T41. The RAID group specification table T41 manages, for example, the RAID level, type of disk drive 210, storage capacity of the RAID groups 220, and maximum load which can be processed by the RAID groups 220 (maximum processable IOPS). It should be noted that the RAID group specification table T41 and the RAID group configuration table T23 may be integrated to configure one table.

FIG. 7 is an explanatory diagram showing the requirement table T10 and the configuration table T20. The tables T10 and T20 are as described above. FIG. 8 is an explanatory diagram showing the performance table T30 and the specification table T40. It should be noted that the performance table T30 and the specification table T40 are not directly related to each other, but both tables T30 and T40 are connected with each other by a line, for illustrative convenience.

Figure 9:
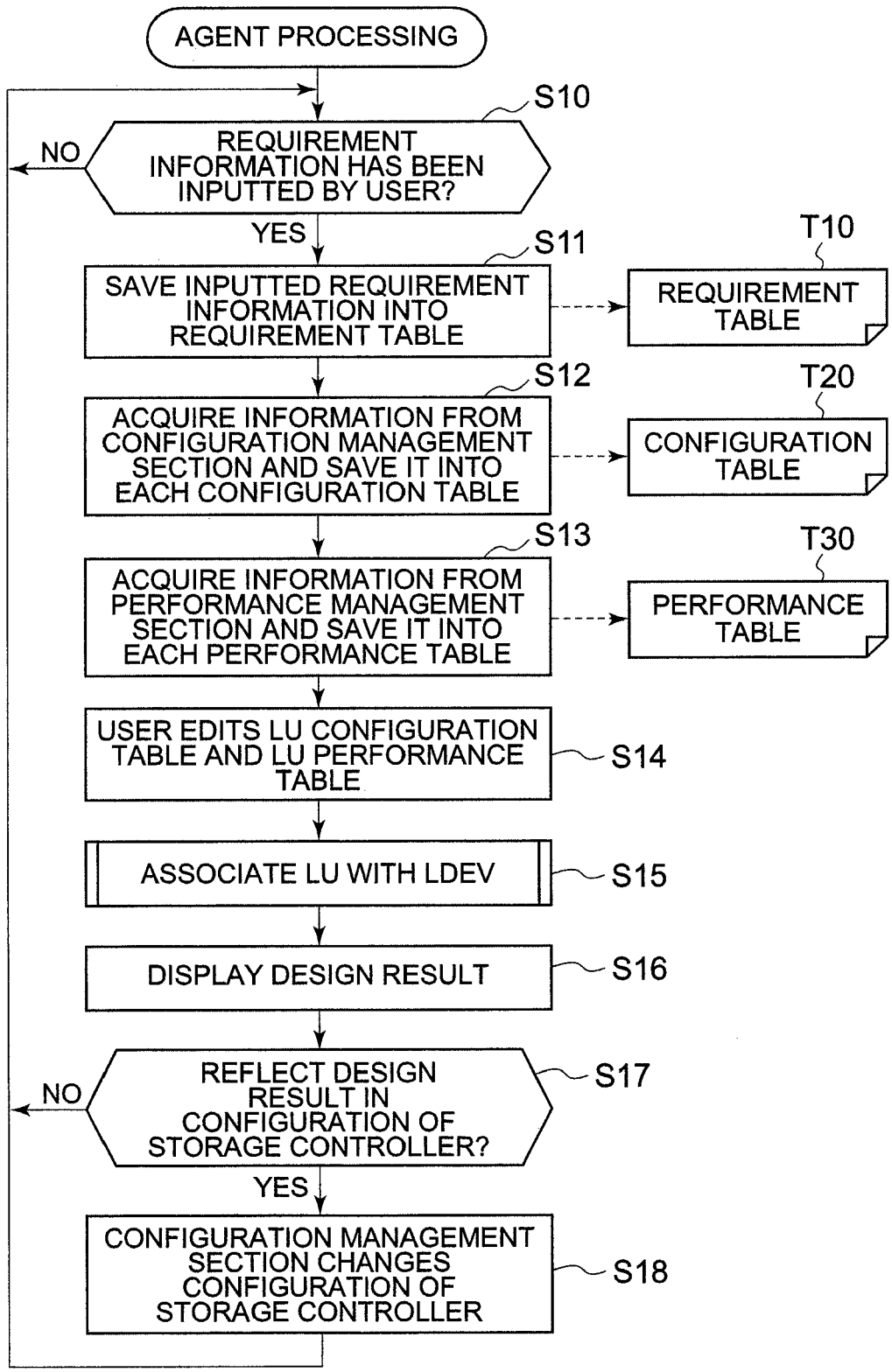
FIG. 9 is a flowchart showing agent processing.

FIG. 9 is a flowchart showing an outline of agent processing which is executed by the agent 300. As with the flowcharts described hereinafter, an outline of each processing is described within a scope required for understanding and implementing the present invention. Therefore, there is a case where the agent is different from an actual computer program. Moreover, those skilled in the art may be able to change, add, or delete the steps accordingly.

The agent 300 waits for requirement information to be inputted by the user (S10), and, when requirement information is inputted from the user (S10: YES), saves the requirement information into the requirement table T10 (S11).

The agent 300 uses the configuration management section 310 to acquire information on the configuration of the storage controller 10, and saves the information on the configuration into the configuration table T20 (S12). The agent 300 further uses the performance management section 320 to acquire information on the performance of the storage controller 10, and saves the information on the performance into the performance table T30 (S13).

The agent provides the user with an opportunity to edit the LU configuration table T21 and LU performance table T31 (S14). The user can set, for example, the access pattern and the like for each time zone accordingly.

The agent 300 makes an association between the logical volume (LU) 102 and a plurality of logical devices (LDEV) 230 (S15). This association processing is described with reference to FIG. 13 hereinafter. The agent 300 displays a result of making an association between the logical volume 102 and each logical device 230, that is, a design result, on the screen of the management server 30 (S16).

The agent 300 determines whether the user approves the design result presented to the user in S16 (S17). Specifically, the agent 300 determines whether to reflect the design result, which is displayed on the screen, in the configuration of the storage controller 10 (S18). More specifically, the agent 300 determines whether to associate the logical volume 102 with the logical device 230 in the resource management group set by the user.

In the case where the configuration of the storage controller 10 is changed based on the design result (S17: YES), the agent 300 uses the configuration management section 310 to make an association between the logical volume 102 and each logical device 230 (S18). In the case where the user is not satisfied with the design result (S17: NO), the agent 300 returns to S10.

Figure 10:
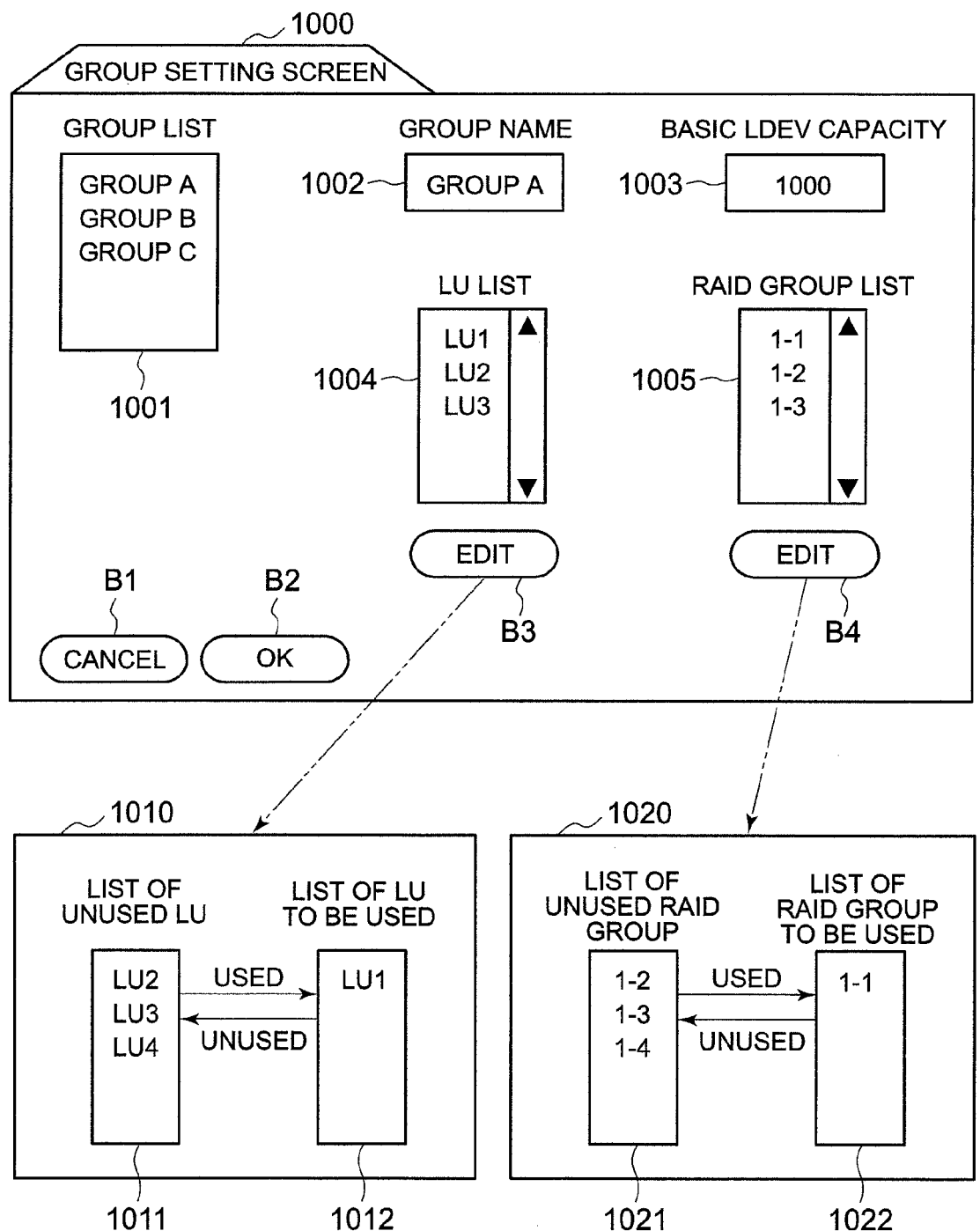
FIG. 10 is an explanatory diagram showing a configuration of a setting screen which is used for subjecting the storage resource within the storage controller to group management.

FIG. 10 is an explanatory diagram showing an example of a group setting screen 1000 which is used when the user inputs the requirement information. It should be noted that the screen configuration described hereinafter is one example, thus the present invention is not limited to this example.

The group setting screen 1000 has, for example, a group list display section 1001, group name display section 1002, basic LDEV capacity display section 1003, LU list display section 1004, RAID group list display section 1005, cancel button B1, register button B2, and edit buttons B3, B4.

The group list display section 1001 displays the names of the resource management groups which are set in the storage controller 10. The group name display section 1002 displays the name of a resource management group which is selected in the display section 1001. The basic LDEV capacity display section 1003 displays a value of basic LDEV capacity which is set in the selected resource management group.

The LU list display section 1004 displays the names of the logical volumes 102 included in the selected resource management group. The RAID group list display section 1005 displays the numbers of the RAID groups 220 which are included in the selected resource management group. The cancel button B1 is a button for canceling inputs of the user. The register button B2 is a button for storing a value, which is inputted from the user, in the requirement table T10. One of the edit buttons B3 is a button which is used by the user to edit the list displayed on the LU list display section 1004, while the other edit button B4 is a button which is used by the user to edit the list displayed on the RAID group list display section 1005.

When the user selects the edit button B3, an edit screen 1010 is displayed. This edit screen 1010 has, for example, a display section 1011 which displays the names of unused logical volumes 102 in the form of a list, and a display section 1012 which displays the names of logical volumes 102 to be used, in the form of a list. The user selects a logical volume 102 that the user wishes to use, from the unused logical volumes 102. The selected logical volume 102 is included in the resource management group selected in the display section 1002.

Similarly, when the user selects the edit button B4, an edit screen 1020 is displayed. This edit screen 1020 has, for example, a display section 1021 which displays the numbers of unused RAID groups 220 in the form of a list, and a display section 1022 which displays the numbers of RAID groups 220 to be used, in the form of a list. The user selects a RAID group 220 that the user wishes to use, from the unused RAID groups 220. The selected RAID group 220 is included in the resource management group selected in the display section 1002.

Figure 11:
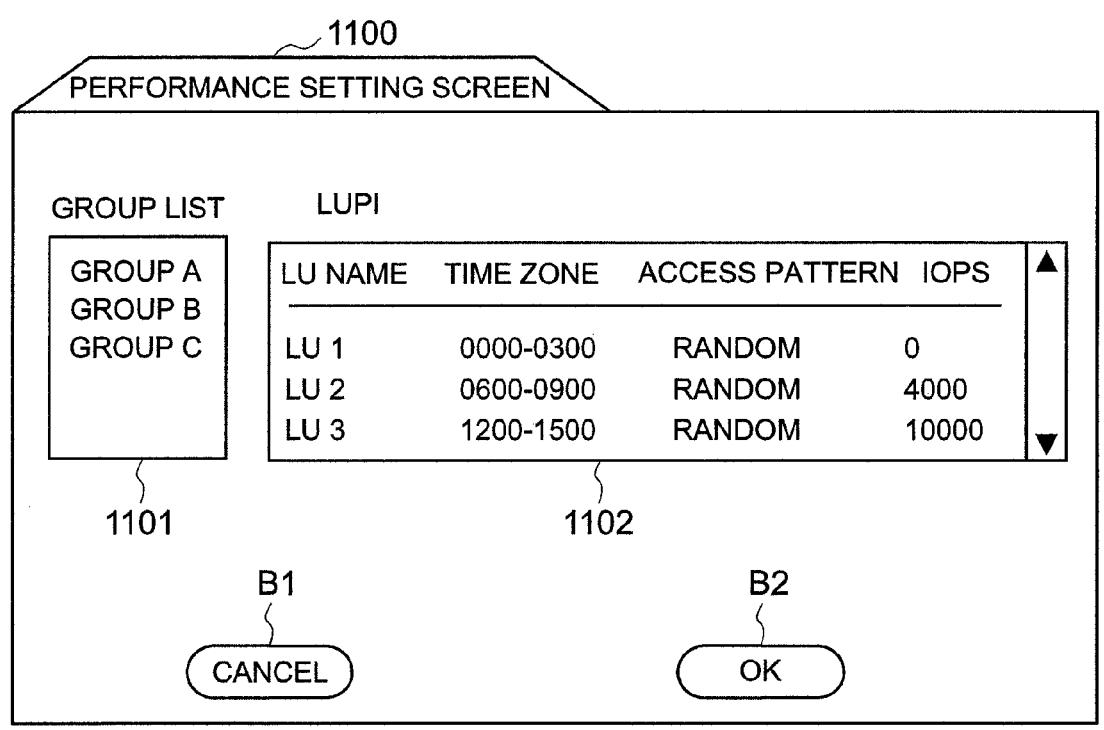
FIG. 11 is an explanatory diagram showing a configuration of a setting screen which is used for setting a performance indicator required in the logical volume.

FIG. 11 is an explanatory diagram showing a performance setting screen 1100. This screen 1100 is used for an editing work performed by the user in, for example, S14 in FIG. 9. For example, a group list display section 1101, LU performance indicator display section 1102, the cancel button B1 and the register button B2 are included in the performance setting screen 1100.

The group list display section 1101 displays the name of each resource management group which is set by the storage controller 10. The LU performance indicator display section 1102 displays a value and the like related to the performance indicator of each logical volume 102 included in the resource management group selected via the group list display section 1101. Specifically, the display section 1102 displays the contents saved in the LU performance table T31.

Figure 12:
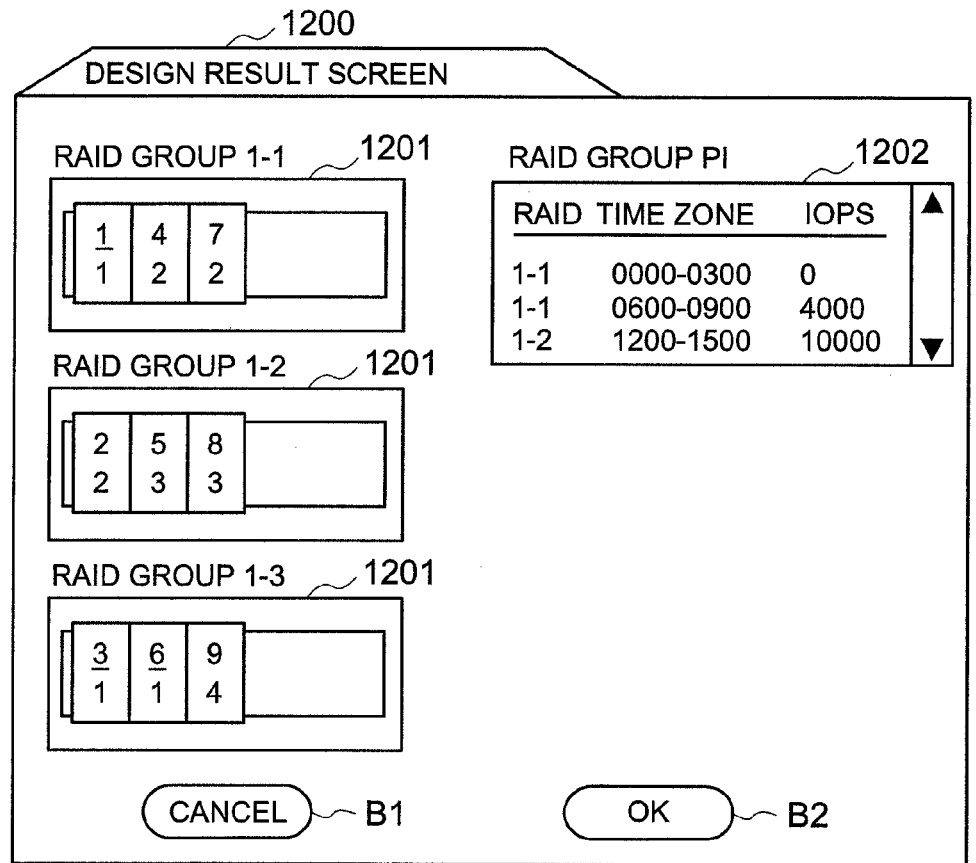
FIG. 12 is an explanatory diagram showing a screen which displays a result of associating the logical volume with the logical devices.

FIG. 12 is an explanatory diagram showing a design result screen 1200. This screen 1200 is used for obtaining approval from the user in, for example, S16 in FIG. 9. The design result screen 1200 is constituted by, for example, an allocation status display section 1201 showing an allocation status of the logical devices 230 per RAID group 220, a performance indicator display section 1202 displaying performance indicators of the RAID groups 220, the cancel button B1, and the register button B2.

The allocation status display section 1201 visually displays, for each RAID group 220, the status of each of the logical devices 230 allocated to each RAID group 220 within the resource management group selected by the user. In a drawing that symbolizes the logical device 230, for example, a LDEV number for identifying the logical device 230 is displayed on an upper level of the drawing, and the connecting number is displayed on the lower level.

The performance indicator display section 1202 displays the performance indicator of each RAID group 220 included in the abovementioned resource management group, for every time zone. It should be noted that the time zone is abbreviated in FIG. 12 for the sake of convenience.

When the user selects the register button B2, the design result displayed on the design result screen 1200 is registered in the LDEV configuration table T22. The LDEV configuration table T22 saves the information regarding that each of the logical devices 230 configuring the logical volume 102 is allocated to a specific RAID group 220 and with a specific number (connecting number). The configuration management section 310 uses this LDEV configuration table T22 to associate the logical device 230 selected from each RAID groups 220, with the logical volume 102, and provide the association to the host 20.

Figure 13:
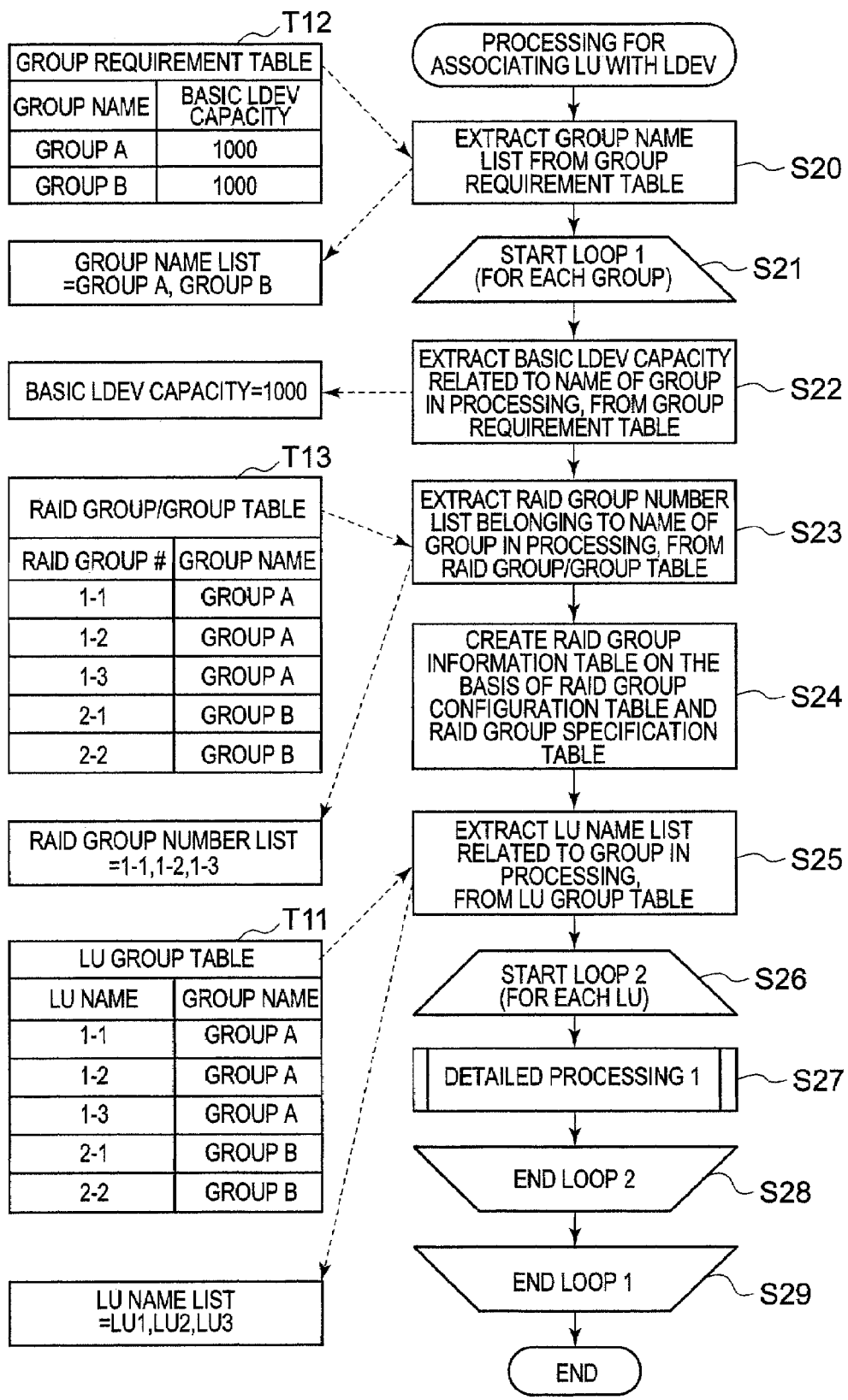
FIG. 13 is a flowchart showing processing for associating the logical volume, which is described in S13 in FIG. 9, with the logical devices.

FIG. 13 is a flowchart showing the detail of the processing for associating the logical devices 230 with the logical volume 102 described in S15 in FIG. 9. First, the agent 300 extracts the name of a resource management group which is registered in the group requirement table T12 (S20).

Then, a loop 1, which is described hereinafter, is started for each extracted resource management group. In the loop 1, S22 through S28 described hereinafter are repeated for each resource management group. The agent 300 extracts the basic LDEV capacity, which is set in the resource management group in processing, from the group requirement table T12 (S22).

The agent 300 extracts, from the RAID group/group table T13, a list of the numbers of the RAID groups 220 included in the resource management group in processing (S23). The agent 300 uses the RAID group configuration table T23 and RAID group specification table T41 with respect to the extracted numbers of the RAID groups 220, and thereby creates a RAID group information table T50 (S24). The RAID group information table T50 is a work table that is temporarily created when associating the logical volume 102 with the logical devices 230.

The agent 300 extracts, from the LU group table T11, a list of logical volumes 102 included in the resource management group in processing, and creates a list (S25). The agent 300 starts a second loop 2 within the loop 1. In the loop 2, detailed processing 1 is executed (S27). The detailed processing 1 is described hereinafter with reference to FIG. 15.

When the loop 2 is ended (S28), association between the logical volume 102 and logical devices 230 is made for the next resource management group. Then, when the loop 1 is ended (S29), the process moves to S16 described in FIG. 9.

Figure 14:
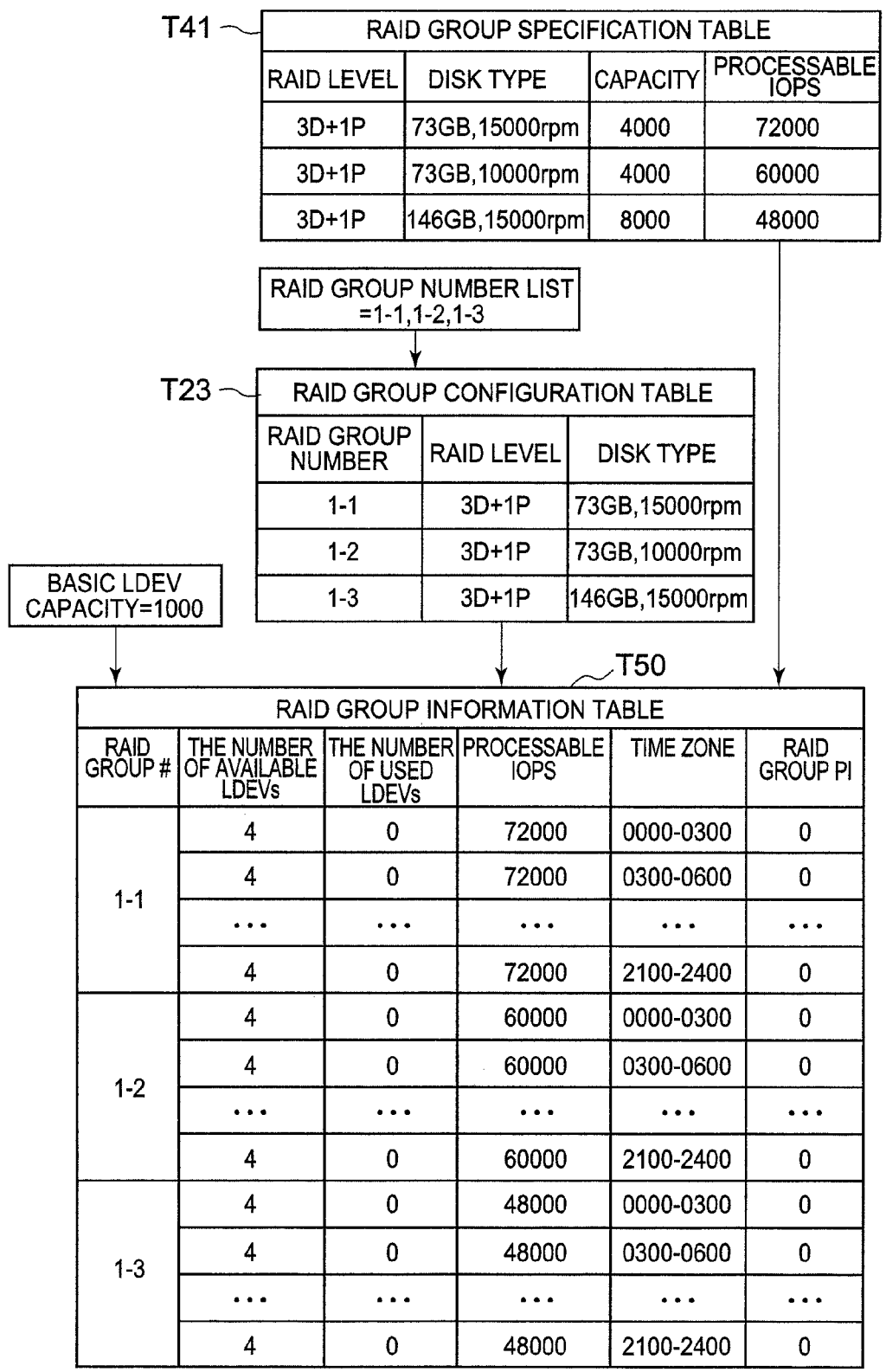
FIG. 14 is an explanatory diagram showing a configuration of a table for storing information on a RAID group.

FIG. 14 is an explanatory diagram showing a configuration of the RAID group information table T50. The RAID group information table T50 shown on the lower side of FIG. 14 makes association among, for example, RAID group numbers, the number of available LDEVs, the number of used LDEVs, processable IOPSs, time zones, and RAID group performance indicators, and saves such association.

For the RAID group numbers in the table T50, values which are read from the RAID group configuration table T23 are set. The number of available LDEVs in T50 indicates the maximum value of the number of logical devices 230 that can be set within the RAID group 220. The number of available LDEVs is obtained from the value which is obtained by dividing the capacity of the RAID group specification table T41 by the basic LDEV capacity (the number of available LDEVs=RAID group capacity/basic LDEV capacity). It should be noted that in the case where the divided value has a fractional part, the numbers after decimal point are truncated.

The number of used LDEVs in the table T50 is a value indicating the number of logical devices 230 that are already used within a RAID group. As association between the logical volume 102 and logical devices 230 is made progressively, the value of the number of used LDEVs changes. At the point of time when the RAID group information table T50 is created, an initial value of "0" is set as the number of used LDEVs.

For the processable IOPSs in the table T50, values which are read from the RAID group specification table T41 are set. For the time zones in the table T50, values of time zones defined in the time zone table T32 are set. The initial value, "0", is set as the performance indicator of a RAID group.

In this manner, in the RAID group information table T50, the record is generated for every predefined time zone for each RAID group 220 included in the resource management group which is a target of processing.

Figure 15:
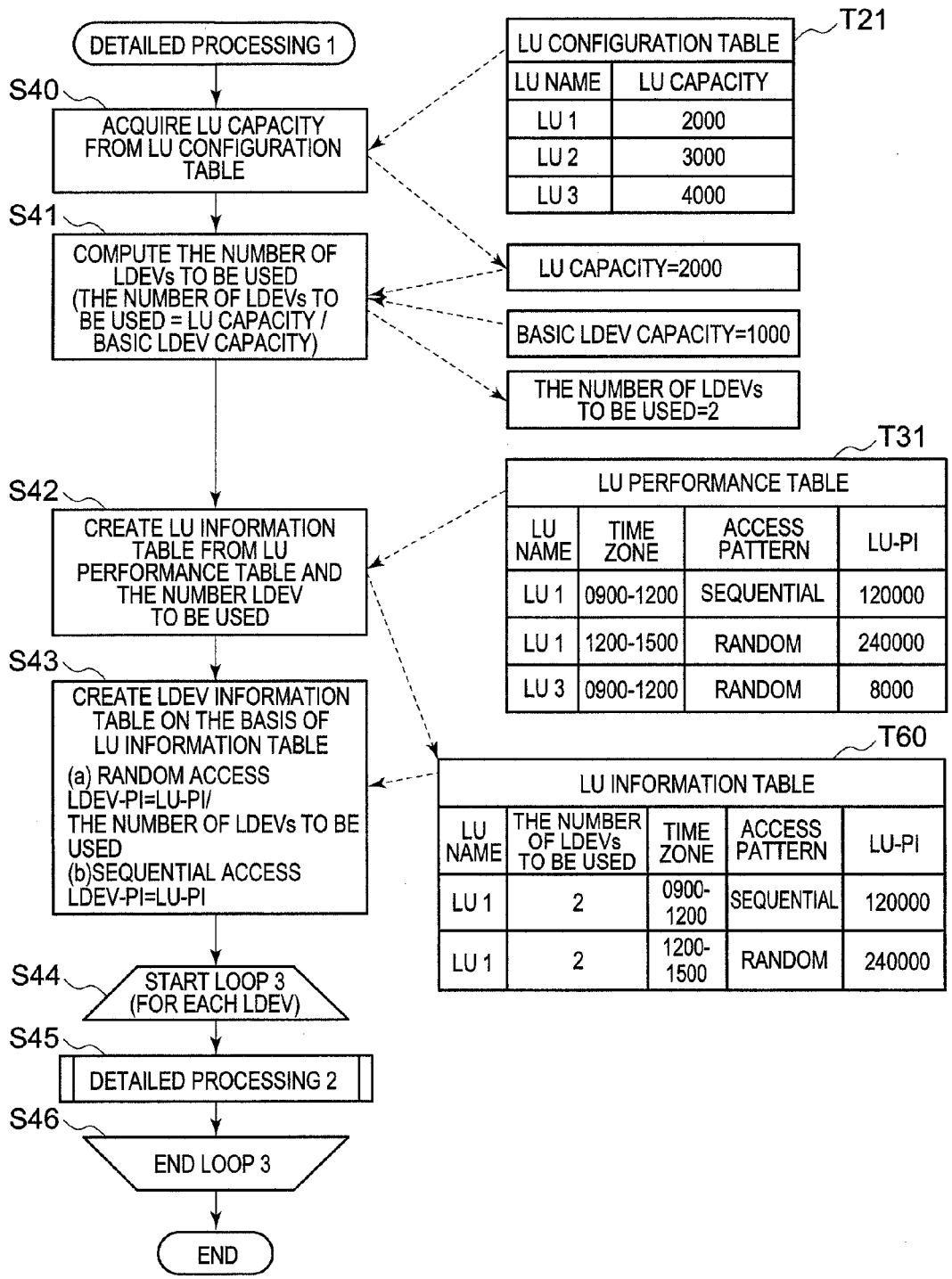
FIG. 15 is a flowchart showing the detail of the processing described in S27 in FIG. 13.

FIG. 15 is a flowchart showing the detailed processing 1 described in S27 in FIG. 13. This detailed processing is executed for each logical volume 102 included in the resource management group which is the target of processing.

The agent 300 acquires, from the LU configuration table T21, the storage capacity set in a logical volume 102 which is a target of processing (S40). The agent 300 computes the number of logical devices 230 associated with the logical volume 102, on the basis of the storage capacity of the logical volume (LU capacity in the figure) and basic LDEV capacity (S41). The number of logical devices 230 associated with the logical volume 102 is called "the number of LDEVs to be used" in the present embodiment. Specifically, the LU capacity is divided by the basic LDEV capacity, and the numbers after decimal point in the obtained value are truncated, whereby the number of LDEVs to be used can be obtained (the number of LDEVs to be used=LU capacity/basic LDEV capacity).

The agent 300 creates a LU information table T60 on the basis of the LU performance table T31 and the number of LDEVs to be used (S42). The LU information table T60 is a temporal work table that is used for the processing for associating the logical volume 102 with logical devices 230, and, for example, the name of LU which is a target of processing, the number of LDEVs to be used, the access pattern, and the performance indicator of the logical volume 102 are recorded for each time zone in this LU information table T60.

The agent 300 creates a LDEV information table T70 on the basis of the LU information table T60 (S43). The LDEV information table T70 is a temporal work table that is used for the processing for associating the logical volume 102 with logical devices 230, and the detail of this table is described hereinafter with reference to FIG. 16.

The performance indicator of a logical device 230 (LDEV_PI), which is set in the LDEV information table T70, is computed based on the following rule.

(1) When the Access Pattern is the Random Access

Suppose that the LDEV performance indicator is a value obtained by dividing the LU performance indicator by the number of LDEVs to be used (LDEV performance indicator=LU performance indicator/the number LDEVs to be used). As described above, in the case of random access, it can be expected that the storage regions within the logical volume 102 be accessed evenly from the host 20. Therefore, the load, which is added to the logical volume 102 (LU performance indicator), is divided by the number of logical devices 230 configuring this logical volume 102, whereby a value of the load added to each logical device 230 (LDEV performance indicator) can be obtained.

(2) When the Access Pattern is the Sequential Access

Suppose that the value of the LDEV performance indicator is same as that of the LU performance indicator. As described above, in the case of sequential access, data is inputted/outputted with respect to each of the logical devices 230 configuring the logical volume 102, in a concentrated manner. Therefore, it can be conceived that the load, which can be added to each logical device 230, is same as the load added to the logical volume 102.

In this manner, after the LDEV information table T70 is created, the agent 300 execute detailed processing 2 for each logical device 230 registered in the LDEV information table T70. The detail of the detailed processing 2 is described hereinafter with reference to FIG. 17.

FIG. 16 is an explanatory diagram showing a configuration of the LDEV information table T70 created in S43 shown in FIG. 15. The LDEV information table T70 makes association among, for example, a LDEV number, connecting number, LU name, RAID group number, access pattern, and LDEV performance indicator for each time zone, and saves such association.

For the LDEV numbers in the table T70, the number for specifying a logical device 230 to be associated with the logical volume 102 is set, the logical volume 102 being the target of processing. For the connecting numbers in the table T70, an order in which the logical device 230 is associated with the logical volume 102 is set, the logical volume 102 being the target of processing. For the RAID group number in the table T70, the number of the RAID group 220 to which the logical device 230 is allocated is set. At the point of time when the table T70 is created, the RAID group 220 to be provided with the logical device 230 is not yet determined, thus the section for the RAID group number is blank. For the LDEV performance indicator, a value obtained in S43 in FIG. 15 is set in accordance with the type of access pattern.

Figure 17:
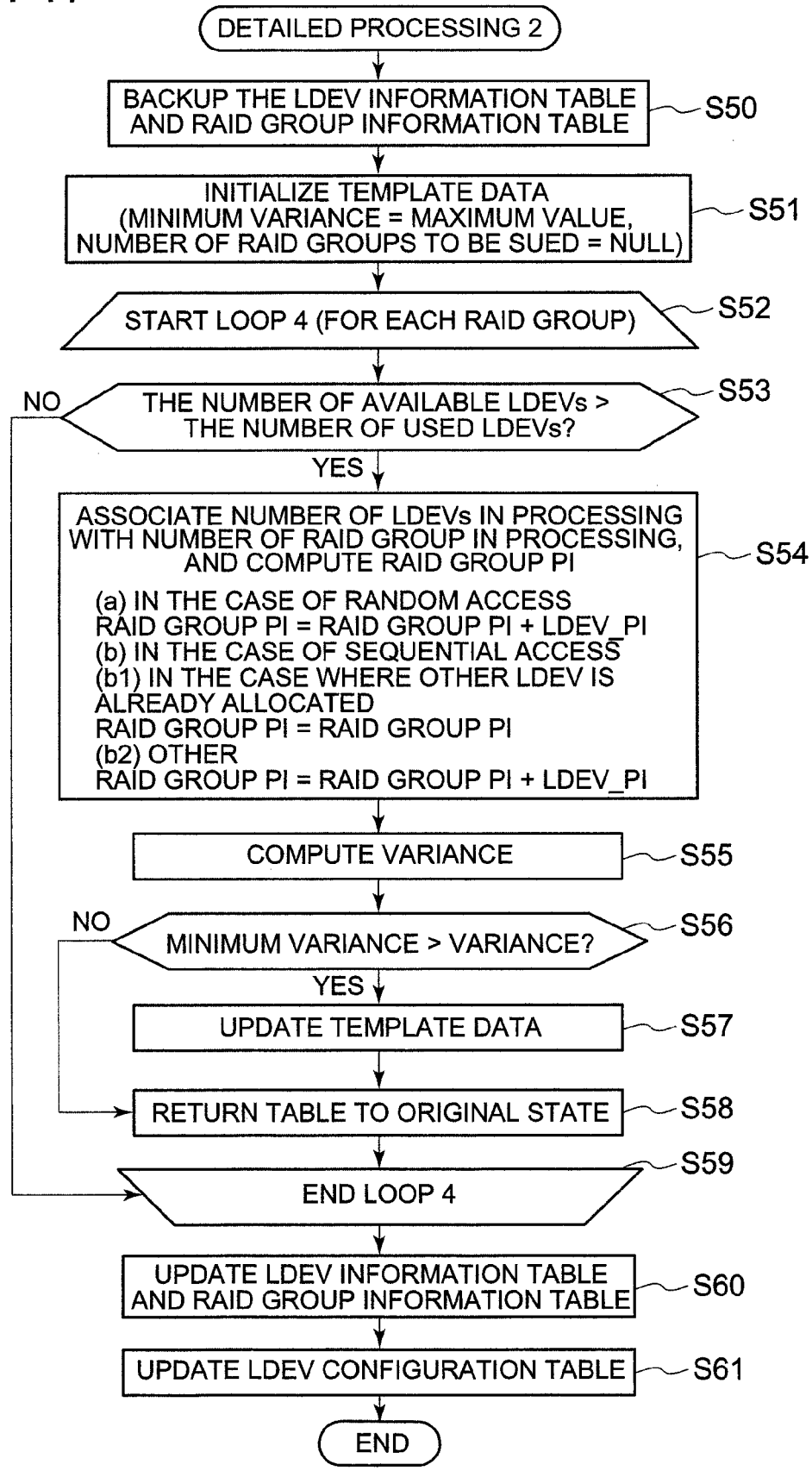
FIG. 17 is a flowchart showing the detail of the processing described in S45 in FIG. 15.

FIG. 17 is a flowchart showing the detailed processing 2 described in S45 in FIG. 15. First, the agent 300 creates backups of the LDEV information table T70 and RAID group information table T50 (S50).

Next, the agent 300 initializes template data (S51). The template data includes the minimum variance and the number of a RAID group 220 to be used. In S51, the maximum variance, which is prepared beforehand, is set as the initial value of the minimum variance. Furthermore, in S51, a null value is set as the number of a RAID group 220 to be used.

The agent 300 executes steps of a loop 4 for each RAID group 220 described in the RAID group information table T50. The agent 300 then compares the number of available LDEVs of the RAID group 220 which is the target of processing, with the number of used LDEVs, and determines whether the number of available LDEVs is larger than the number of used LDEVs (S53).

If the number of available LDEVs is smaller than the number of used LDEVs (S53: NO), S54 through S58 are skipped, and the loop 4 is ended (S59).

If the number of available LDEVs is larger than the number of used LDEVs (S53: YES), the agent 300 associates the LDEV number in processing with the RAID group number in processing, and computes the performance indicator of the RAID group 220 (S54). Specifically, the agent 300 associates the LDEV number with the RAID group 220 having room to set the logical devices 230, and computes the performance indicator for the case where the logical devices 230 are allocated to this RAID group 220. More specifically, in the LDEV information table T70, the number of RAID group 220 in processing is set as the RAID group number corresponding to the LDEV number in processing, and in the RAID group information table T50 the value indicating the number of used LDEVs of the RAID group 220 in processing is added with one. The performance indicator of the RAID group 220 is computed in accordance with the type of access pattern.

(1) When the Access Pattern is the Random Access

The performance indicator of a logical device 230 is added to the latest performance indicator of the RAID group 220, whereby the performance indicator of the RAID group 220 is computed (RAID group PI=RAID group PI+LDEV_PI). Therefore, in the case of random access, the larger the number of logical devices 230 to be allocated to this RAID group 220 becomes, the larger the value of the performance indicator of this RAID group 220.

(2) When the Access Pattern is the Sequential Access

There is a case where one or more logical devices 230 are already allocated to this RAID group 220 (2-1), and a case where no logical device 230 is allocated (2-2).

(2-1) When Logical Devices are Already Allocated

The value of the performance indicator of the RAID group 220 is not changed. Specifically, in the case where the number of logical devices 230 allocated to this RAID group 220 is one or more, the value of the performance indicator of the RAID group 220 becomes same as that of the LDEV performance indicator, and does not change. However, as described above, the value of the LDEV performance indicator for the case of sequential access is larger than the value of the performance indicator for the case of random access.

(2-2) When No Logical Device is Allocated

The value of the performance indicator of the logical device 230 is set for the value of the performance indicator of the RAID group 220.

Next, the agent 300 computes the variance for the performance indicator of each RAID group 220 (S55), and compares the computed variance with the minimum variance (S56). The method of computing the variance is described hereinafter with reference to FIG. 19.

In the case where the variance computed in S55 is smaller than the minimum variance (S56: YES), the agent 300 updates the minimum variance which is the template data (S57). The agent 300 returns the LDEV information table T70 and RAID group information table T50 in which values of some items have been updated in S54, to original state (S58). Specifically, the LDEV information table T70 and RAID group information table T50 which are backed up in S50 are returned to original state.

In this manner, in the loop 4 the performance indicator and variance are computed for each RAID group. When the loop 4 is ended (S59), the agent 300 updates the LDEV information table T70 and RAID group information table T50 on the basis of the RAID group number in which the variance becomes minimum (S60). Finally, the agent 300 updates the LDEV configuration table T22 on the basis of the stored contents of the LDEV information table T70 (S61), and ends the detailed processing 2.

Figure 18:
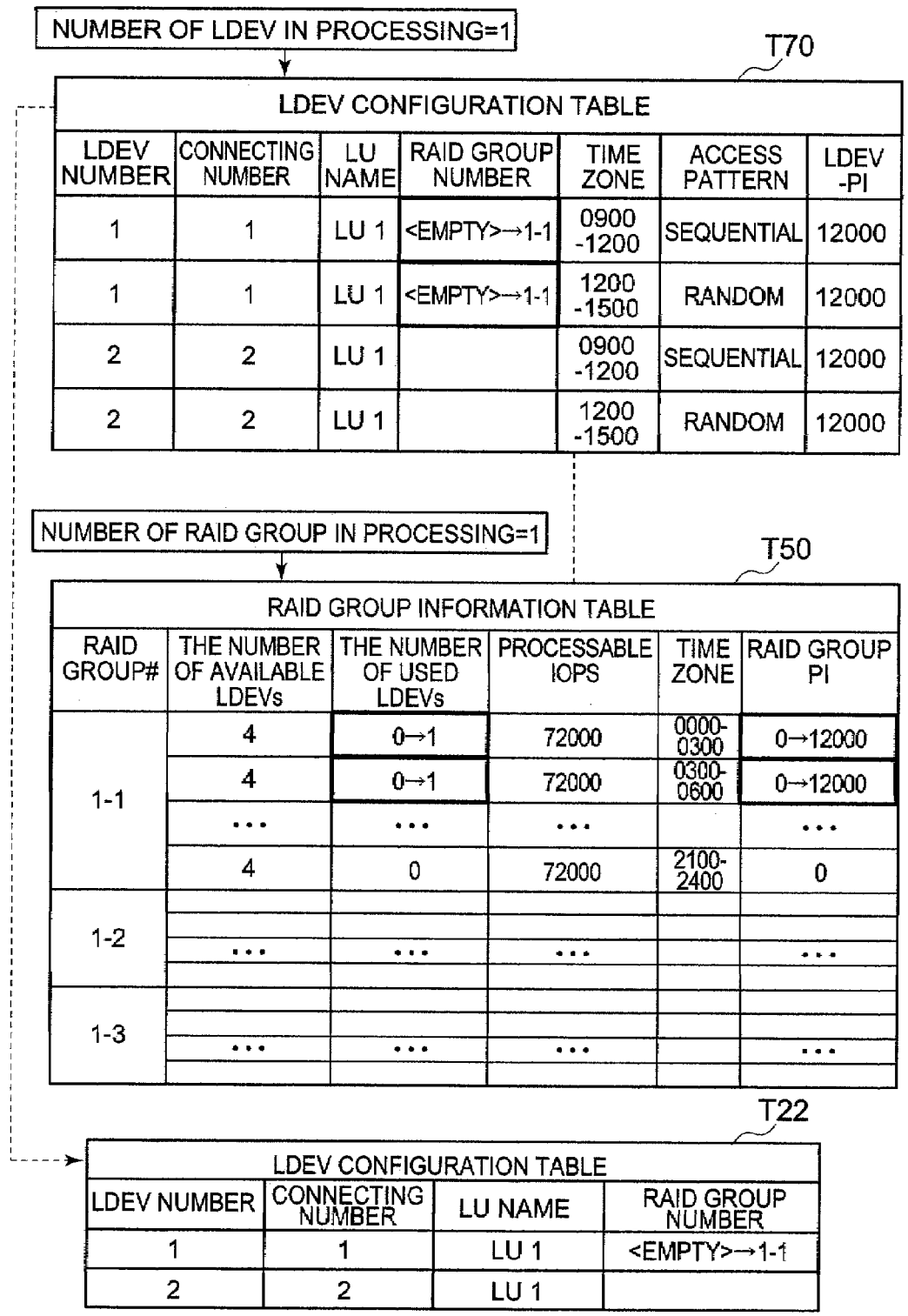
FIG. 18 is an explanatory diagram showing the relationship between the LDEV information table and the RAID group information table.

FIG. 18 is an explanatory diagram showing a change of the LDEV information table T70 and RAID group information table T50 with respect to the flowchart shown in FIG. 17. In the LDEV information table T70, the number of a RAID group 220 in the processing is set in the section of the RAID group number corresponding to the LDEV number in processing. Therefore, the section of the RAID group number is changed from a blank to the number of the RAID group 220 in processing.

In the RAID group information table T50, the value of the number of used LDEVs increases by one in the number of the RAID group 220 in processing. Moreover, the value of the performance indicator of the RAID group 220 is computed in accordance with the type of access pattern and then registered. Finally, in the LDEV configuration table T22, the number of a RAID group 220 in which the variance becomes minimum is set as the destination to allocate logical devices 230 associated with the logical volume 102 in processing. In FIG. 18, although a part of the time zone is omitted, a record is formed for each time zone in a manner described above.

FIG. 19 is an explanatory diagram showing the method for computing a variance. Before obtaining a variance, an average value of the performance indicators of the RAID groups 220 is computed from the following equation 1. Specifically, the RAID group performance indicators described in the RAID group information table T70 are integrated with respect to all records in the table T70, and thus obtained integrated value is divided by the number of all records, whereby the average value can be obtained. The total number of records is obtained by multiplying the number of RAID groups 220 registered in the RAID group information table T70 by the number of time zones.

Average value=(1/number of all records)×ΣRAID group PI    (Equation 1)

The variance can be obtained by integrating the square of the difference between the performance indicator of each RAID group 220 and the average value by the number of all records in the RAID group information table T50, and dividing the integrated value by the number of all records.

Variance=(1/number of all records)×Σ(RAID group PI−average value)^2    (Equation 2)

As described above, the agent 300 computes the variance value of each RAID group performance indicator for the case where each of the logical devices 230 configuring the logical volume 102 is allocated to each RAID group 220, in the resource management group.

Figure 20:
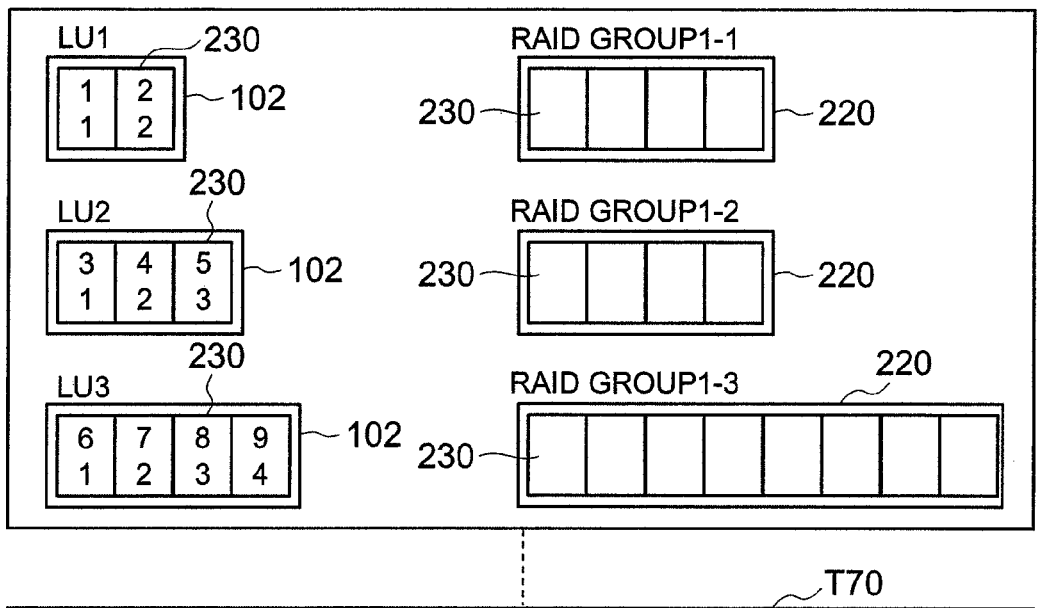
FIG. 20 is an explanatory diagram showing an initial state prior to association of the logical volume with the logical devices.

FIG. 20 through FIG. 33 are used to explain a part of a state in which the destination to allocate the logical devices 230 configuring the logical volume 102. FIG. 20 shows an initial state in which the logical volume 102 and the logical devices 230 are not yet associated with each other.

In the following example, three logical volumes 102 (LU1, LU2, LU3) and three RAID groups 220 (1-1, 1-2, 1-3) are included in one resource management group.

Two logical devices 230 (#1, #2) are associated with the first logical volume 102 (LU1), three logical devices 230 (#3, #4, #5) are associated with the second logical volume 102 (LU2), and four logical devices 230 (#6, #7, #8, #9) are associated with the third logical volume 102 (LU3). In the drawing showing the logical devices 230, each of the numeric characters on the upper level indicates the LDEV number, and each of the numeric characters on the lower level indicates the connecting number.

Furthermore, a maximum of four logical devices 230 can be allocated to the first RAID group 220 (1-1) and the second RAID group 220 (1-2), and a maximum of eight logical devices 230 can be allocated to the third RAID group 220 (1-3).

As shown in the LDEV information table T70 in FIG. 20, the performance indicator and access pattern are registered in each logical device 230 for each time zone. The section of the RAID group number is blank.

FIG. 21 shows an initial state of the RAID group information table T50. In the initial state, a logical device 230 is not allocated, thus an initial value of "0" is set in the section of the number of used LDEVs. In the section of the processable IOPS, a value corresponding to the specification of the RAID group 220 is set. The initial value of "0" is set as the value of the performance indicator of the RAID group 220. When simulation of allocating logical devices 230 to the RAID group 220 is performed, the RAID group performance indicator is computed and written in the table T50.

Figure 22:
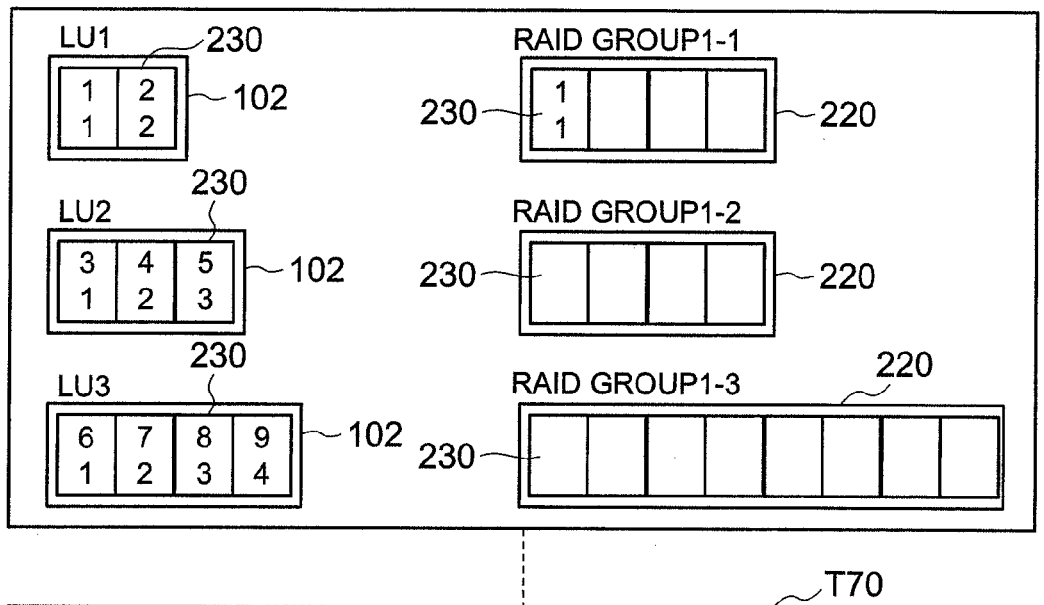
FIG. 22 is an explanatory diagram showing a state in which one logical device is allocated to a RAID group.

FIG. 22 shows a state in which the logical device 230 (#1) is allocated. The LDEV information table T70 shown in FIG. 22 shows a state in which the logical device 230 (#1) is allocated to the RAID group 220 (1-1).

When the logical device 230 (#1) is allocated to the RAID group 220 (1-1), the performance indicator of the RAID group 220 (1-1) is changed from "0" to "12000", as shown in FIG. 23.

In this example, the pattern of access made from the host 20 to the target logical volume 102 (LU1) in a time zone of "0900-1200" (between 9 o'clock and 12 o'clock) is sequential access, and the performance indicator in such a case is set to "12000". Furthermore, the access pattern to the logical volume 102 (LU1) in a time zone of "1200-1500" (between 12 o'clock and 15 o'clock) is random access, and the performance indicator in such a case is set to "24000".

As described above, in this example, the logical volume 102 (LU1) is constituted by the two logical devices 230 (#1, #2). Therefore, in the time zone of "0900-1200" in which the access is made sequentially, the performance indicator of each of the logical devices 230 (#1, #2) is "12000" (LDEV performance indicator=LU performance indicator). In the time zone of "1200-1500" in which the access is made randomly, the performance indicator of each of the logical devices 230 (#1, #2) is also "12000" (LDEV performance indicator=LU performance indicator/the number of used LDEVs=24000/2).

Therefore, in the case where the logical device 230 (#1) is allocated to the RAID group 220 (1-1), the performance indicator of the RAID group 220 (1-1) in the time zone of "0900-1200" is "12000", and the performance indicator of the RAID group 220 (1-1) in the time zone of "1200-1500" is also "12000", as shown in FIG. 23.

Also, in the case where the logical device 230 (#1) is allocated to other RAID groups 220 (1-2) and 220 (1-3), it is easily understood that the value of the RAID group performance indicator becomes "12000" in each of the time zones. As a result, even when the logical device 230 (#1) is associated with any of the RAID groups 220 (1-1, 1-2, 1-3), variances of the RAID group performance indicators become the same value. Therefore, the agent 300 determines the first processed RAID group 220 (1-1) as the destination to allocate the logical device 230 (#1). In other words, the agent 300 decides to provide the first processed RAID group 220 (1-1) with the logical device 230 (#1).

Figure 24:
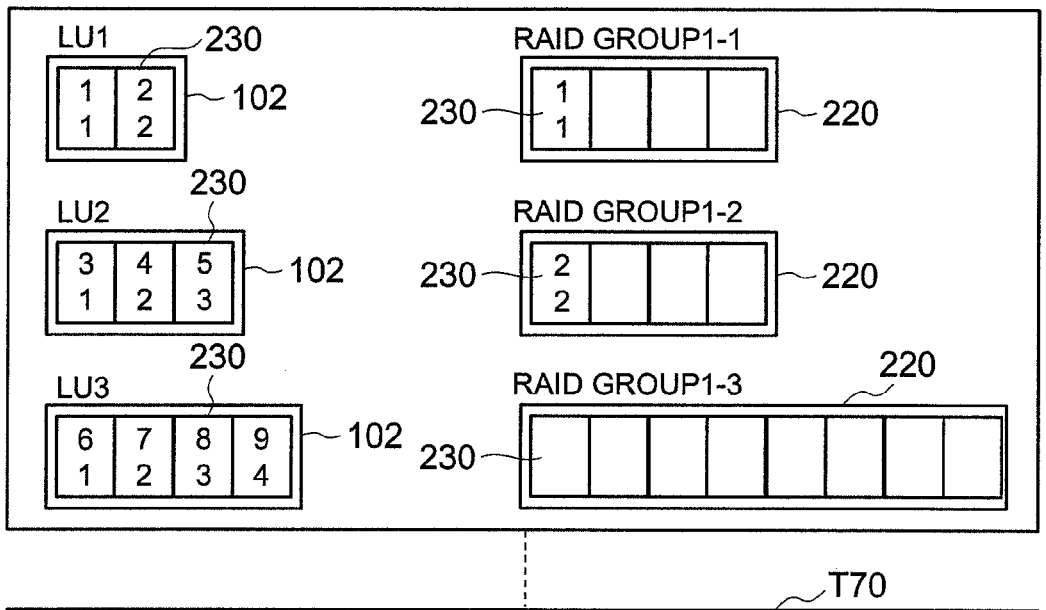
FIG. 24 is an explanatory diagram showing a state in which, subsequent to FIG. 22, other logical device is allocated to the RAID group.

FIG. 24 shows a state in which the second logical device 230 (#2) configuring the logical volume 102 (LU1) is allocated. FIG. 24 shows a state in which the logical device 230 (#2) is allocated to the RAID group 220 (1-2).

When the logical device 230 (#2) is allocated to the RAID group 220 (1-2), the performance indicator of the RAID group 220 (1-2) becomes "12000" in each time zone, "0900-1200" and "1200-1500", as shown in FIG. 25.

As with the case where the logical device 230 (#2) is allocated to the RAID group 220 (1-2), in the case where the logical device 230 (#2) is allocated to the RAID group 220 (1-3), the performance indicator is "12000" in each of the abovementioned time zones.

Since the logical device 230 (#1) is already allocated to the RATD group 220 (1-1), the performance indicator is "12000" in each of the time zones. If the logical device 230 (#2) is allocated to the RAID group 220 (1-1), the performance indicator is increased to "24000" in each of the time zones.

Therefore, the variance for the case where the logical device 230 (#2) is allocated to the RAID group 220 (1-1) is higher than the variance for the case where the logical device 230 (#2) is allocated to either the RAID group 220 (1-2) or 220 (1-3).

When the variance increases, it means that inequality in loads among the RAID groups 220 (1-1, 1-2, 1-3) increases. When the variance decreases, it means that the loads of the RAID groups 220 (1-1, 1-2, 1-3) are balanced.

Therefore, either the RAID group 220 (1-2) or 220 (1-3) in which the variance becomes minimum is selected as the destination to allocate the logical device 230 (#2). The agent 300 determines the RAID group 220 (1-2), which is considered previously, as the destination to allocate the logical device 230 (#2). Accordingly, the association between the logical volume 102 (LU1) and each of the logical devices 230 (#1, #2) is completed.

Figure 26:
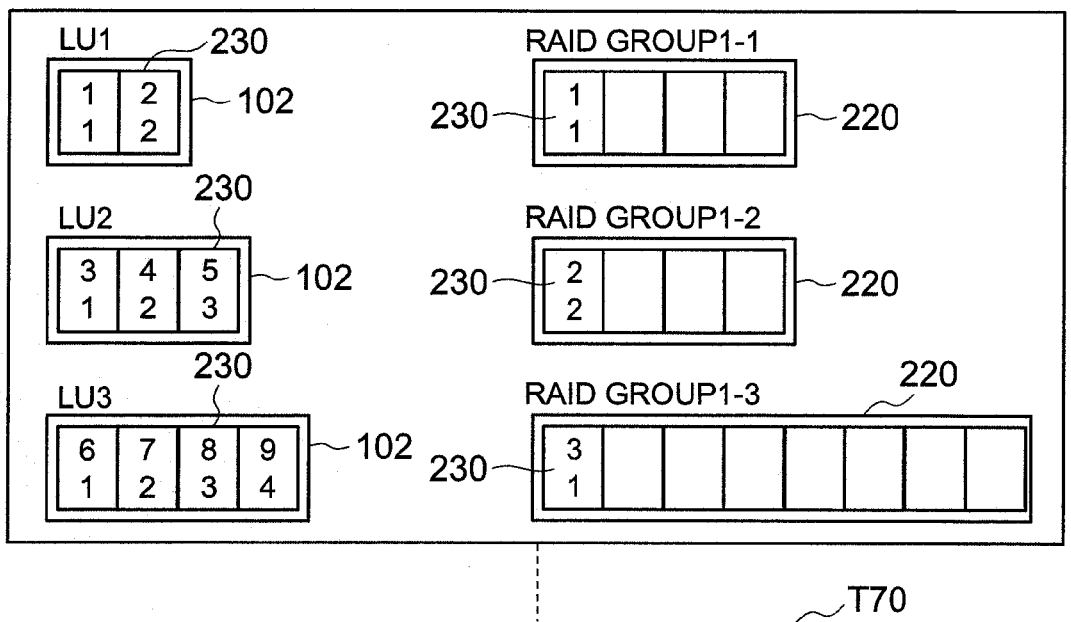
FIG. 26 is an explanatory diagram showing a state in which, subsequent to FIG. 24, yet other logical device is allocated to the RAID group.

FIG. 26 and FIG. 27 show the case for considering the destination to allocate the logical device 230 (#3) which is to be associated with the second logical volume 102 (LU2) first. Although the access pattern is changed depending on time zones in the abovementioned first logical volume 102 (LU1), the access pattern for the second logical volume 102 (LU2) is random access in any time zone. In the case where the performance indicator of the logical volume 102 (LU2) is set to "8000", the performance indicator of the RAID group 220 to which the logical device 230 (#3) is allocated is "8000".

FIG. 26 shows the case where the logical device 230 (#3) is allocated to the RAID group 220 (1-3). As shown in FIG. 27, the performance indicator of the RAID group 220 (1-3) is "8000" in any of the time zones. If the logical device 230 (#3) is allocated to either the RAID group 220 (1-1) or 220 (1-2), the value of the RAID group performance indicator becomes "20000 (=12000+8000)" in each time zone.

Therefore, as shown on the lower side in FIG. 27, the variance for the case where the logical device 230 (#3) is allocated to the RAID group 220 (1-3) is smaller than the variance for the case where the logical device 230 (#3) is allocated to either the RAID group 220 (1-1) or 220 (1-2). Therefore, the agent 300 selects the RAID group 220 (1-3) as the destination to allocate the logical device 230 (#3).

Figure 28:
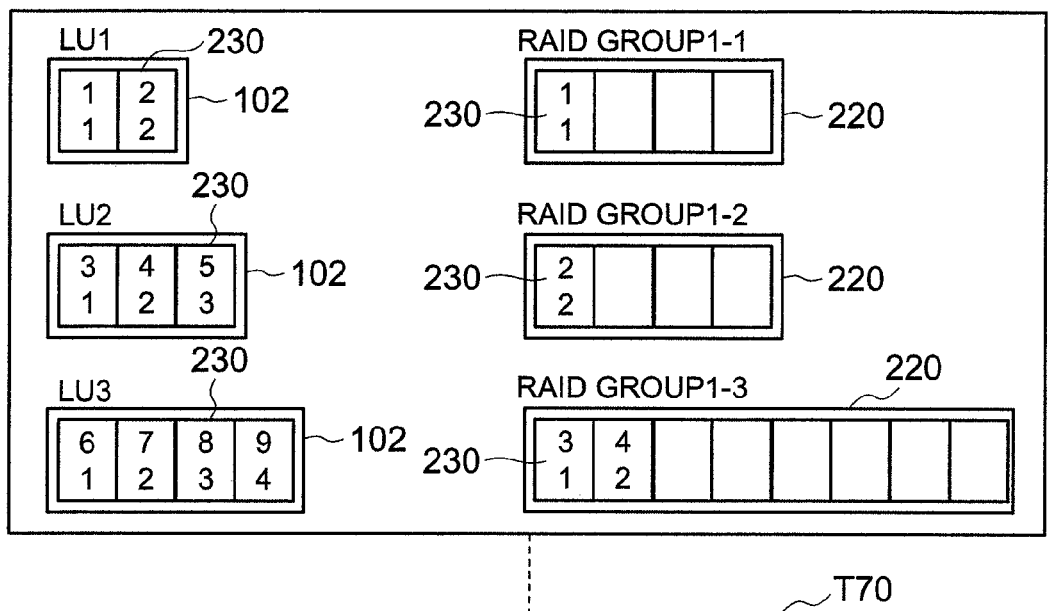
FIG. 28 is an explanatory diagram showing a state in which, subsequent to FIG. 26, a logical device is allocated to the RAID group.

Similarly, FIG. 28 and FIG. 29 show a state in which the logical device 230 (#4) is associated with the logical volume 102 (LU2). FIG. 28 shows a state in which the logical device 230 (#4), which is associated secondly with the logical volume 102 (LU2), is allocated to the RAID group 220 (1-3).

As shown in FIG. 29, when the logical device 230 (#4) is allocated to the RAID group 220 (1-3), the performance indicator of the RAID group 220 (1-3) is "16000 (=8000+8000)" in each time zone.

In the case of computing the variance for the case where the logical device 230 (#4) is allocated to each of the RAID groups 220 (1-1, 1-2, 1-3), the variance for the case where the logical device 230 (#4) is allocated to the RAID group 220 (1-3) is the minimum variance. Therefore, the agent 300 selects the RAID group 220 (1-3) as the destination to allocate the logical device 230 (#4).

Figure 30:
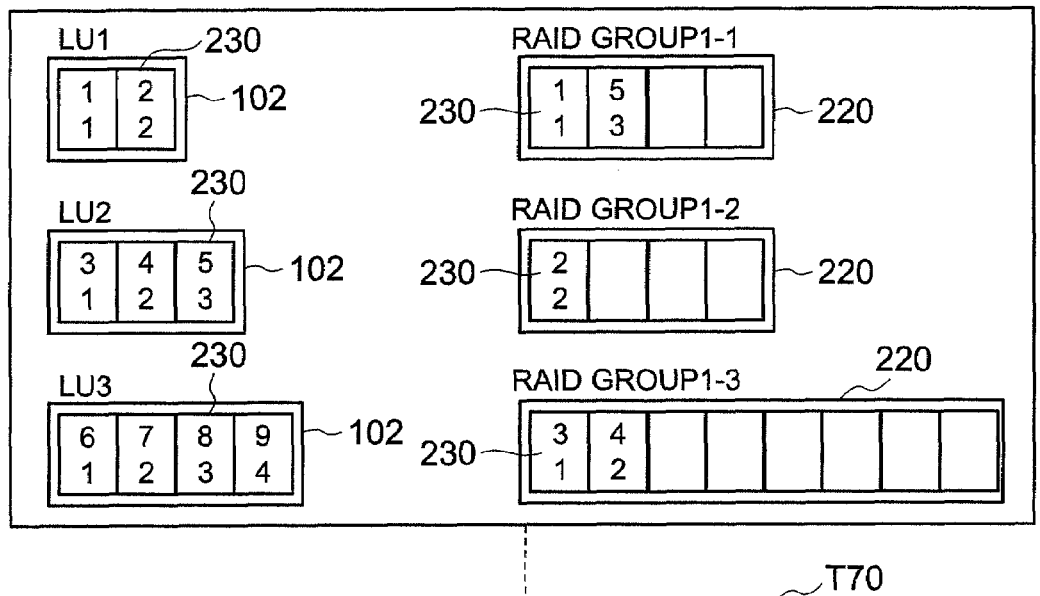
FIG. 30 is an explanatory diagram showing a state in which, subsequent to FIG. 28, a logical device is allocated to the RAID group.
Figure 31:
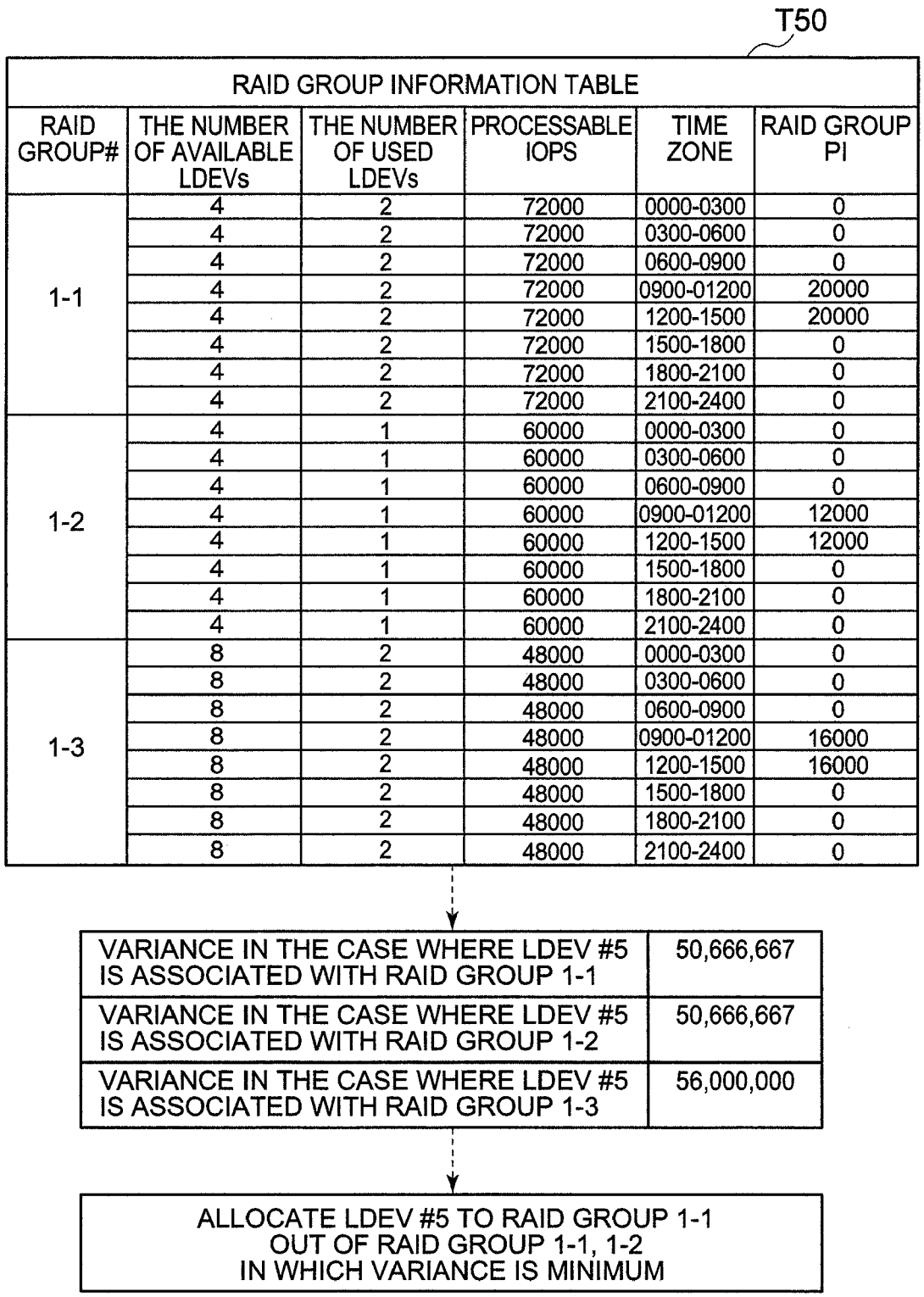
FIG. 31 is an explanatory diagram showing a state in which the destination to allocate the logical device is determined based on a variance of a RAID group performance indicator.

Similarly, FIG. 30 and FIG. 31 show a state in which the logical device 230 (#5) is associated with the logical volume 102 (LU2). FIG. 30 shows a state in which the logical device 230 (#5), which is associated thirdly with the logical volume 102 (LU2), is allocated to the RAID group 220 (1-1).

As shown in FIG. 31, when the logical device 230 (#5) is allocated to the RAID group 220 (1-1), the performance indicator of the RAID group 220 (1-1) is "20000 (=12000+8000)" in each time zone.

In the case of computing the variance for the case where the logical device 230 (#5) is allocated to each of the RAID groups 220 (1-1, 1-2, 1-3), the variance for the case where the logical device 230 (#5) is allocated to either the RAID group 220 (1-1) or 220 (1-2) is the minimum variance. Therefore, the agent 300 selects the first processed RAID group 220 (1-1) as the destination to allocate the logical device 230 (#5).

Figure 32:
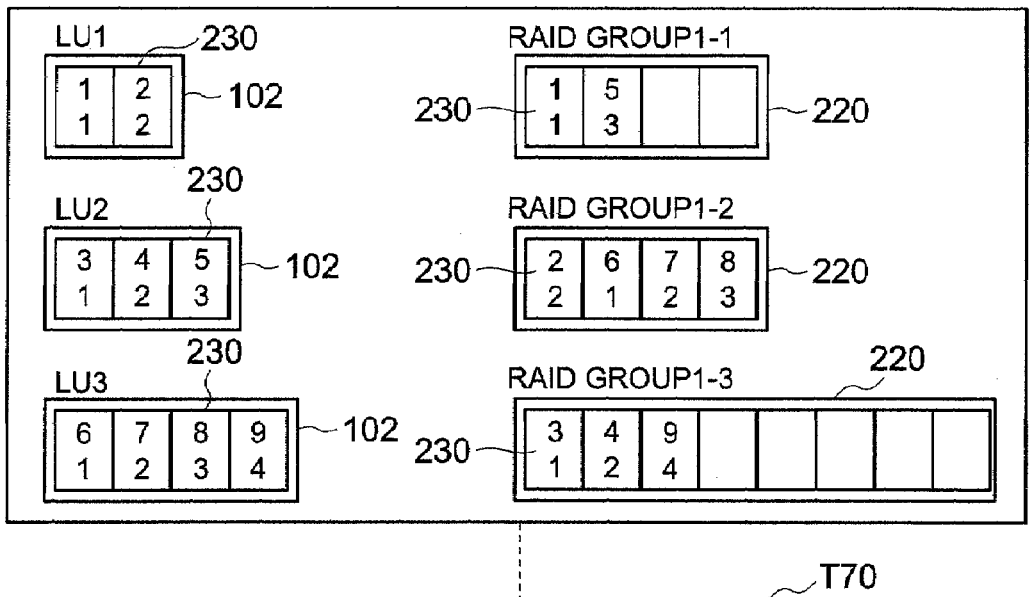
FIG. 32 is an explanatory diagram showing a result of associating logical devices with all logical volumes respectively.

FIG. 32 and FIG. 33 show a state in which associating the third logical volume 102 (LU3) with each logical device 230 (#6 through #9) is finished. Specifically, the figures show a state in which the agent 300 finishes associating each logical volume 102 (LU1 through LU3) with each logical device 230 (#1 through #9) within one resource management group.

The detail of the processing in which the four logical devices 230 (#6 through #9) with the third logical volume 102 (LU3) is same as the above-described case in which the logical devices 230 (#1 through #5) are associated with the logical volumes 102 (LU1, LU2), thus the description for such processing is omitted.

Since the present embodiment is constituted as described above, the following effects are achieved. The present embodiment is configured such that the RAID group 220 to allocate each of the logical devices 230 configuring the logical volume 102 is selected based on the type of access pattern and the processing performance (performance indicator) required for the logical volume 102. Therefore, the load is dispersed among the RAID group 220, whereby the responsive performance of the storage controller 10 can be improved.

Particularly, in the present embodiment, the method of computing the performance indicator is different between the random access and the sequential access. In the case of the random access, the logical devices 230 configuring the logical volume 102 are allocated to different RAID group 220. Therefore, the load in each RAID group 220 in random access can be reduced, the responsive performance of the storage controller 10 with respect to the random access can be improved, and the usability for the user improves.

Embodiment 2

The second embodiment of the present invention is described with reference to FIG. 34 and FIG. 35. The following examples including the present invention are same as the modifications of the above-described first embodiment. In the present embodiment, the agent 300 and the like are provided inside the storage controller 10, and the storage controller 10 itself automatically executes the processing of associating the logical volume 102 with the logical devices 230.

Figure 34:
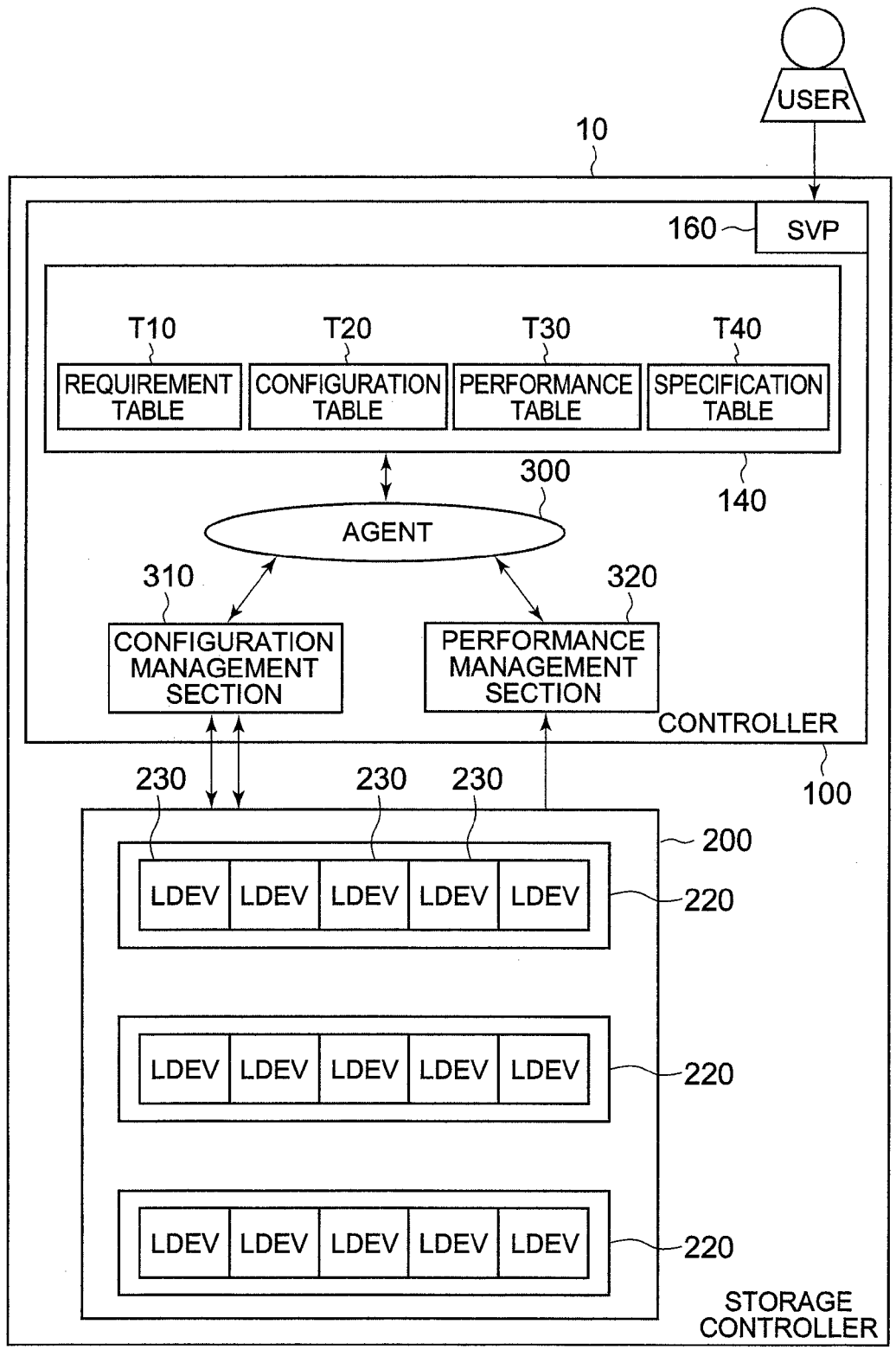
FIG. 34 is an explanatory diagram showing a functional configuration of the storage controller according to a second embodiment.

FIG. 34 is an explanatory diagram which schematically shows the configuration of the storage controller 10 according to the present embodiment. The controller 100 is provided with the agent 300, configuration management section 310 and performance management section 320. Furthermore, the tables T10 through T40 are stored in the shared memory 140. It should be noted that the tables T10 through T40 can be stored in the cache memory 130 as well.

The user can set various conditions for associating the logical volume 102 with the logical devices 230, into the agent 300 within the controller 100 via the SVP 160.

Figure 35:
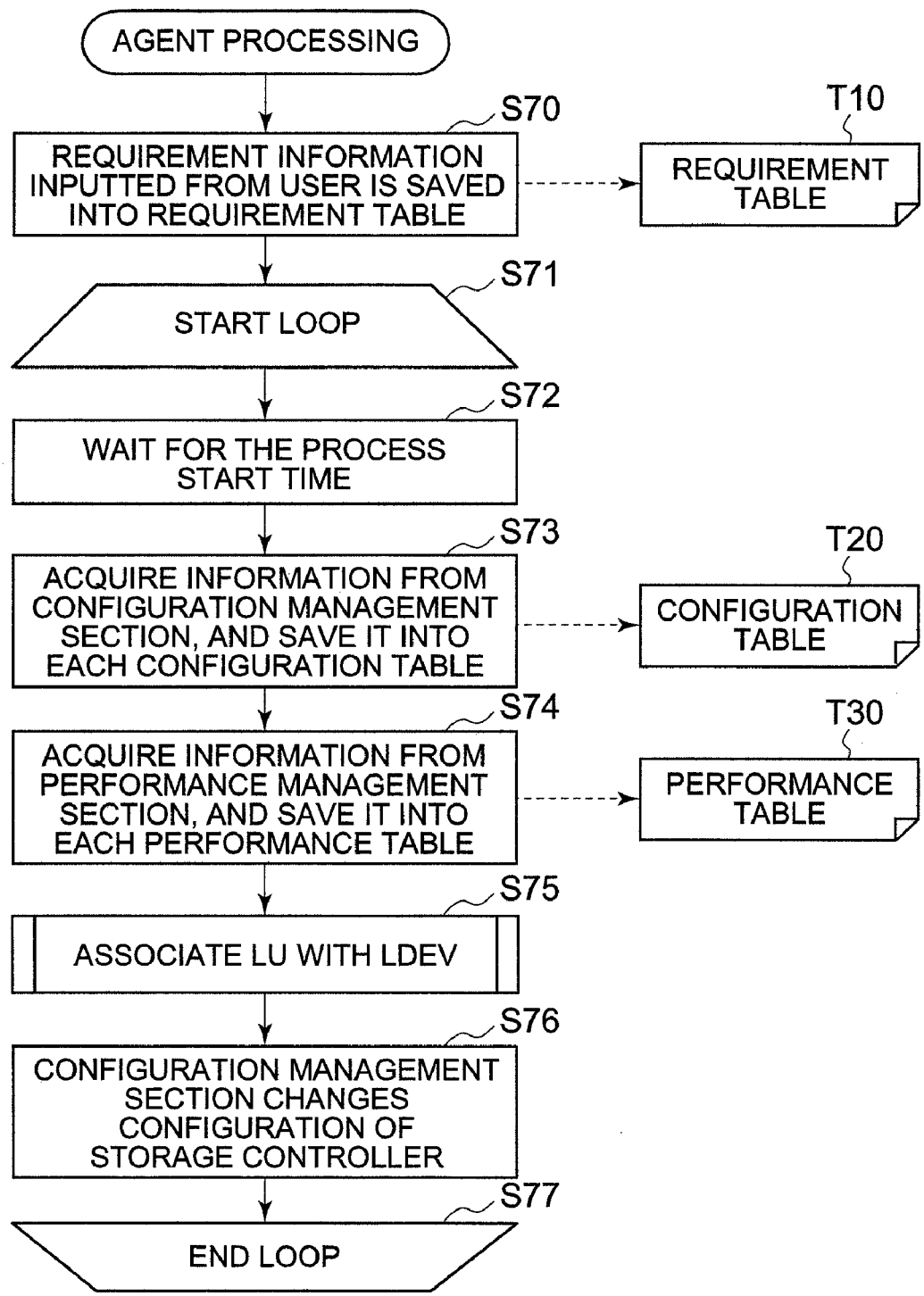
FIG. 35 is a flowchart showing the agent processing.

FIG. 35 is a flowchart showing the agent processing according to the present embodiment. First, the agent 300 saves requirement information inputted by the user into the requirement table T10 (S70). The agent 300 then waits for the time specified by the user (S71, S72, S77). The time is the time when the processing for associating the logical volume 102 with the logical devices 230 is started. The user can judge a time zone in which the number of accesses from the host 20 is small, and specify the process start time.

When the specified time comes, the agent 300 acquires information on the configuration of the storage controller 10 from the configuration management section 310, and saves the information into the configuration table T20 (S73). Moreover, the agent 300 acquires information on the performance of the storage controller 10 from the performance management section 320, and saves the information into the performance table T30 (S74).

As with the manner described in the above embodiment, the agent 300 executes the processing for associating the logical volume 102 with the logical devices 230 (S75). The processing in S75 is same as the one described in the first embodiment, thus the explanation thereof is omitted. Finally, the agent 300 uses the configuration management section 310 to change the configuration of the storage controller 10 (S76).

The present embodiment configured as above can achieve the same effects achieved by the first embodiment. In addition, the present embodiment has a configuration in which the agent 300 and the like are provided in the storage controller 10, thus the management server 30 is not required, whereby the configuration can be made simple. Moreover, in the present embodiment, the processing for associating the logical volume 102 with the logical devices 230 is automatically executed at the time specified previously by the user, thus usability for the user further improves.

Embodiment 3

The third embodiment is described with reference to FIG. 36. The present embodiment suggests another method of computing a variance. FIG. 36 is an explanatory diagram showing the method of computing a variance. In the present embodiment, an indicator called "excess IOPS" is used in place of the RAID group performance indicator shown in the equation 2 above.

The excess IOPS is a value obtained by subtracting the RAID group performance indicator from the value of the maximum IOPS which can be processed by each RAID group 220 (excess IOPS=processable IOPS−RAID group performance indicator (RAID group PI)). Specifically, the excess IOPS is an indicator that indicates an allowance in the processing of the RAID group 220. In the present embodiment variances are computed according to the following equation 3.

$$\text{Variance} = (1/\text{number of all records}) \times \Sigma(\text{excess IOPS} - \text{average value})^2 \quad \text{(Equation 3)}$$

Then, as with the first embodiment or the second embodiment, the agent 300 determines the destination to allocate the logical devices 230 for each logical device 230 so that the variance becomes minimum.

Embodiment 4

The fourth embodiment is described with reference to FIG. 37 through FIG. 39. In the present embodiment, logical devices 230 with low connecting numbers (logical devices having small connecting numbers) are prevented from being disposed to only a specific RAID group 220.

Figure 37:
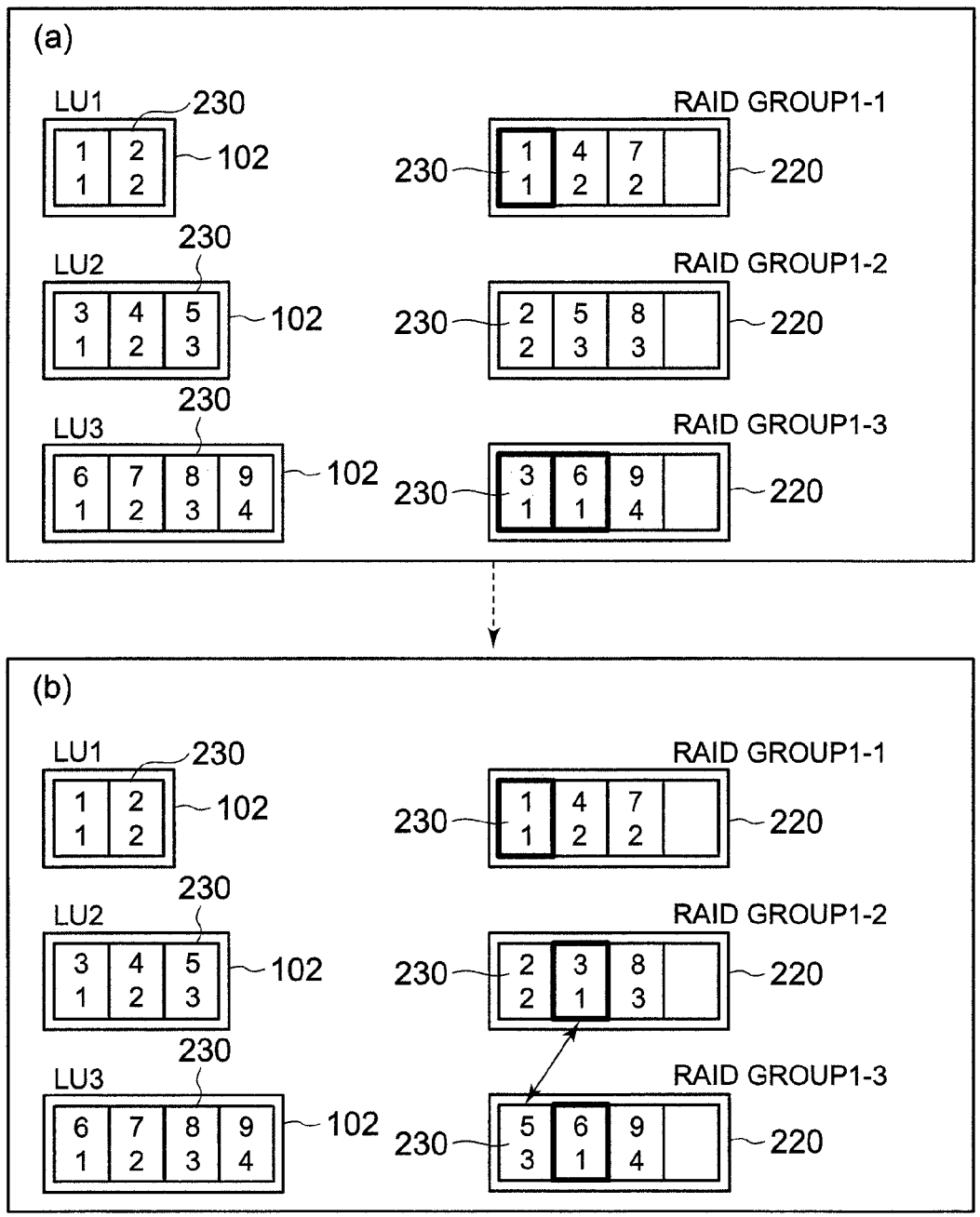
FIG. 37 is an explanatory diagram showing an outline of processing in a fourth embodiment.

FIG. 37 is an explanatory diagram showing an outline of the processing performed in the present embodiment. As shown in FIG. 37A, it is determined that the logical devices 230 (#1, #4, #7) be allocated to the RAID group 220 (1-1), the logical devices 230 (#2, #5, #8) be allocated to the RAID group 220 (1-2), and the logical devices 230 (#3, #6, #9) be allocated to the RAID group 220 (1-3).

In FIG. 37, each of the logical devices 230 (#1, #3, #6) shown with a thick line has a connecting number "1" and is a logical device that is associated first to the logical volume 102. In the following description, the logical devices 230 having the connecting number "1" are sometimes called "front logical devices 230".

The front logical devices 230 are associated with the logical volume 102 first, and, out of all storage regions of the logical volume 102, take charge of the storage regions worth of the capacity between the front address of the logical volume and the front logical devices 230.

Although depending on the type of application program executed on the host 20, a certain type of application program causes the front part of the storage regions to store, for example, management data, and causes other part of the storage regions to store other normal data. Frequency in the use of the management data is higher than that of the normal data. Therefore, the front logical devices 230 in charge of the front part of the storage regions of the logical volume 102 are highly likely accessed from the host 20, compared to the logical devices 230 in charge of other part of the storage regions of the logical volume 102. Particularly, in the case of database management software, it is conceived that the data, which is stored in other part of the storage regions, is often accessed randomly, on the basis of the data stored in the front part of the storage regions.

In the allocation example shown in FIG. 37A, two front logical devices 230 (#3, #6) are allocated to the RAID group 220 (1-3). Therefore, even when FIG. 37A shows the allocation example in which the variance of the RAID group performance indicator is minimized, actually there is a possibility that frequency of access to the RAID group 220 (1-3) exceeds frequency of access to other RAID groups 220 (1-1, 1-2).

Therefore, in the present embodiment, as shown in FIG. 37B, the destination to allocate the front logical device 230 (#3) is changed from the RAID group 220 (1-3) to the RAID group 220 (1-2). Specifically, the front logical device 230 (#3), which is planned to be allocated to the RAID group 220 (1-3), is switched with the logical device 230 (#5), which is planned to be allocated to the RAID group 220 (1-2). Accordingly, each RAID group 220 is provided with one front logical device 230.

Figure 38:
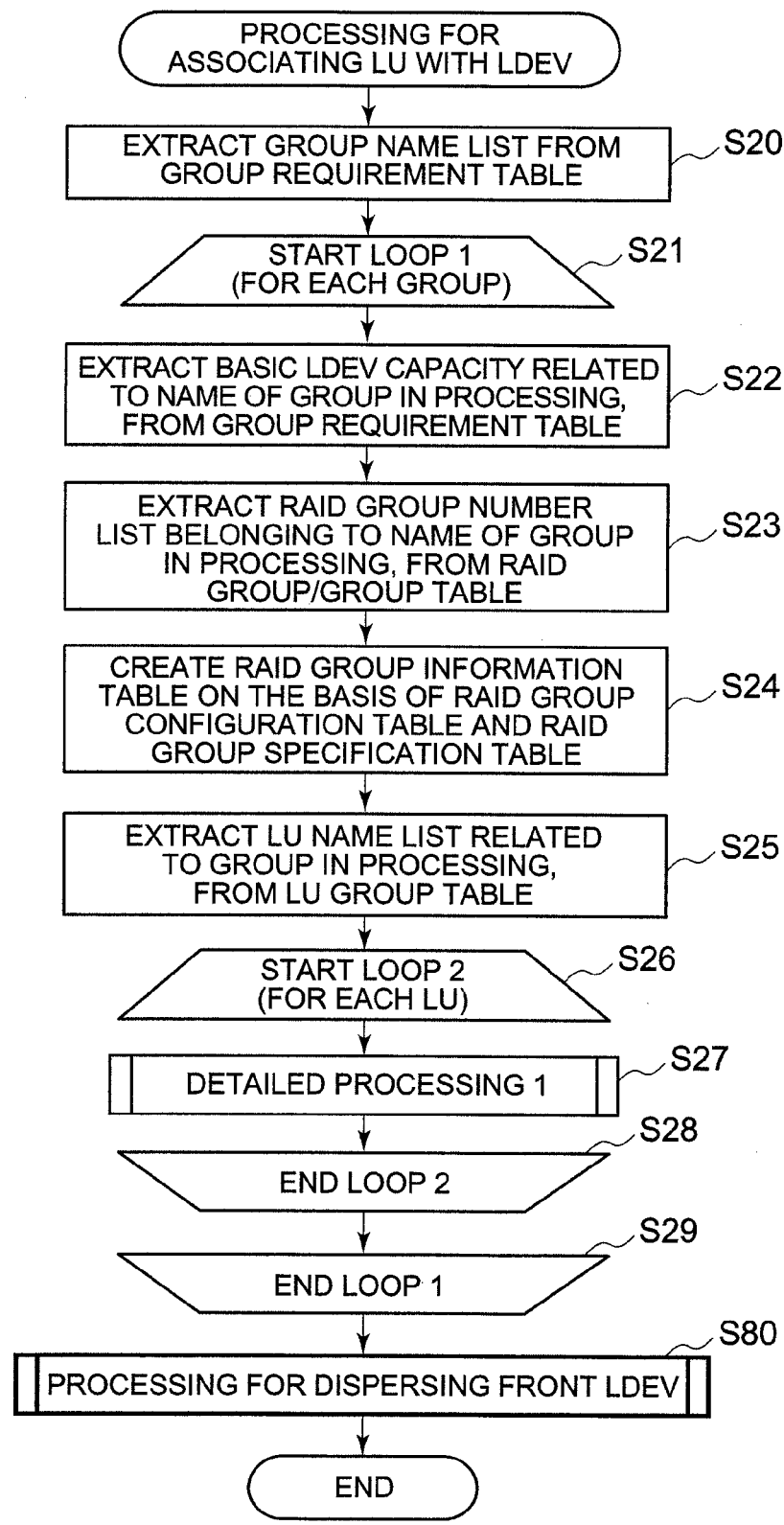
FIG. 38 is a flowchart showing processing for associating a logical volume with a logical device.

FIG. 38 is a flowchart showing the processing for associating the logical volume 102 with the logical devices 230 according to the present embodiment. The flowchart shown in FIG. 38 has the steps S20 through S29 that are same as those of the flowchart shown in FIG. 13. Moreover, in the flowchart shown in FIG. 38, new processing for dispersively allocating the front logical devices 230 (S80) is added.

Figure 39:
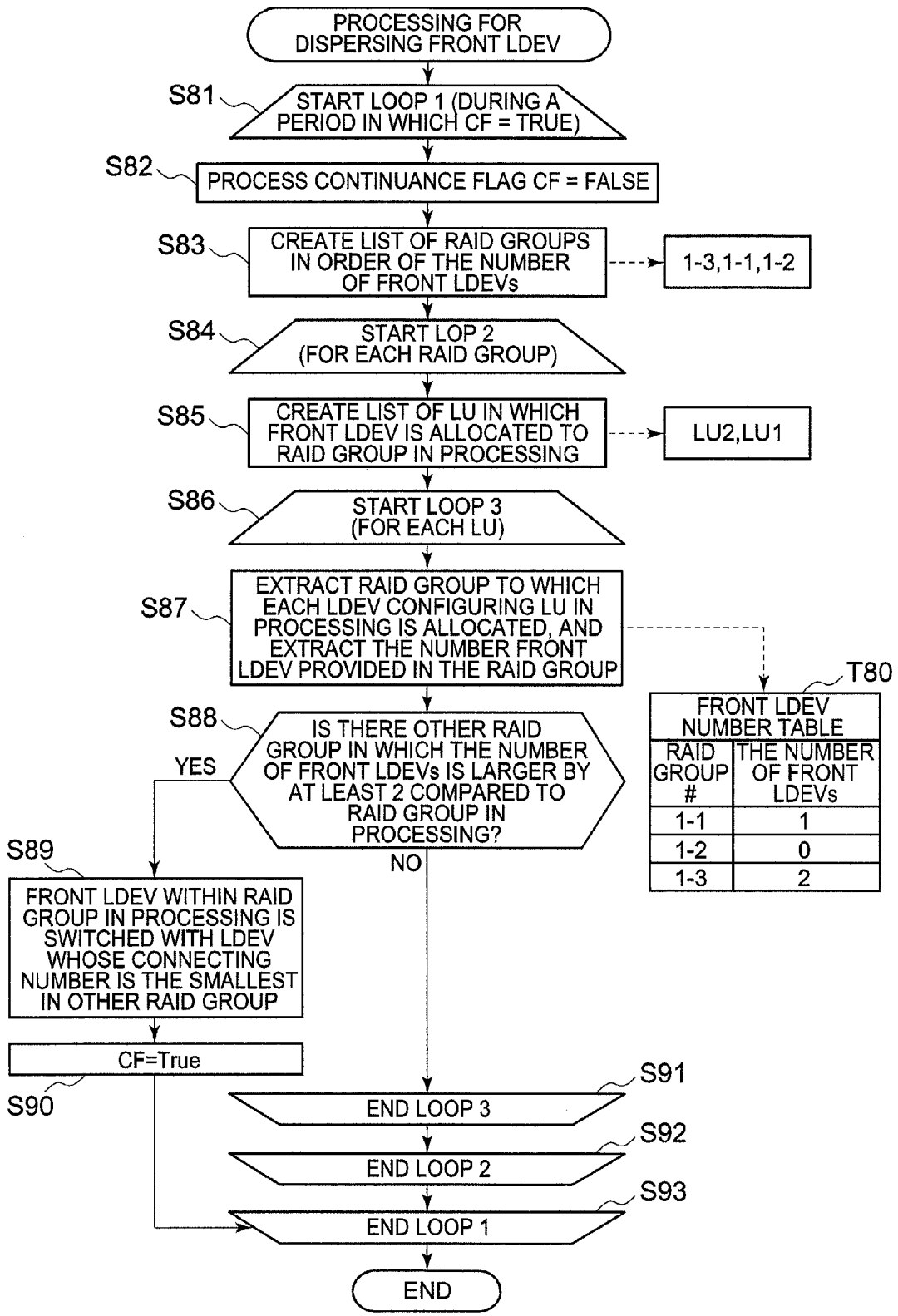
FIG. 39 is a flowchart showing the detail of the processing described in S80 in FIG. 38.

FIG. 39 is a flowchart showing the processing of dispersing the front logical devices 230, which is described in S80 of FIG. 38. The agent 300 repeatedly executes S82 through S92, which are described hereinafter, during a period in which the value of a process continuance flag CF is "True" (S81, S93). The process continuance flag CF is a flag indicating whether to continue execution of the processing, and the value of "True" or "False" is set.

First of all, the agent 300 sets the value "False" as the flag CF (S82), and then creates a list of the numbers of the RAID groups 220 in order of the number of front logical devices 230 (S83). In the example shown in FIG. 37, a list showing "1-3, 1-1, 1-2" or the like is created.

The agent 300 executes the processing of the loop 2 for each RAID group 220 listed on the list (S84). In this loop 2, there is created a list of logical volumes 102 in which the front logical devices 230 are allocated to the RAID group 220 in processing (S85). In the example shown in FIG. 37, a list showing "LU2, LU1" or the like is created.

Then, in the loop 2 the processing of other loop 3 is executed for each logical volume 102 listed on the abovementioned list (S86). In the loop 3, the number of the RAID group 220 to which the logical devices 230 configuring the logical volume 102 in processing are allocated, and the number of front logical devices 230 provided in this RAID group 220 are extracted, and a front logical device number table T80 is created (S87).

The agent 300 references the table T80 to determine whether there is other RAID group 220 in which the number of front logical devices 230 is less by at least two, compared to the RAID group 220 in processing (S88). The reason of finding such RAID group 220 in which the number of front logical devices 230 is less by at least two compared to the RAID group 220 in processing is because there is no point in switching the logical devices 230 among the RAID groups 220 in which the number of front logical devices 230 is less by one.

When there is discovered the RAID group 220 in which the number of front logical devices 230 is less by at least two compared to the RAID group 220 in processing (S88: YES), the agent 300 switches the front logical devices 230 within the RAID group 220 in processing, with the logical device that has the smallest connecting number among the logical devices 230 within the discovered RAID group 220 (S89). Here, S89 is included in the loop 3 which is executed for each logical volume 102, thus the switching is performed among the logical devices 230 associated with the same logical volume 102.

Specifically, in the case where the logical volume in processing is the logical volume 102 (LU2) shown in FIG. 37 and the RAID group in processing is the RAID group 220 (1-3), the RAID group in which the number of front logical devices is less by at least two is the RAID group 220 (1-2). Also, out of the logical devices 230 (#2, #5, #8) that are planned to be allocated to the RAID group 220 (1-2), the logical device to be associated with the logical volume 102 (LU2) is the logical device 230 (#5). Therefore, in the example shown in FIG. 37, the destination to allocate the logical device 230 (#5) is switched with the destination to allocate the front logical device 230 (#3).

If the logical device 230 (#5) and logical device 230 (#4) to be associated with the logical volume 102 (LU2) are planned to be allocated to the RAID group 220 (1-2), the logical device 230 (#5) having the smallest connecting number is selected as the logical device which is the target of switching.

In this manner, after the destination to allocate the front logical device is changed, the agent 300 sets "True" as the value of the flag CF (S90), and returns to S81.

When there is not discovered the RAID group 220 in which the number of front logical devices 230 is less by at least two compared to the RAID group 220 in processing (S88: NO), the processing is executed for other logical volume 102 (loop 3).

The present embodiment that is configured as described above can achieve the same effects achieved by the first embodiment. In addition, the present embodiment has a configuration in which, after the plan for allocating the logical devices 230 to the logical volume 102 is designed, the destination to allocate the front logical devices 230 is corrected so that front logical devices 230 are not allocated to only a specific RAID group 220 in a concentrated manner. Therefore, the front logical devices 230 in which relatively frequently-accessed data is easily stored can be distributed to each RAID group 220, the load at the time of random access can be further dispersed, and the responsiveness of the storage controller 10 can be improved.

Embodiment 5

The fifth embodiment is described with reference to FIG. 40 and FIG. 41. In the present embodiment, the logical volume 102 and logical devices 230 are associated with each other in consideration of the presence of logical devices that are already provided. The above-described embodiment explained an example of the initial state in which any of the logical devices 230 is not defined in each of the RAID groups 220. The present embodiment explains an example of a case where one or a plurality of logical devices 230 are defined in the RAID groups 220 in the initial state.

Figure 40:
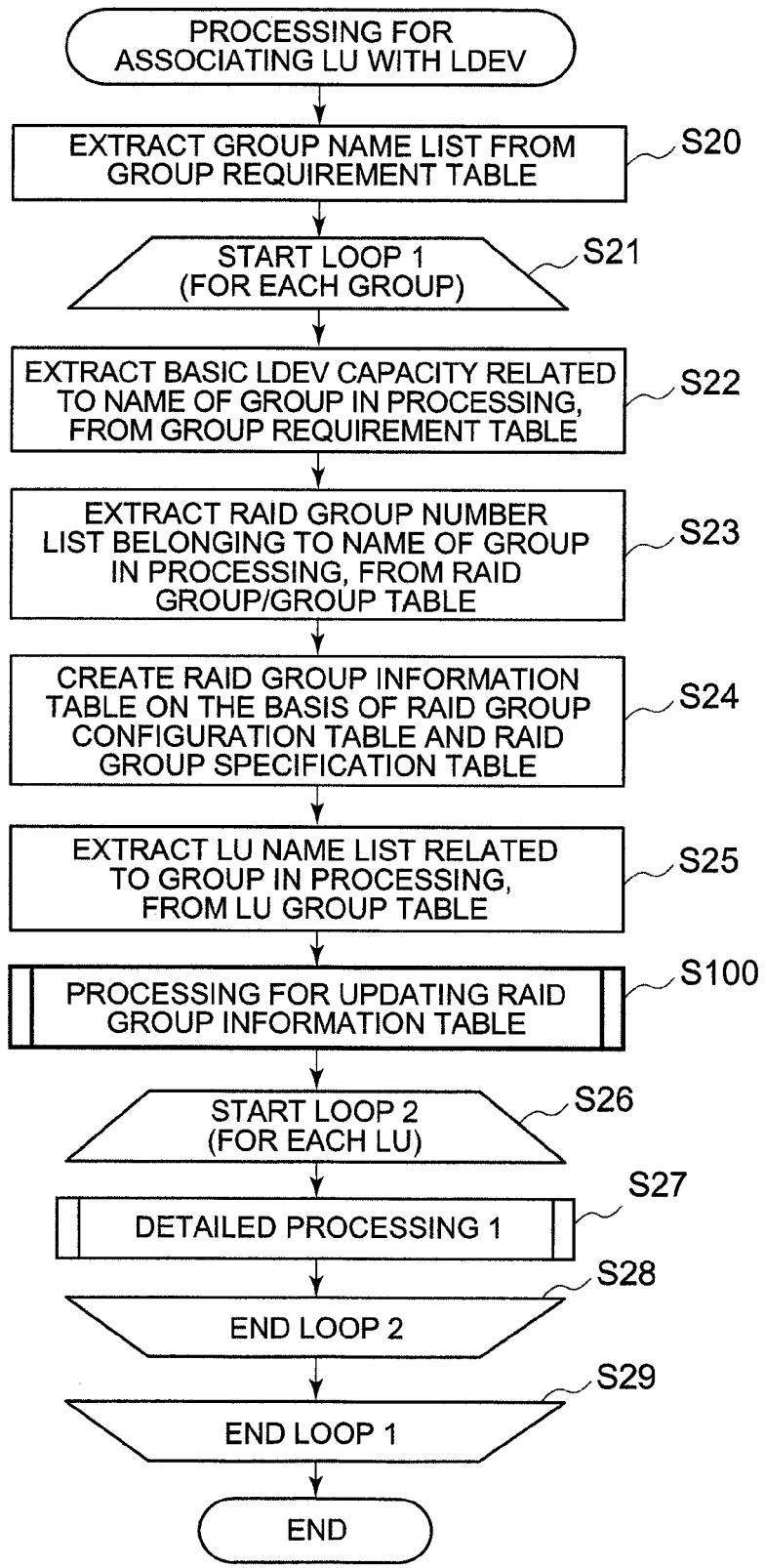
FIG. 40 is a flowchart showing the processing for associating a logical volume with a logical device according to a fifth embodiment.

FIG. 40 is a flowchart showing the processing of associating the logical devices 230 with the logical volume 102. This flowchart has the steps S20 through S29 that are same as those of the flowchart shown in FIG. 13. Moreover, in the present flowchart, a new step S100 is added between S25 and S26. In S100, the RAID group information table T50 is updated based on the presence of the logical devices 230 that are already set.

Figure 41:
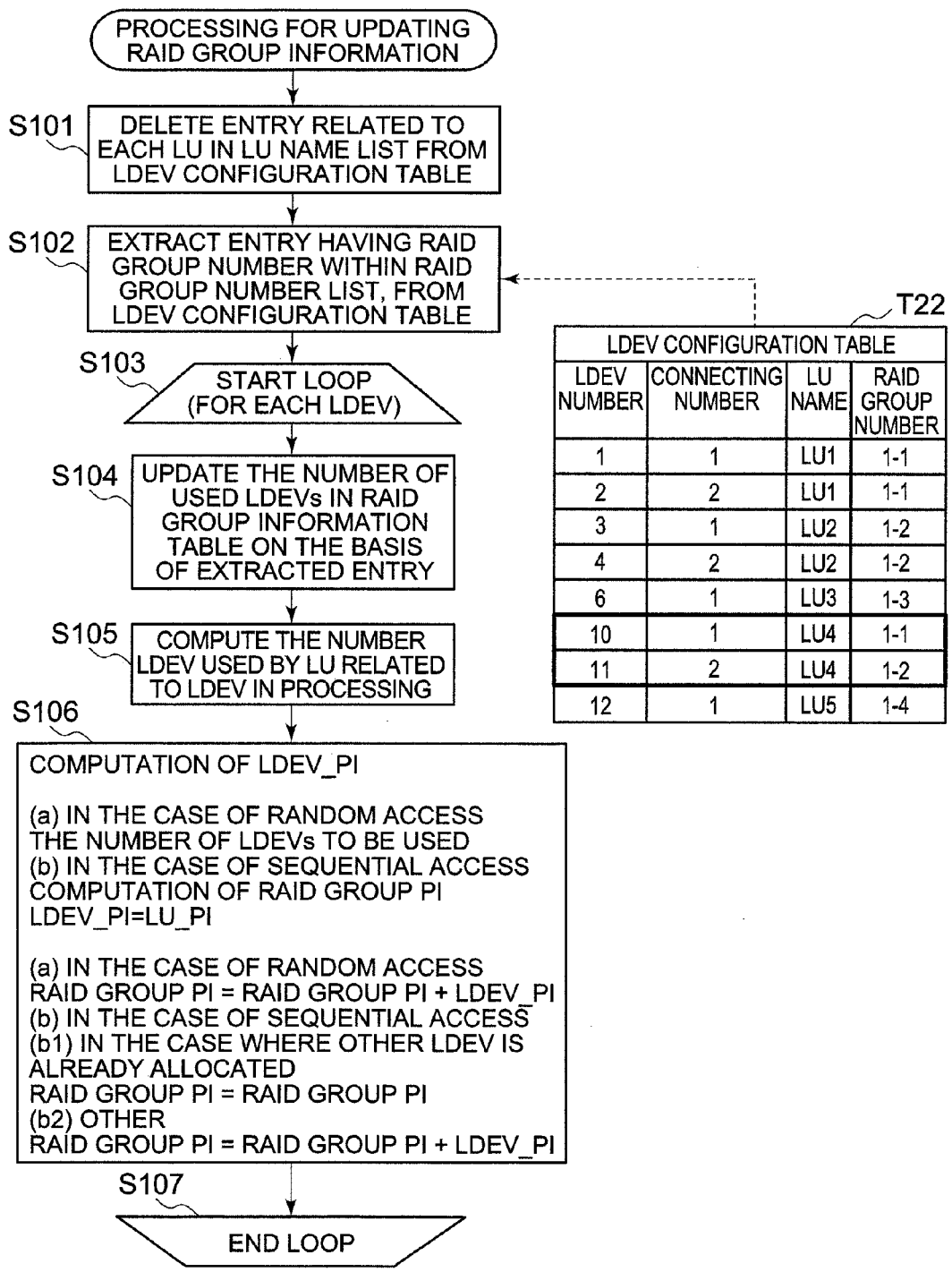
FIG. 41 is a flowchart showing the detail of the processing described in S100 in FIG. 40.

FIG. 41 is a flowchart showing the detail of the update processing which is described in S100 in FIG. 40. The agent 300 deletes, from the logical volumes 102 described in the LDEV configuration table T22, an entry related to the logical volume 102 described on the LU name list shown in the bottom left of FIG. 13 (S101). Specifically, the agent 300 deletes an entry within a range in which association processing is planned be performed. In the case of the table T22 shown in FIG. 41, the entries related to the logical devices 230 (#1, #2, #3, #4, #6) are deleted.

Next, the agent 300 extracts, from the LDEV configuration table T22, an entry having the RAID group number described in the RAID group number list shown on the left side of FIG. 13 (S102). Specifically, the agent 300 extracts an entry related to the logical device 230 which is set already in the RAID group 220, the logical device 230 being the target of the association processing which is planned to be started (the detailed processing 1 described in S27 in FIG. 40).

The agent 300 executes the following steps S104 through S106 for each logical device 230 within the entry extracted in S102 (S103, S107).

First, the agent 300 updates "the number of used LDEVs" in the RAID group information table T50 on the basis of the entry extracted in S102 (S104). Specifically, the value of the number of used LDEVs is increased by the number logical devices 230 that are already set. In the example shown in FIG. 41, the logical device 230 (#10) is already set in the RAID group 220 (1-1), and the logical device 230 (#11) is already set in the RAID group 220 (1-2), thus the agent 300 changes the value of the number of used LDEVs related to each RAID group 220 (1-1, 1-2) from the initial value "0" to "1".

The agent 300 then computes the number of logical devices 230 to be used by the logical volume 102 associated with the logical device 230 in processing, on the basis of the LU configuration table T21 and basic LDEV capacity (S105). Specifically, in the case where the logical device in processing is the logical device 230 (#10), the agent 300 computes the total number of logical devices 230 provided in the logical volume 102 (LU4) associated with this logical device 230 (#10).

In the case where the logical devices 230 are already set in the RAID group 220 which is planned to be subjected to the association processing, it is necessary to previously add up the performance indicators of the RAID groups 220 by the number of existing logical devices 230. Therefore, in order to correct the RAID group performance indicators in S106, the number of existing logical devices 230 is computed in S105.

The agent 300 computes the performance indicators of the existing logical devices 230 as described hereinafter, and uses the performance indicators of the existing logical devices 230 to update the performance indicator of each RAID group 220 listed in the RAID group information table T50 (S106).

The performance indicators of the existing logical devices 230 are computed as follows.

(1) When the Access Pattern is the Random Access

Suppose that the LDEV performance indicator is a value obtained by dividing the LU performance indicator by the number of LDEVs to be used (LDEV performance indicator=LU performance indicator/the number of LDEVs to be used).

(2) When the Access Pattern is the Sequential Access

Suppose that the LDEV performance indicator is the same value as the LU performance indicator (LDEV performance indicator=LU performance indicator).

The performance indicator of the RAID group 220 is computed as follows.

(1) When the Access Pattern is the Random Access

The performance indicator of the existing logical device 230 is added to the latest performance indicator of the RAID group 220, whereby the performance indicator of the RAID group 220 is computed (RAID group PI=RAID group PI+LDEV_PI). Therefore, in the case of the random access, the larger the number of existing logical devices 230 allocated to the RAID group 220, the more the value of the performance indicator of this RAID group 220 increases.

(2) When the Access Pattern is the Sequential Access

There is a case where the existing logical devices 230 are already allocated to the RAID group 220 (2-1), and a case where the no existing logical device 230 is allocated yet (2-2).

(2-1) When the Existing Logical Devices are Already Allocated

The value of the performance indicator of the RAID group 220 does not change. Specifically, in the case where the number of logical devices 230 allocated to this RAID group 220 is one or more, the value of the performance indicator of the RAID group 220 is same as that of the LDEV performance indicator, and thus does not change.

(2-2) When No Existing Logical Device is Allocated

The value of the performance indicator of the logical device 230 is set as the value of the performance indicator of the RAID group 220.

By executing the above processing, the performance indicators that are used in the processing for associating the logical volume 102 with a new logical device 230 can be corrected based on the status of the existing logical devices 230 provided in the RAID group 220 before starting the processing for associating the logical volume 102 with the new logical device 230. Accordingly, the new logical device can be associated with the logical volume 102 more appropriately.

Embodiment 6

The sixth embodiment is described with reference to FIG. 42 and FIG. 43. In the present embodiment, when one logical volume 102 (LU1) and other logical volume 102 (LU2) form a copy pair, the logical devices 230 (#1 through #4) configuring each of the logical volumes 102 (LU1, LU2) are allocated to different RAID groups 220.

Figure 42:
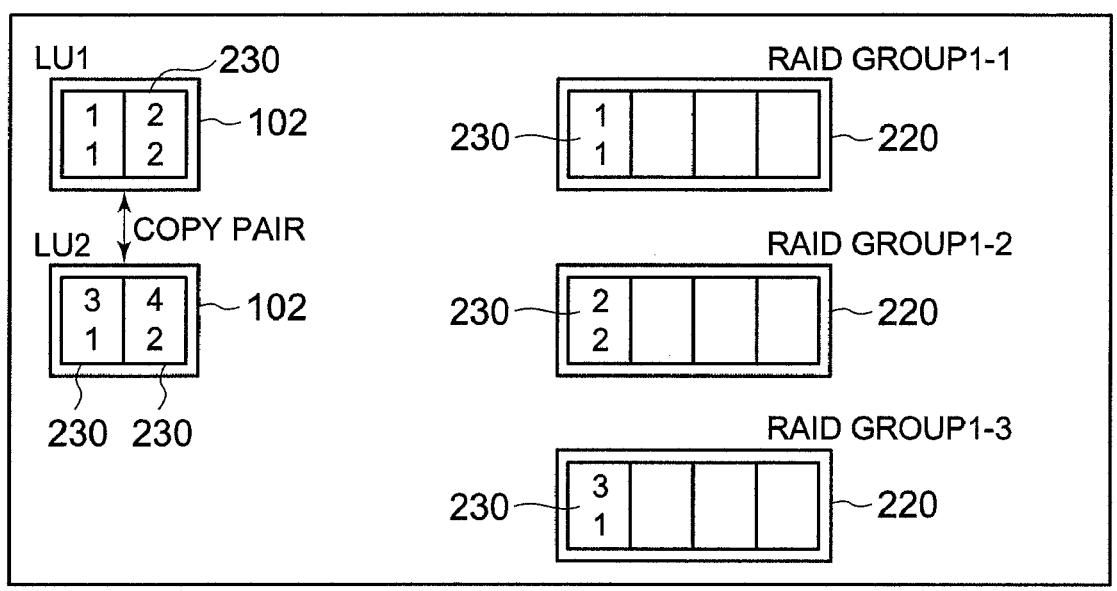
FIG. 42 is an explanatory diagram showing an outline of processing according to a sixth embodiment.

FIG. 42 is an explanatory diagram showing a state in which the logical volumes 102 are associated with the logical devices 230 according to the present embodiment. The first logical volume 102 (LU1) is constituted by two logical devices 230 (#1, #2), and the second logical volume 102 (LU2) is also constituted by two logical devices 230 (#3, #4).

The first logical volume 102 (LU1) and second logical volume 102 (LU2) form a copy pair. For example, the first logical volume 102 (LU1) is used as a primary volume, while the second volume 102 (LU2) is used as a secondary volume, and the stored contents of both volumes 102 (LU1) and 102 (LU2) are matched with each other.

FIG. 42 shows a state in which one logical device 230 (#1) configuring the first logical volume 102 (LU1) is allocated to the RAID group 220 (1-1), and a state in which the other logical device 230 (#2) configuring the first logical volume 102 is allocated to the RAID group 220 (1-2). One logical device 230 (#3) configuring the second logical volume 102 (LU2) is allocated to the RAID group 220 (1-3).

If there is other RAID group 220 (a RAID group 220 (1-4), for example), the other logical device 230 (#4) configuring the second logical volume 102 (LU2) is allocated to this RAID group 220. If there is no other RAID group 220, the logical device 230 (#4) is allocated so that the variance of the RAID group performance indicator in each RAID group 220 becomes minimum.

Figure 43:
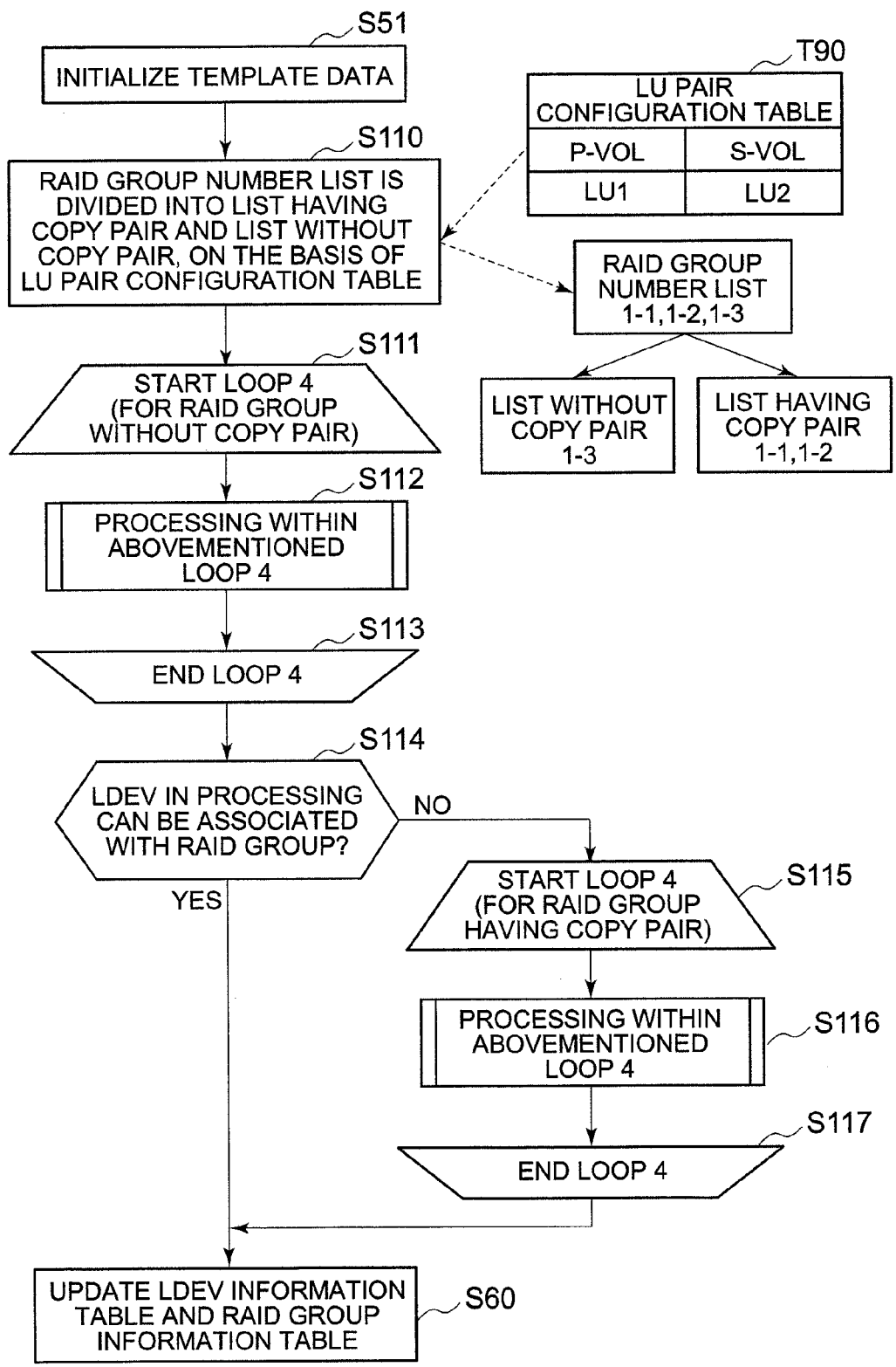
FIG. 43 is a flowchart showing a substantial part of processing for allocating logical devices, each of which is related to a copy pair, to separate RAID groups.

FIG. 43 is a flowchart showing a substantial part of the association processing according to the present embodiment. This flowchart relates to the detailed processing 2 described in FIG. 17. Specifically, new steps S110 through S117 provided in this flowchart are inserted between S51 and S60 in the flowchart shown in FIG. 17. Moreover, the new steps S112 and S116 provided in the present flowchart describe the processes of the steps S52 through S59 of the flowchart shown in FIG. 17. Specifically, S112 and S116 perform the processes within the loop 4 shown in FIG. 17.

After initializing the template data (S51), the agent 300 divides the list of the numbers of the RAID groups 220 into RAID group numbers having copy pair and the RAID group numbers without copy pair, on the basis of a LU pair configuration table T90 (S110).

A copy pair provided in the storage controller 10 is stored in the LU pair configuration table T90. "LU pair" means a pair of logical volumes 102 forming a copy pair. The number of the logical volume 102 which is the primary volume (P-VOL), and the number of the logical volume 102 which is the secondary volume (S-VOL) are stored in the LU pair configuration table T90.

In the abovementioned step S110, the agent 300 classifies the list of the numbers of the RAID groups 220 into the RAID group numbers of RAID groups 220 having copy pair and the numbers of the RAID groups 220 without copy pair. Here, the processing of the logical devices 230 (#1) and 230 (#2) is already finished, and it is assumed that the logical device that is the current target of processing is the logical device 230 (#3).

In the example shown in FIG. 42, the list of the numbers of the RAID groups 220 shows "1-1, 1-2, 1-3". Out of the RAID groups 220 (1-1, 1-2, 1-3), the logical device 230 (#1), which is associated with the logical volume 102 (LU1) that is set as the primary volume of the copy pair, is allocated to the RAID group 220 (1-1). The logical device 230 (#2), which is associated with the logical volume 102 (LU1), is allocated to the RAID group 220 (1-2). Therefore, out of the "1-1, 1-2, 1-3" listed on the list of the numbers of the RAID groups 220, "1-1, 1-2" are classified as the RAID group numbers having copy pair. Since the logical device 230 related to the copy pair is not allocated to the RAID group 220 (1-3), "1-3" is classified as the RAID group number without copy pair.

Specifically, "RAID group having copy pair" means the RAID group 220 to which the logical devices 230 that are associated with the logical volume 102 forming a copy pair are allocated, while "RAID group without copy pair" means the RAID group 220 to which the logical devices 230 that are associated with the logical volume 102 forming a copy pair are not allocated.

As described hereinafter, the agent 300 first considers the RAID group 220 without copy pair as the destination to allocate the logical devices 230 which are the targets of processing (S111 through S113). In the case where the logical devices 230 cannot be allocated to the RAID group 220 without copy pair (S114: NO), the agent 300 considers to allocate the logical devices 230 to the RAID group 220 having a copy pair (S115 through S117).

First, for the RAID group 220 without copy pair, the agent 300 determines whether the logical devices 230, which are the targets of processing, can be allocated (S111 through S113). For example, as the destination to allocate the logical device 230 (#3) that is being processed currently, only the RAID group 220 (1-3) without copy pair is considered as a candidate for the allocation destination.

As a result of the processes in S111 through S113, the agent 300 determines whether the logical device 230 can be associated with the RAID group 220 (S114), and, if the logical device 230 can be associated (S114: YES), moves to S60. It should be noted that after S60 the agent 300 moves to S61 shown in FIG. 17.

In the case where the logical device 230 in processing cannot be associated with the RAID group 220 without copy pair (S114: NO), the agent 300 uses the RAID group 220 having copy pair as a candidate for the destination to allocate this logical device 230, and thereby executes the processing of the loop 4 (S115 through S117).

As described above, the details of the processing in the steps S111 through S113 are same as those of S115 through S117, but the types of the RAID groups 220 as the targets of determination are different. In S111 through S113, it is determined whether the logical device 230 as the target of processing can be allocated to the RAID group 220 without copy pair, while in S115 through S117 it is determined whether the logical device 230 as the target of processing can be allocated to the RAID group 220 having copy pair.

By means of the present flowchart, the logical device 230 related to the copy pair is allocated preferentially to the RAID group 220 without copy pair. In the case where the logical device 230 cannot be allocated to the RAID group 220 without copy pair, the logical device 230 related to the copy pair is allocated to the RAID group 220 having copy pair. Therefore, logical devices 230 related to the copy pair are allocated to different RAID groups 220 as much as possible.

The present embodiment configured as described above also achieves the effects achieved by the first embodiment. In addition, in the present embodiment, the logical devices 230 associated with each logical volume 102 forming a copy pair can be distributed and allocated to different RAID groups 220 as much as possible. Therefore, redundancy of data management can be enhanced and the reliability of the storage controller 10 can be further improved.

It should be note that the present invention is not limited to the above-described embodiments. Those skilled in the art can add or modify the embodiments within the scope of the present invention.

What is claimed is:

1. A storage controller, which provides a host device with a logical volume accessed by the host device, comprising:
   a plurality of storage drives;
   a plurality of physical storage devices which are formed by grouping physical storage regions provided in each of the storage drives;
   a plurality of logical storage devices, at least one or more of which are set in a physical storage region provided in each of the physical storage devices; and
   a control section which associates a plurality of predetermined logical storage devices of the logical storage devices with the logical volume; and
   wherein the control section selects the physical storage devices to which the plurality of predetermined logical storage devices are allocated, in accordance with whether the type of access pattern is random access or sequential access when the host device accesses the logical volume, and in accordance with a first performance indicator which is set in the logical volume beforehand; and further wherein
   the control section selects the physical storage devices to which the plurality of predetermined logical storage devices are allocated, in accordance with the type of access pattern for each preset predetermined time zone and the first performance indicator; and
   (1) when the access pattern is the random access, the control section:
   (1-1) computes the second performance indicator by dividing the first performance indicator by the number of the predetermined logical storage devices configuring the logical volume; and
   (1-2) computes, for each of the predetermined logical storage devices in the each predetermined time zone, the total value of the second performance indicators as the third performance indicator for the case where the predetermined logical storage devices are allocated to the physical storage devices, and
   (2) when the access pattern is the sequential access, the control section:
   (2-1) sets the first performance indicator as the second performance indicator;
   (2-2) sets, for each of the predetermined logical storage devices in the each predetermined time zone, the value of the second performance indicator as the third performance indicator for the case where the predetermined logical storage devices are allocated to the physical storage devices; and
   (3) selects the physical storage devices to which the plurality of predetermined logical storage devices are allocated, for each of the plurality of predetermined logical storage devices so that variances of the third performance indicators become minimum.

2. The storage controller according to claim 1, wherein the control section: computes a second performance indicator of each of the plurality of predetermined logical storage devices in accordance with the type of access pattern and the first performance indicator; computes a third performance indicator of each of the physical storage devices on the basis of the second performance indicator; and selects the physical storage devices to which the plurality of predetermined logical storage devices are allocated, so that variances of the third performance indicators become small.

3. The storage controller according to claim 2, wherein
   (1) when the access pattern is the random access, the control section:
   (1-1) computes the second performance indicator by dividing the first performance indicator by the number of the predetermined logical storage devices configuring the logical volume; and
   (1-2) computes, for each of the predetermined logical storage devices, the total value of the second performance indicators as the third performance indicator for the case where the predetermined logical storage devices are allocated to the physical storage devices, and
   (2) when the access pattern is the sequential access, the control section:
   (2-1) sets the first performance indicator as the second performance indicator;
   (2-2) sets, for each of the predetermined logical storage devices, the value of the second performance indicator as the third performance indicator for the case where the predetermined logical storage devices are allocated to the physical storage devices; and
   (3) selects the physical storage devices to which the plurality of predetermined logical storage devices are allocated, for each of the plurality of predetermined logical storage devices so that variances of the third performance indicators become minimum.

4. The storage controller according to claim 1, wherein the control section: computes a second performance indicator for each of the plurality of predetermined logical storage devices in accordance with the type of access pattern and the first performance indicator; computes a third performance indicator for each of the physical storage devices on the basis of the second performance indicator; and selects the physical storage devices to which the plurality of predetermined logical storage devices are allocated, so that a variance of the difference between the third performance indicator and a preset maximum value becomes small.

5. The storage controller according to claim 4, wherein
   (1) when the access pattern is the random access, the control section:
   (1-1) computes the second performance indicator by dividing the first performance indicator by the number of the predetermined logical storage devices configuring the logical volume; and
   (1-2) computes, for each of the predetermined logical storage devices, the total value of the second performance indicators as the third performance indicator for the case where the predetermined logical storage devices are allocated to the physical storage devices, and
   (2) when the access pattern is the sequential access, the control section:
   (2-1) sets the first performance indicator as the second performance indicator;
   (2-2) sets, for each of the predetermined logical storage devices, the value of the second performance indicator as the third performance indicator for the case where the predetermined logical storage devices are allocated to the physical storage devices; and
   (3) selects the physical storage devices to which the plurality of predetermined logical storage devices are allocated, for each of the plurality of predetermined logical storage devices so that a variance of the difference between a maximum value set for each of the physical storage devices beforehand and the third performance indicator becomes minimum.

6. The storage controller according to claim 1, wherein orders associated with the logical volume are set for the plurality of predetermined logical storage devices respectively, and the control section distributes to allocate a predetermined logical storage device of the first order, which is the highest of the orders, to the physical storage device.

7. The storage controller according to claim 6, wherein after selecting the physical storage devices to which the plurality of predetermined logical storage devices are allocated, the control section attempts to distribute to allocate the predetermined logical storage device of the first order to the physical storage device.

8. The storage controller according to claim 1, wherein the logical volume and the physical storage devices are managed in units of resource management groups which are set beforehand, and the control section selects, for each resource management group, the physical storage devices to which the plurality of predetermined logical storage devices are allocated, in accordance with the type of access pattern and the first performance indicator.

9. The storage controller according to claim 8, wherein the control section selects the physical storage devices to which the plurality of predetermined logical storage devices are allocated, in consideration of destinations to allocate other predetermined plurality of logical storage devices in resource management groups other than the resource management group which is a target of processing.

10. The storage controller according to claim 1, wherein if there is a first logical volume and a second logical volume that form a copy pair with each other as the logical volume, the control section allocates a predetermined logical storage device associated with the first logical volume and a predetermined logical storage device associated with the second logical volume to separate physical storage devices as much as possible.

11. A method for forming in a storage controller a logical volume to be provided to a host device, the storage controller comprising a plurality of physical storage devices which are formed by grouping physical storage regions provided in each of a plurality of storage drives, and a plurality of logical storage devices, at least one or more of which are set in a physical storage region provided in each of the physical storage devices, the method executing the steps of:
managing the logical volume and the physical storage devices in units of resource management groups;
acquiring the type of access pattern when the host device accesses the logical volume, i.e. either random access or sequential access, in each predetermined time zone which is set beforehand, and a first performance indicator set in the logical volume beforehand;
(1-1) computing a second performance indicator by dividing the first performance indicator by the number of predetermined logical storage devices configuring the logical volume, when the access pattern is the random access;

(1-2) computing, for each of the predetermined logical storage devices in the each predetermined time zone, the total value of the second performance indicators as a third performance indicator for the case where the predetermined logical storage devices are allocated to the physical storage devices, when the access pattern is the random access;

(2-1) setting the first performance indicator as the second performance indicator when the access pattern is the sequential access;

(2-2) setting, for each of the predetermined logical storage devices in the each predetermined time zone, the value of the second performance indicator as the third performance indicator for the case where the predetermined logical storage devices are allocated to the physical storage devices, when the access pattern is the sequential access; and (3) selecting, within the resource management groups, the physical storage devices to which the plurality of predetermined logical storage devices are allocated, for each of the plurality of predetermined logical storage devices, so that variances of the third performance indicators become minimum.

* * * * *